US012719403B1

(12) United States Patent
Shafir

(10) Patent No.: US 12,719,403 B1
(45) Date of Patent: Aug. 25, 2026

(54) SYSTEMS, DEVICES, AND METHODS FOR DEPLOYING AND TILTING PANELS

(71) Applicant: Aaron Roni Shafir, Tel Aviv (IL)

(72) Inventor: Aaron Roni Shafir, Tel Aviv (IL)

(*) Notice: Subject to any disclaimer, the term of this patent is extended or adjusted under 35 U.S.C. 154(b) by 0 days.

(21) Appl. No.: 19/300,704

(22) Filed: Aug. 15, 2025

(51) Int. Cl.
*H02S 20/30* (2014.01)
*H02S 30/20* (2014.01)
*B60L 53/51* (2019.01)

(52) U.S. Cl.
CPC .............. *H02S 20/30* (2014.12); *H02S 30/20* (2014.12); *B60L 53/51* (2019.02)

(58) Field of Classification Search
CPC ........... H02S 20/30; H02S 20/32; H02S 30/20
See application file for complete search history.

(56) References Cited

U.S. PATENT DOCUMENTS

2009/0288891 A1 11/2009 Budge
2015/0349699 A1* 12/2015 Chambe .................. H02S 20/30 136/246
2017/0063290 A1* 3/2017 Kurlagunda ............ B60L 8/003
2021/0194414 A1* 6/2021 Barclay .................... H02S 10/40
2025/0080038 A1* 3/2025 Pribyl ...................... H02S 20/30
2025/0080039 A1* 3/2025 Sadeghpour ............ H02S 20/30

FOREIGN PATENT DOCUMENTS

CN 208118964 U 11/2018
CN 110112998 A 8/2019
CN 116552256 A 8/2023
CN 117749072 A 3/2024

* cited by examiner

*Primary Examiner* — Daniel P Malley, Jr.
(74) *Attorney, Agent, or Firm* — AlphaPatent Associates Ltd.; Daniel J. Swirsky

(57) ABSTRACT

A tilting system including a base, a tilting plate configured to support at least one panel, a transmission unit configured to rotate the tilting plate relative to the base from a position substantially parallel to the base to a position at an angle of up to about 90 degrees relative to the base, where the tilting plate is tiltable about a first edge of the panel in one direction and about a second edge of the panel in the opposite direction, and at least two locking devices configured and enabled to lock the tilting plate at the respective edge about which the plate is tilted.

18 Claims, 45 Drawing Sheets

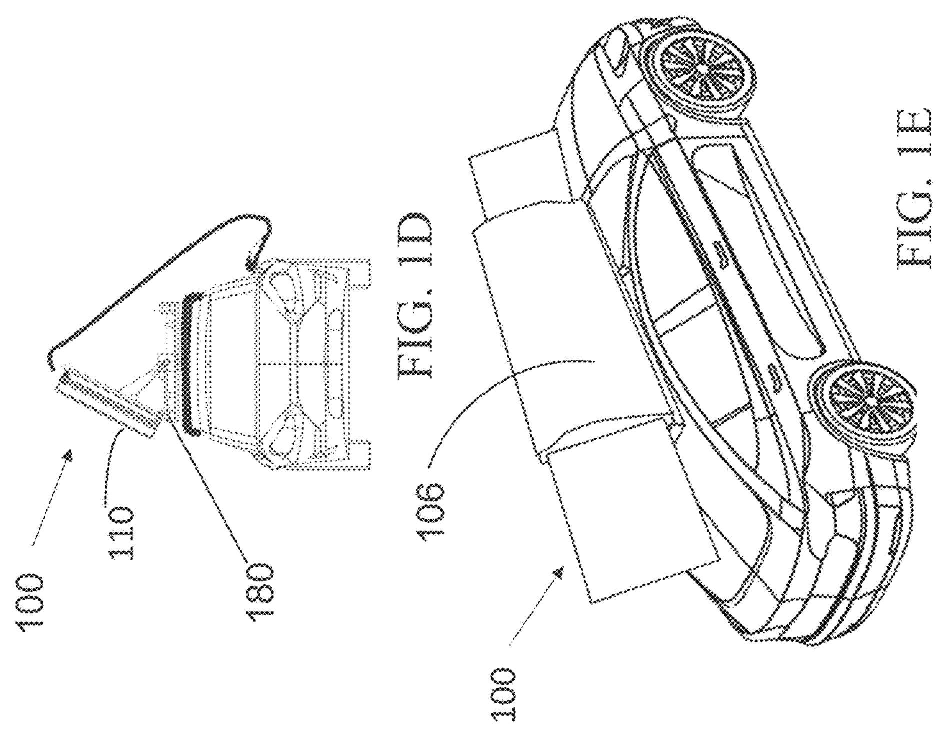
FIG. 1D
FIG. 1E
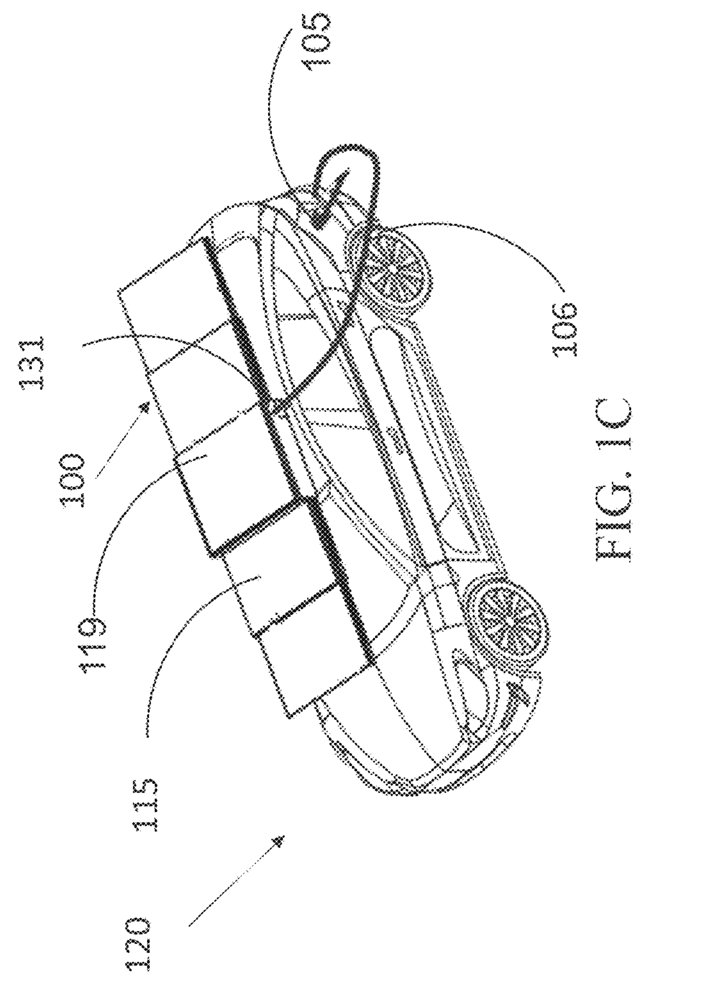
FIG. 1C 322
325
324
323
326
321

324
321
326
323
329
322
325
327
328
300

442

442

441

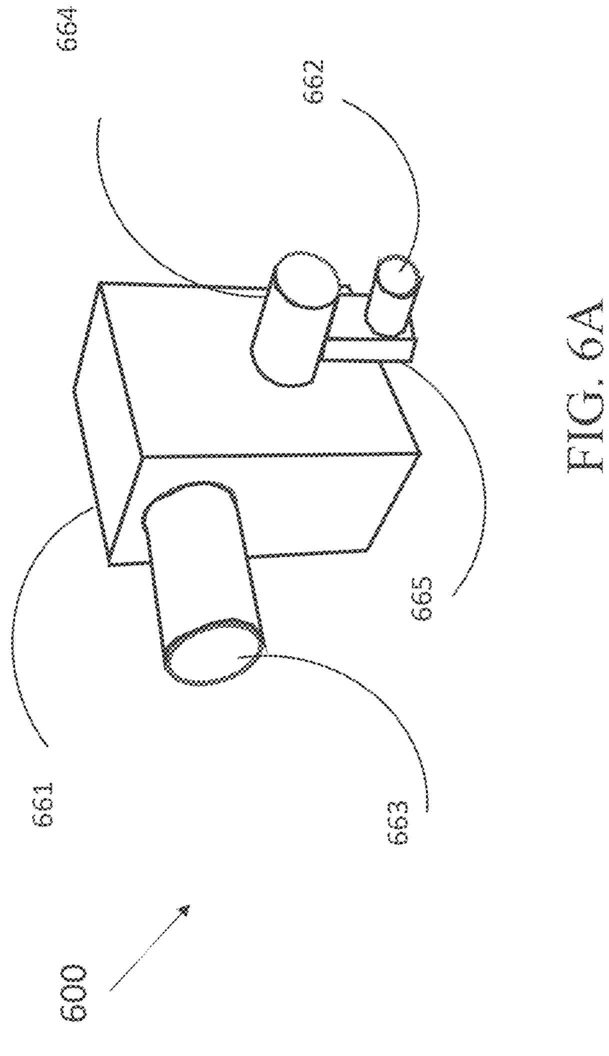
FIG. 6A

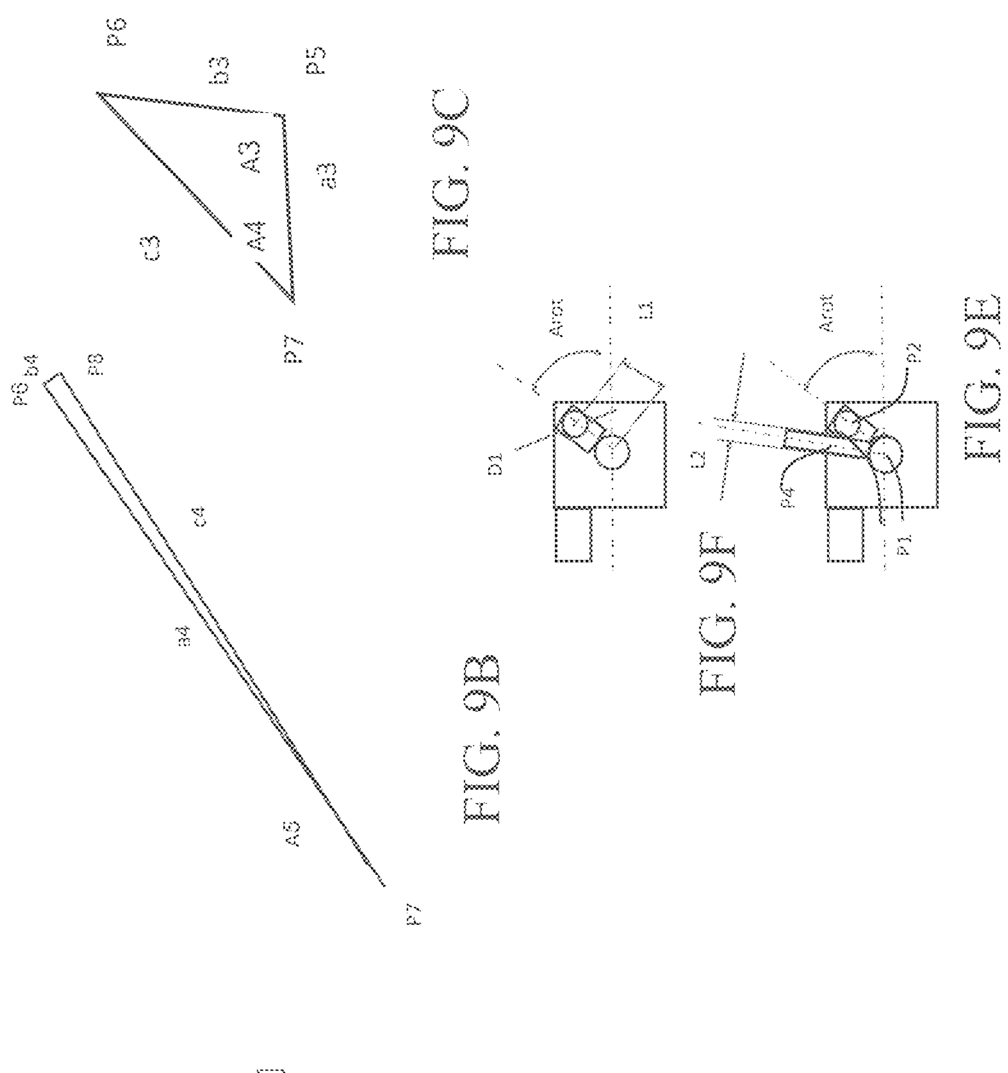
FIG. 9B
FIG. 9C
FIG. 9F
FIG. 9E
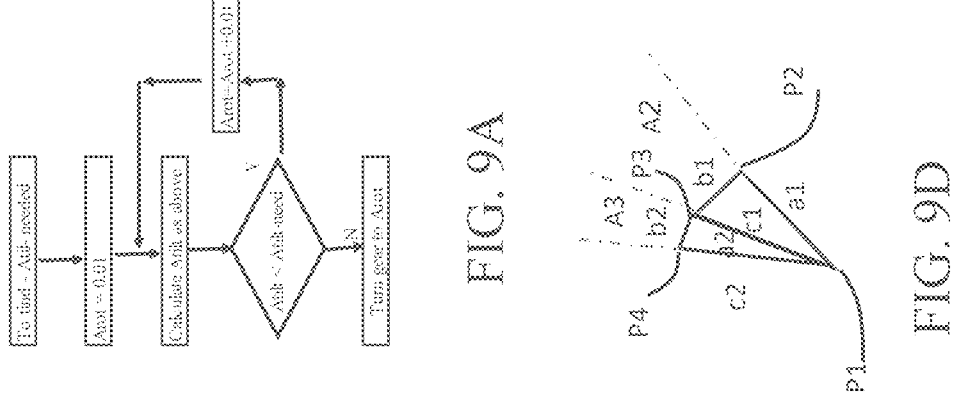
FIG. 9A
FIG. 9D

SYSTEMS, DEVICES, AND METHODS FOR DEPLOYING AND TILTING PANELS

FIELD

The invention relates to systems, devices, and methods for deploying and tilting panels of various types in a wide range of applications, and more specifically but not exclusively to systems, devices, and methods for deploying and tilting panels such as solar panels or mirror panels for use in vehicles, buildings, outdoor structures, and other environments.

BACKGROUND

In recent years, renewable energy sources have become increasingly important, with solar energy recognized as a leading option for sustainable power generation. Solar panel systems are widely used in various applications, including vehicles, residential rooftops, and portable installations. The integration of solar panels into these platforms aims to maximize energy collection while maintaining compatibility with existing structures and minimizing installation complexity.

Despite advancements in solar technology, current systems often face limitations related to effective surface area, ease of deployment, and adaptability to different environments. Many existing solutions require significant modifications to vehicles or buildings, can be costly to install, or may not provide optimal energy collection due to fixed configurations. Additionally, bulky or elevated designs can present challenges in terms of aerodynamics, aesthetics, and practical use, particularly in mobile or space-constrained settings.

There remains a need for improved solar panel systems devices and methods that address these challenges by offering efficient energy collection, and adaptability for a range of applications without requiring extensive structural changes.

In addition, there is a need for a simple and effective solution for tilting and expanding panels. Such a solution should allow for easy adjustment and deployment of panels in various environments, while minimizing installation complexity and the need for significant structural modifications. This would enable broader adoption and more efficient use of panels in both stationary and mobile applications.

SUMMARY

According to a first embodiment there is provided a tilting system, comprising: a base; a tilting plate configured to support at least one panel; a transmission unit configured to rotate the tilting plate relative to the base from a position substantially parallel to the base to a position at an angle of up to about 90 degrees relative to the base, wherein the tilting plate is tiltable about a first edge of the panel in one direction and about a second edge of the panel in the opposite direction; and at least two locking devices configured and enabled to lock the tilting plate at the respective edge about which the plate is tilted.

In an embodiment, the tilting system further comprising a pair of tilting arms connected to the transmission unit, wherein the pair of tilting arms are configured and enabled to push the tilting plate and cause it to tilt about one of the edges of the plate.

In an embodiment, each tilting arm has a roller mounted at a distal end and wherein the roller is configured to engage a guide channel formed in the base, said guide channel is configured and enabled to prevent the roller from being withdrawn from the channel during operation.

In an embodiment, the at least two locking devices are each mounted at an end of the base and configured to engage a respective locking handle on the tilting plate.

In an embodiment, each of the at least two locking devices comprises a grasping element and a spring mechanism, wherein the spring mechanism is configured and enabled to release the locking on the side of the tilting plate being raised by the respective tilting arm.

In an embodiment, the base is configured for mounting to a vehicle roof, a building rooftop, a garden structure, a balcony, a patio, or another outdoor structure.

In an embodiment, the system further comprising a telescopic panel system configured to extend and retract the at least one panel or additional panels.

In an embodiment, the telescopic panel system comprises a fixed frame, said fixed frame is configured to hold said at least one panel, and at least one moving panel mounted on telescopic rails, wherein the telescopic panel system is configured to increase or decrease the surface area of the telescopic panel system.

In an embodiment, the telescopic panel system comprises a plurality of moving panels, each configured to extend outward from the fixed frame in opposite directions.

In an embodiment, the telescopic panel system includes a sliding drawer mechanism, the moving panel being configured to slide along a fixed rail guided by a moving frame for smooth and stable movement during extension and retraction.

In an embodiment, the telescopic panel system further comprises an actuator selected from the group consisting of an electric actuator, a linear actuator, a motorized actuator, or a drive chain actuator, said actuator is configured and enabled to automatically deploy and retract the moving panel.

In an embodiment, the telescopic panel system is configured to be mounted on a vehicle roof, a building rooftop, a garden structure, a balcony, a patio, or another outdoor structure.

In an embodiment, the telescopic panel system is further configured to operate in conjunction with the tilting system to enable both extension or retraction and tilting of the panel for optimal positioning.

In an embodiment, the at least one panel is selected from the group consisting of a solar panel, a mirror panel, a shading panel, a display panel, or another functional or structural panel configured to be tilted.

In an embodiment, the system is installed on a vehicle and includes a computerized control unit configured to operate the tilting system according to the optimal tilt angle at any given time, based on the vehicle parking angle, date, and time.

In an embodiment, the system, in its fully extended position, does not extend beyond the surface area of the vehicle.

In an embodiment, the electricity generated by the panels is used to charge the vehicle via a mobile charger provided by the vehicle manufacturer.

According to another embodiment there is provided a panel system comprising: one or more panels configured to be deployed and tilted synchronously using a tilting system and a deployment system; and a locking mechanism configured to securely fix the panel in a selected tilted position.

In an embodiment, the tilting system comprising: a transmission unit configured to rotate a tilting plate relative to a base from a position substantially parallel to the base to a position at an angle of up to about 90 degrees relative to the base, wherein the tilting plate is tiltable about a first edge of the panel in one direction and about a second edge of the panel in the opposite direction; and at least two locking devices configured and enabled to lock the tilting plate at the respective edge about which the plate is tilted.

BRIEF DESCRIPTION OF THE DRAWINGS

A better understanding of the features and advantages of the invention will be obtained by reference to the following detailed description that sets forth illustrative embodiments, in which the principles of embodiments of the invention are utilized, and the accompanying drawings, in which:

FIGS. 1B-1E illustrate the application of the invention for vehicles, for example, an electric vehicle, in accordance with embodiments of the invention;

FIGS. 1F-1K illustrate various operational states of the solar panel system on a vehicle, including stowed, charging, deployed, and tilted positions, as well as the transition between these states, in accordance with embodiments of the invention;

FIG. 6A illustrates a mechanical side view of a tilting system with worm gear transmission, in accordance with embodiments of the invention;

FIGS. 9A-9G illustrate the calculation of tilt angles for a system, such as system 100, in accordance with embodiments of the invention.

DETAILED DESCRIPTION

Figure 1A:
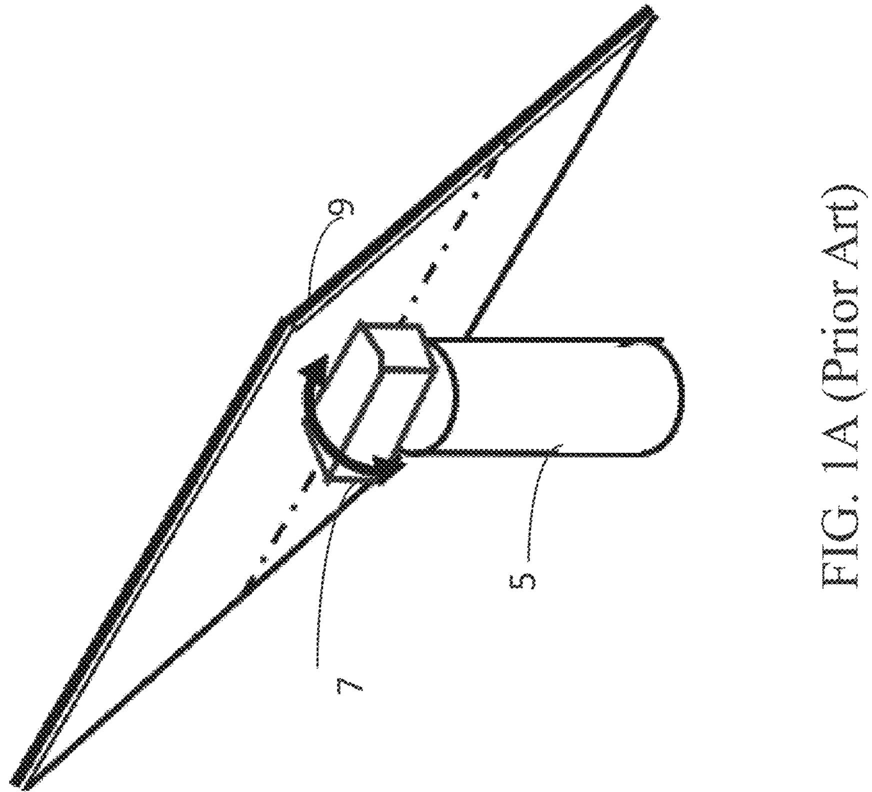
FIG. 1A illustrates a tilting system according to the prior art.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figures and described in the specification.

The invention provides effective and convenient tilting systems, devices and methods.

Additionally, the invention provides systems, devices, and methods for expanding and deploying panels. In accordance with embodiments, the panel system may include telescopic or extendable elements that allow panels to be extended outward to increase surface area for energy collection or retracted for compact storage. For instance, a telescopic solar panel system can be deployed when a vehicle is parked to maximize energy capture and retracted during travel to maintain a low profile and aerodynamic efficiency.

The following detailed description also relates to deploying and tilting panels, such as solar panels to optimize energy capture. These systems and methods are particularly applicable to renewable energy solutions for vehicles, residential rooftops, and other structures, offering improved efficiency, adaptability, and ease of installation.

While specific examples and configurations are described herein, these are provided solely for illustrative purposes and are not to be construed as limiting the scope of the described technology.

Those skilled in the art will understand that certain widely recognized components, processes, and techniques may not be described in detail to avoid obscuring the invention. Furthermore, various modifications, substitutions, and rearrangements of the described embodiments may be made without departing from the spirit and scope of the invention. The claims appended hereto define the boundaries of embodiments of the invention, and the examples provided are intended to support, not restrict, the breadth of those claims.

As used herein, the term "panel(s)" refers to any generally planar or plate-like structure that may be supported, deployed, tilted, or otherwise positioned by the systems and methods described in this disclosure. The panel may be of any type, including but not limited to a solar panel, mirror panel, shading panel, display panel, or any other functional or structural panel suitable for the intended application.

It should be understood that while solar panels are described in detail throughout this disclosure, the invention, including its systems, devices and methods, may be applied to any type of panel, such as mirror panels, shading panels, display panels, or other functional or structural panels, and is not limited exclusively to solar panels. The invention provides various tilting systems, devices and methods configured to tilt panels in an accurate and secure manner, as well as various expanding devices and methods for deploying panels, for a wide range of uses and applications.

FIG. 1A illustrates a tilting system according to the prior art. In this configuration, the center of a panel, such as panel 9, is attached to a rotation device 7, which is itself connected to a central pole 5. As depicted, the panel can only be rotated about its center. Additionally, the pole 5 protrudes from the center of the panel, making it impractical for installation on surfaces such as vehicle roofs, as it disrupts the aerodynamics of the system and is highly conspicuous.

Furthermore, the rotation capability is very limited because it is performed only around the center of the panel, restricting the possible tilting angles and directions. Moreover, in the prior art, the panel is mounted on a pole that rotates the panel, which is not suitable for applications such as vehicles, where it is not practical to have a protruding pole on the roof. For building rooftops, this design is also less desirable, as it requires erecting a pole next to each solar panel, rather than allowing for a flat and easily installed system. In contrast, the invention enables tilting around the edges of the panel, providing greater flexibility and practicality for a wide range of installations.

FIGS. 1B-1E illustrate a panel system such as solar panel system 100 as implemented on vehicles, for example, an electric vehicle 120. In accordance with embodiments, these figures demonstrate how a panel system such as the solar panel system 100 can be integrated with a vehicle to enable direct solar energy capture and battery charging. System 100 is designed to be mounted on the roof of the vehicle, providing a compact and efficient solution for renewable energy generation while the vehicle is parked or in use. The configuration allows for both tilting and telescopic extension of the solar panels, optimizing sunlight exposure and maximizing energy output without requiring significant modifications to the vehicle itself.

Figure 1B:
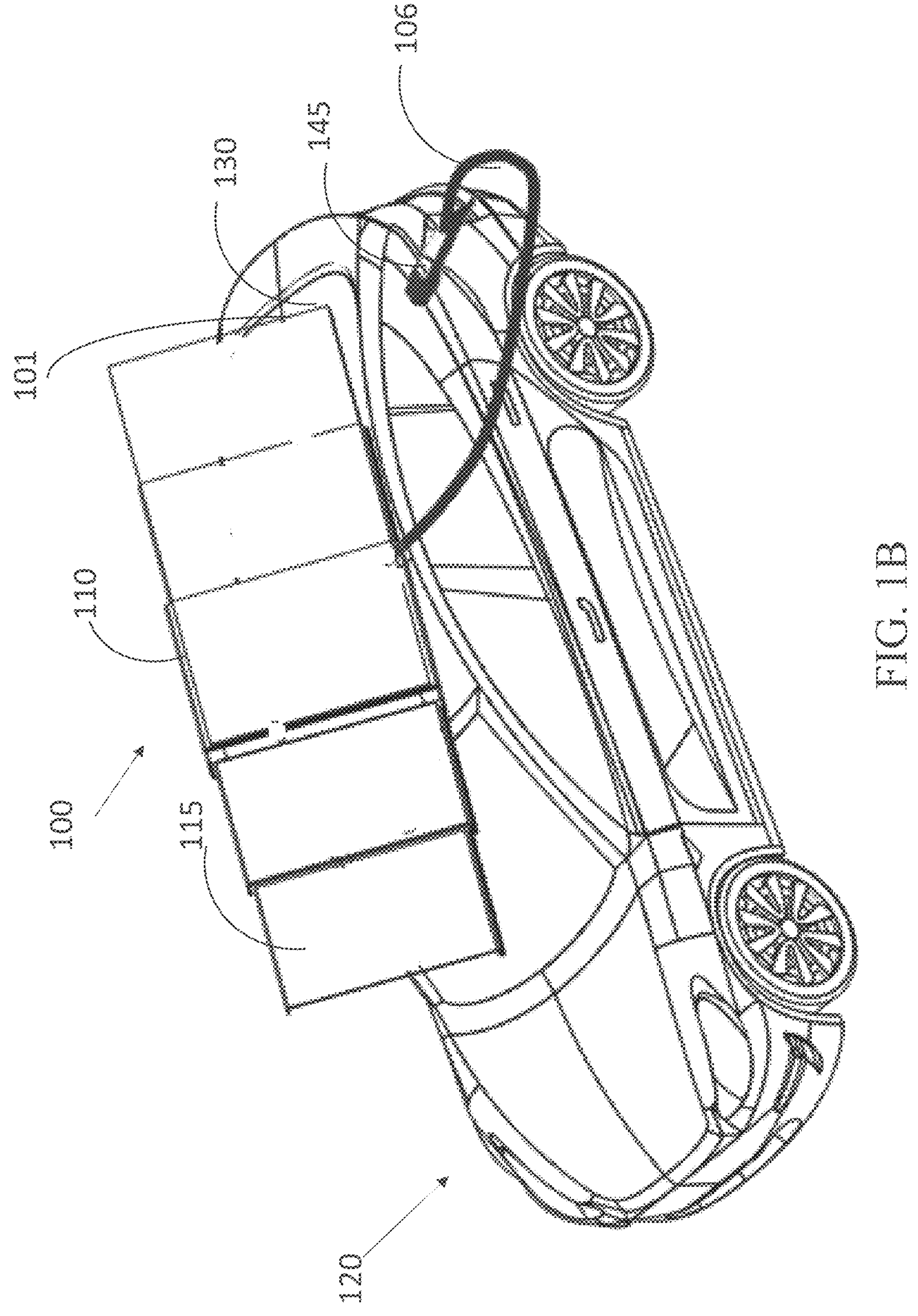

FIG. 1B shows the solar panel system 100 integrated with a vehicle 120, such as a car, in accordance with embodiments. The solar panel system 100 is configured and enabled to optimize solar energy capture and enable for example direct charging of the vehicle 120. In accordance with embodiments, the solar panel system 100 comprises two or more panels 115 and is mounted on the roof 101 of the vehicle 120. The system is depicted in a deployed position, with the panels 115 tilted to maximize exposure to sunlight. This tilting system enhances energy collection efficiency by aligning the panels 115 with the sun's trajectory.

In accordance with embodiments, the solar panel system 100 may be implemented in a tilting configuration, an expandable (e.g., telescopic or foldable) configuration, or a combination of both (as illustrated in FIG. 1B). In the tilting configuration, the panels 115 are mounted in a manner that allows them to be angled relative to the roof 101 of the vehicle 120 and/or relative to the base of the solar panel system 100 to optimize sunlight capture throughout the day. In the expandable configuration, the system 100 consists of multiple interconnected panels 115 that can be extended or retracted as needed, allowing for compact storage during vehicle motion and expanded surface area during charging. In some embodiments, both tilting and expandable features are integrated, enabling the panels 115 to both extend for increased surface area and tilt for optimal orientation.

According to one embodiment, the solar panel system 100 is connected to the vehicle 120 via a charging cable 106, which extends from the solar panel system 100 to the vehicle's charging port 145. This enables, for example, direct transfer of solar-generated electricity to the vehicle's battery, eliminating the need for external charging infrastructure and making the system self-sufficient and suitable for mobile applications.

The solar panel system 100 can be implemented using rigid panels, or flexible panels or any combination thereof, and may be adapted for use on a variety of vehicle types, including passenger cars, trucks, recreational vehicles, and buses. The system is designed for compatibility with standard vehicles 120 without requiring significant modifications. Its low-profile design minimizes aerodynamic drag when the panels 115 are stowed, while the integrated tilting and/or expandable functionality provides a significant increase in energy capture during operation.

FIG. 1C shows the solar panel system 100 installed on the roof of the vehicle 120, such as an electric vehicle. In accordance with embodiments, the system 100 includes a fixed cover section 119, which houses the other solar panel sections 115, such as the moving panel sections (e.g. panels 115). The fixed cover 119 is securely attached to the roof of the vehicle 120, providing a stable base for the entire solar panel system.

According to one embodiment, from the fixed cover 119, an electrical charging cable 106 extends outward and is connected to a charging handle 105. The charging handle 105 is designed to interface with the vehicle's charging port 145, enabling direct transfer of solar-generated electricity to the vehicle's battery. The electrical compartment 131 is shown as, for example, an integrated part of the system, providing a dedicated space for storing the charging handle 105 and cable 104 when not in use. According to one embodiment, the electrical compartment 131 includes the electrical components of the system, such as the components described in FIG. 8

The solar panel sections 115 are configured to be extendable or telescopic, allowing them to be deployed for maximum sunlight capture when for example the vehicle is parked, and retracted for compact storage during driving. In alternative configurations, the solar panel sections 115 may also be tiltable as shown in FIG. 1B, enabling further optimization of the angle for solar energy collection based on the sun's position.

FIG. 1D shows a front view of the vehicle 120 with the solar panel system 100 installed on the roof of the vehicle 120. A telescopic solar panel system 110 is depicted in a tilted position, in accordance with embodiments. The tilting is achieved using a tilting system 180, which allows the solar panels to be angled for optimal sunlight capture.

According to one embodiment, the tilting system 180 is located below the telescopic solar panel system 110, as illustrated in FIG. 1D. This arrangement enables the tilting system to support and adjust the angle of the entire solar panel system for optimal sunlight capture.

In accordance with embodiments, the tilting system 180 is configured to adjust the angle of the telescopic solar panel system 110, so the user can maximize energy collection based on the sun's position. For example, when the vehicle is parked, the panels can be tilted to increase solar exposure, and when driving, they can be returned to a flat position to reduce aerodynamic drag.

In accordance with embodiments, an example of a tilting system that may be used is the tilting system 180, which may be implemented as the tilting system 600 shown in FIG. 6A. The tilting system 180/600 includes components such as a worm gear transmission, tilting arms, and locking units, and is configured to provide secure and stable adjustment of the solar panel assembly. This mechanism can be integrated with the telescopic solar panel system 110 to enable dynamic tilting for optimal sunlight capture.

In accordance with embodiments, the tilting system 180 may be operated automatically and/or autonomously or a combination thereof. The telescopic solar panel system 110 can be adapted for different vehicle types or roof rack systems, supporting both fixed and adjustable configurations.

The system 100 may be mounted on a standard roof rack of the vehicle 120, making installation straightforward and avoiding significant modifications to the vehicle.

FIG. 1E shows another configuration of the solar panel system 100, in accordance with embodiments. In this configuration, the fixed cover section 119 is shaped with an aerodynamic profile, for example similar to a cover used for a wheelchair cart. This aerodynamic design helps maintain the overall aerodynamics of the vehicle. From within the fixed cover section 119, the solar panels 115 are deployed outward to the sides. In addition, a tilting system is also connected to this system, enabling the solar panels to be tilted for optimal sunlight capture.

Figure 1F:
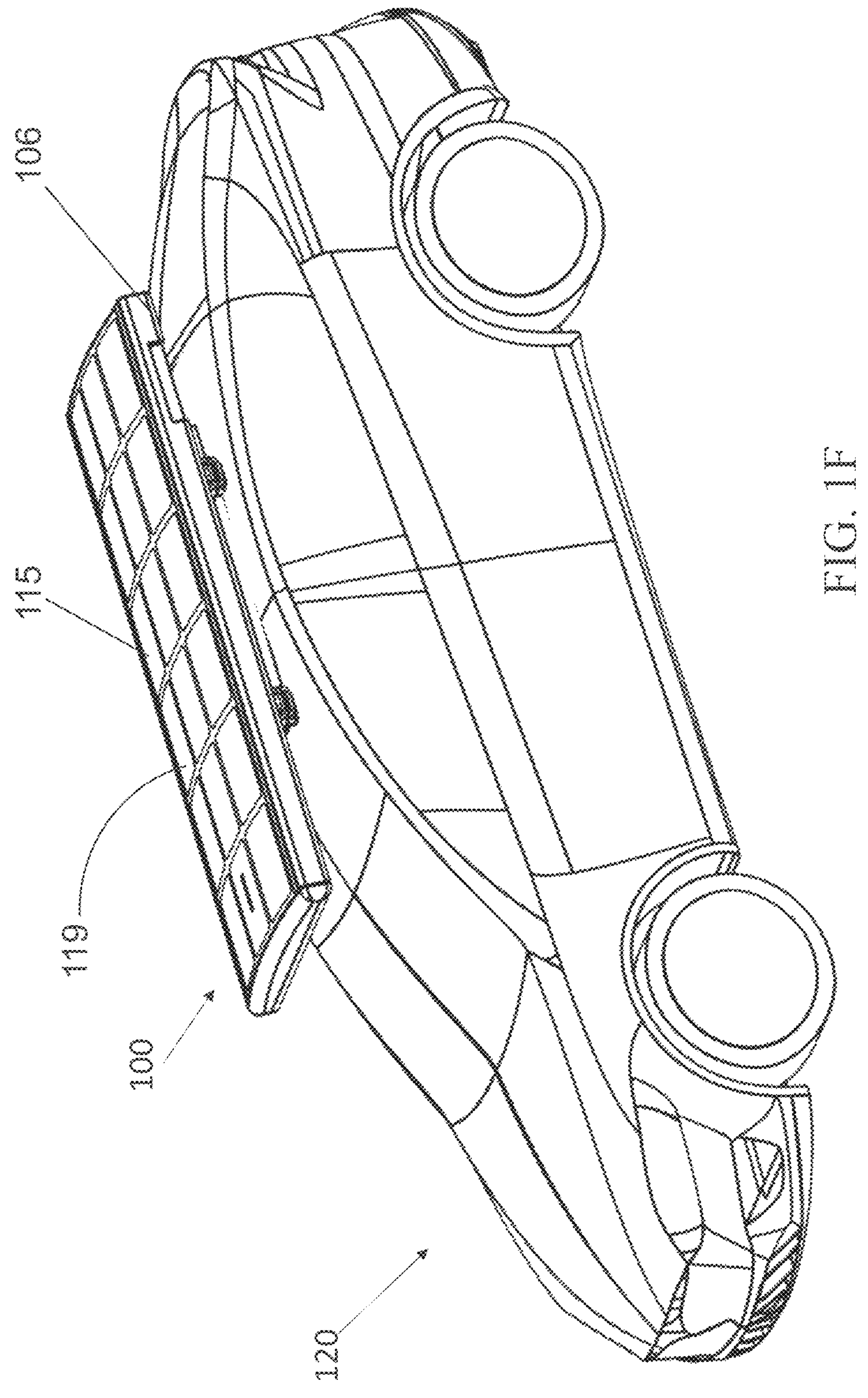

FIG. 1F shows the solar panel system 100 installed on the vehicle 120 while the vehicle 120 is in drive mode. In this configuration, the system 100 is stowed in a closed and low-profile position on the roof of the vehicle 120, maintaining aerodynamics and ensuring safe driving conditions.

Figure 1G:
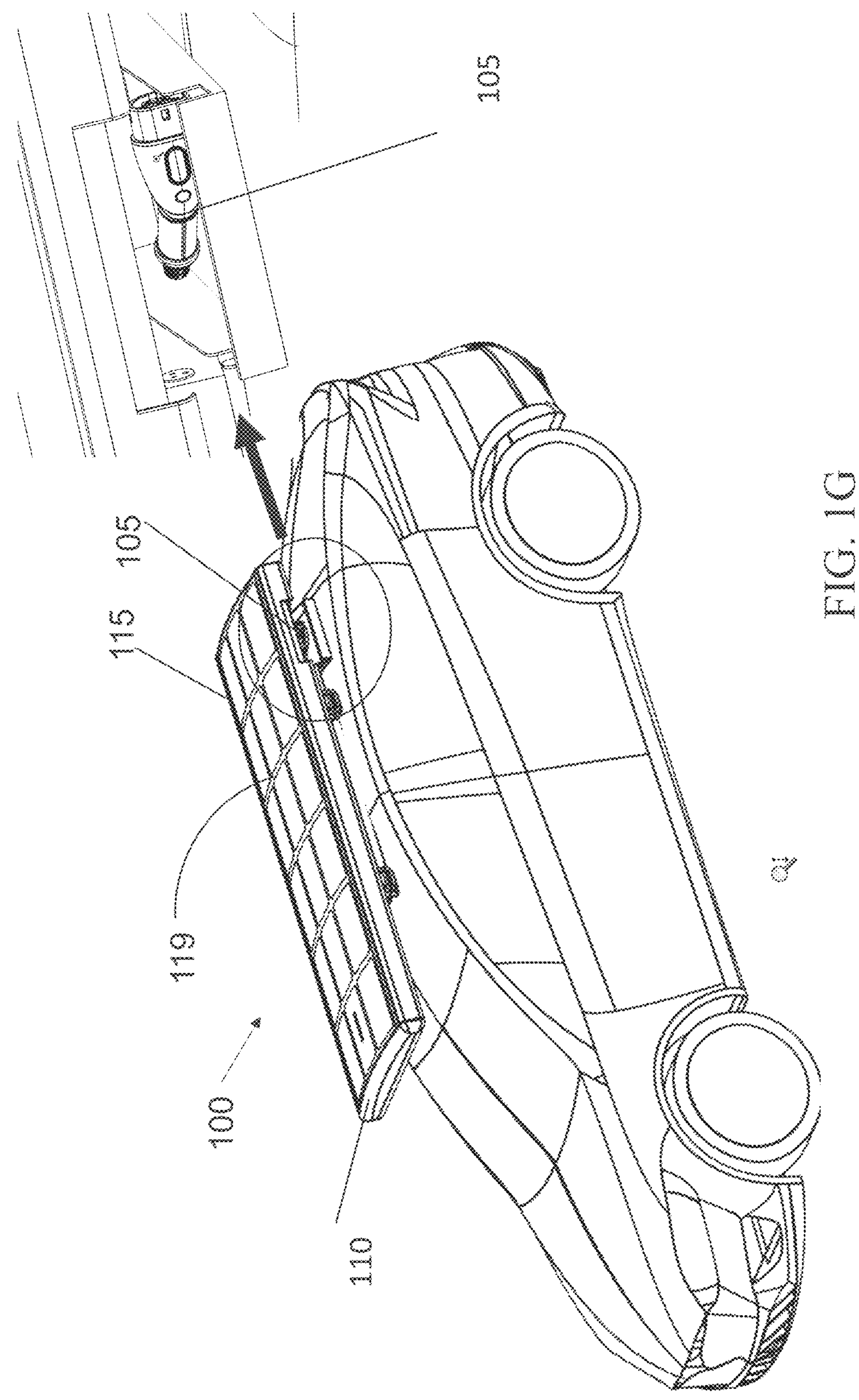

FIG. 1G illustrates the scenario where the vehicle 120 is parked and the user connects the charging cable 106 from the solar panel system 100 to the vehicle's charging port 145 using the charging handle 105. This enables the solar panel system 100 to supply electrical energy directly to the vehicle's battery for charging.

Figure 1H:
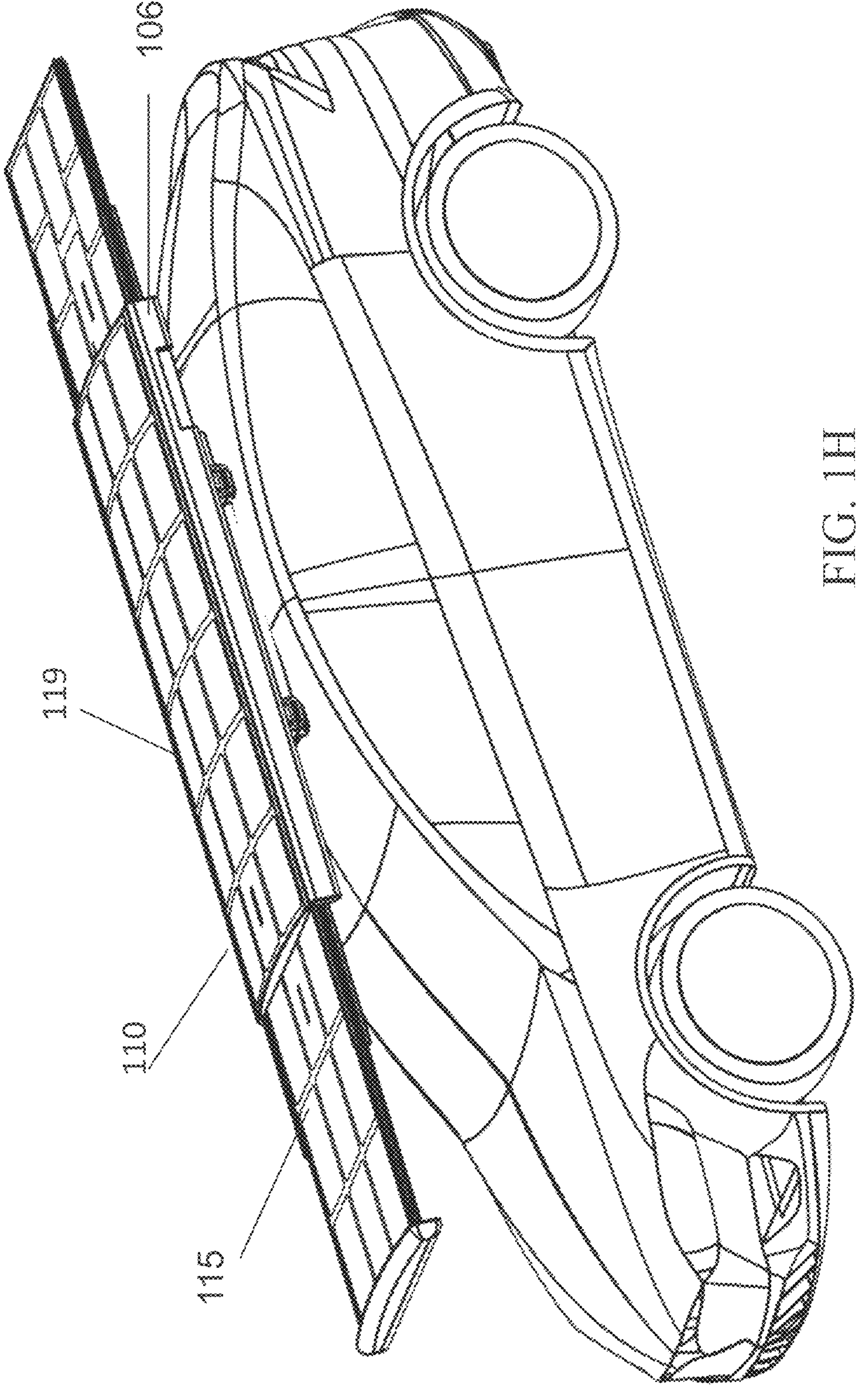
Figure 11:
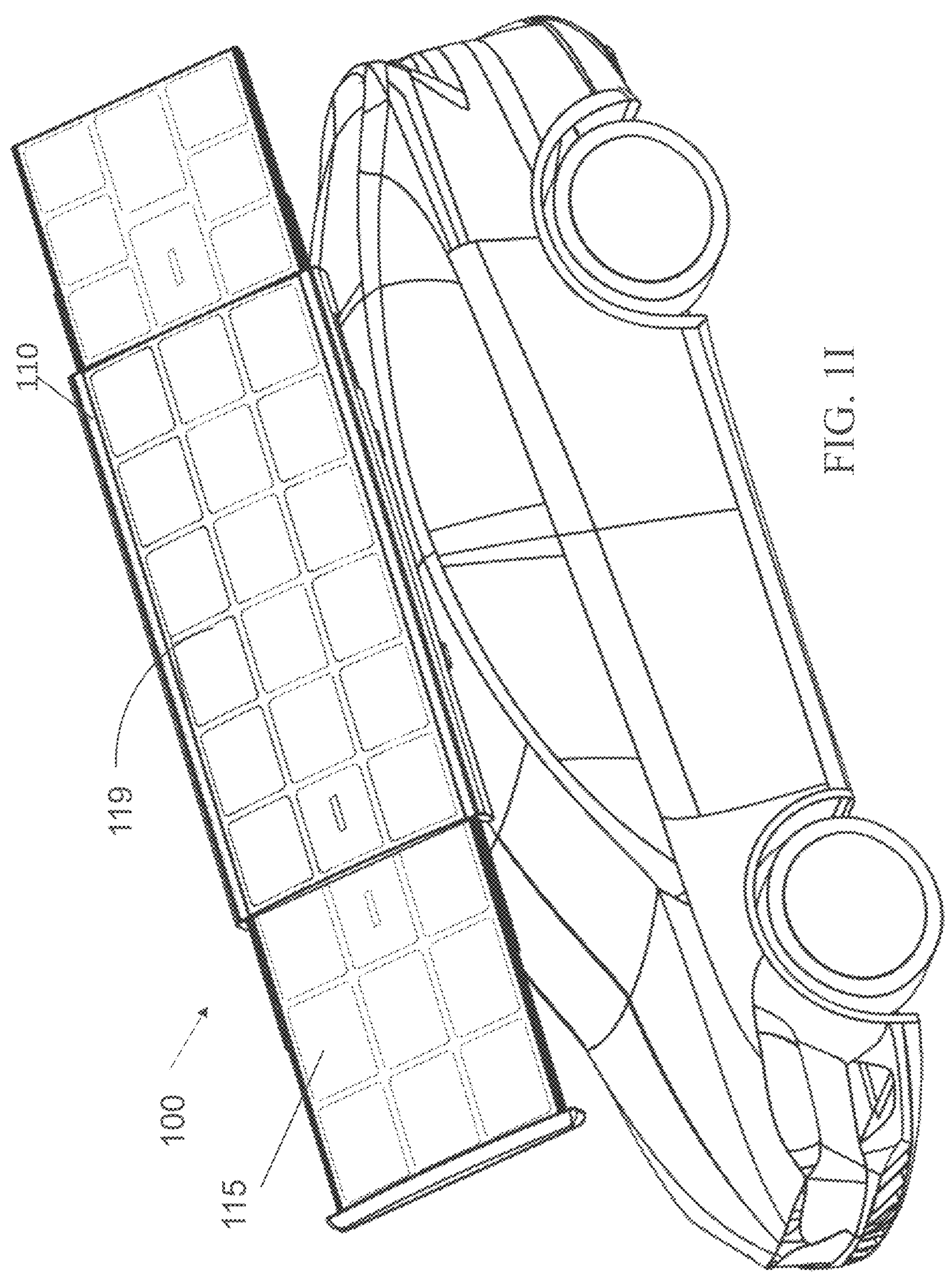

FIG. 1H depicts the solar panel system 100 in a deployment status. The telescopic solar panel system 110 is shown with the panels 115 extended outward from the fixed cover section 119, increasing the surface area available for solar energy capture. This configuration is typically used when the vehicle 120 is parked and optimal sunlight exposure is desired.

FIG. 1I shows the solar panel system 100 in a deployed and tilted position, for example in the morning. The panels 115 are extended and tilted to one side using the tilting system 180, maximizing sunlight capture based on the sun's position at that time of day.

Figure 1J:
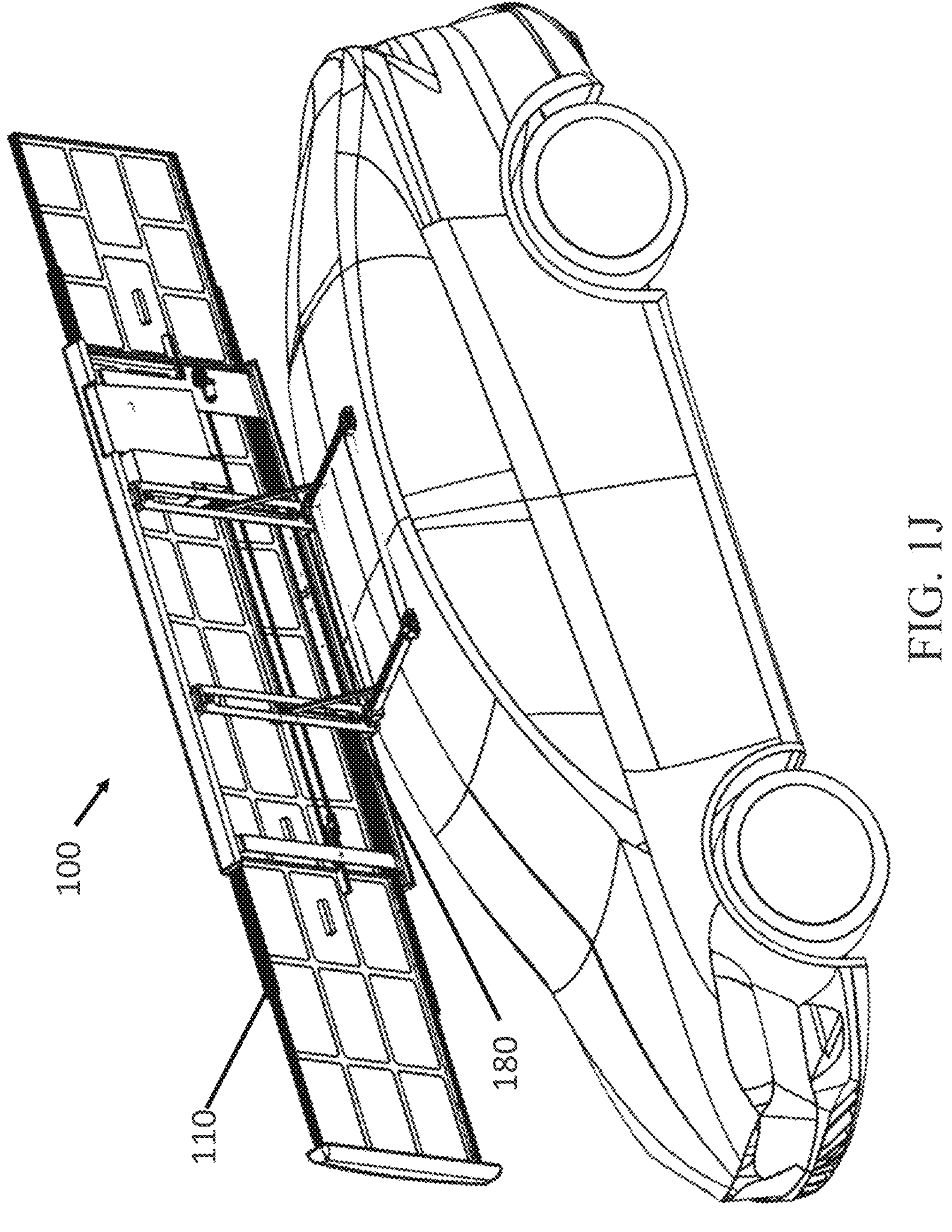

FIG. 1J illustrates the solar panel system 100 deployed and tilted to the opposite side, for example in the afternoon. The panels 115 are extended and tilted in the opposite direction using the tilting system 180, allowing the system to track the sun's movement and continue to optimize energy collection.

Figure 1K:
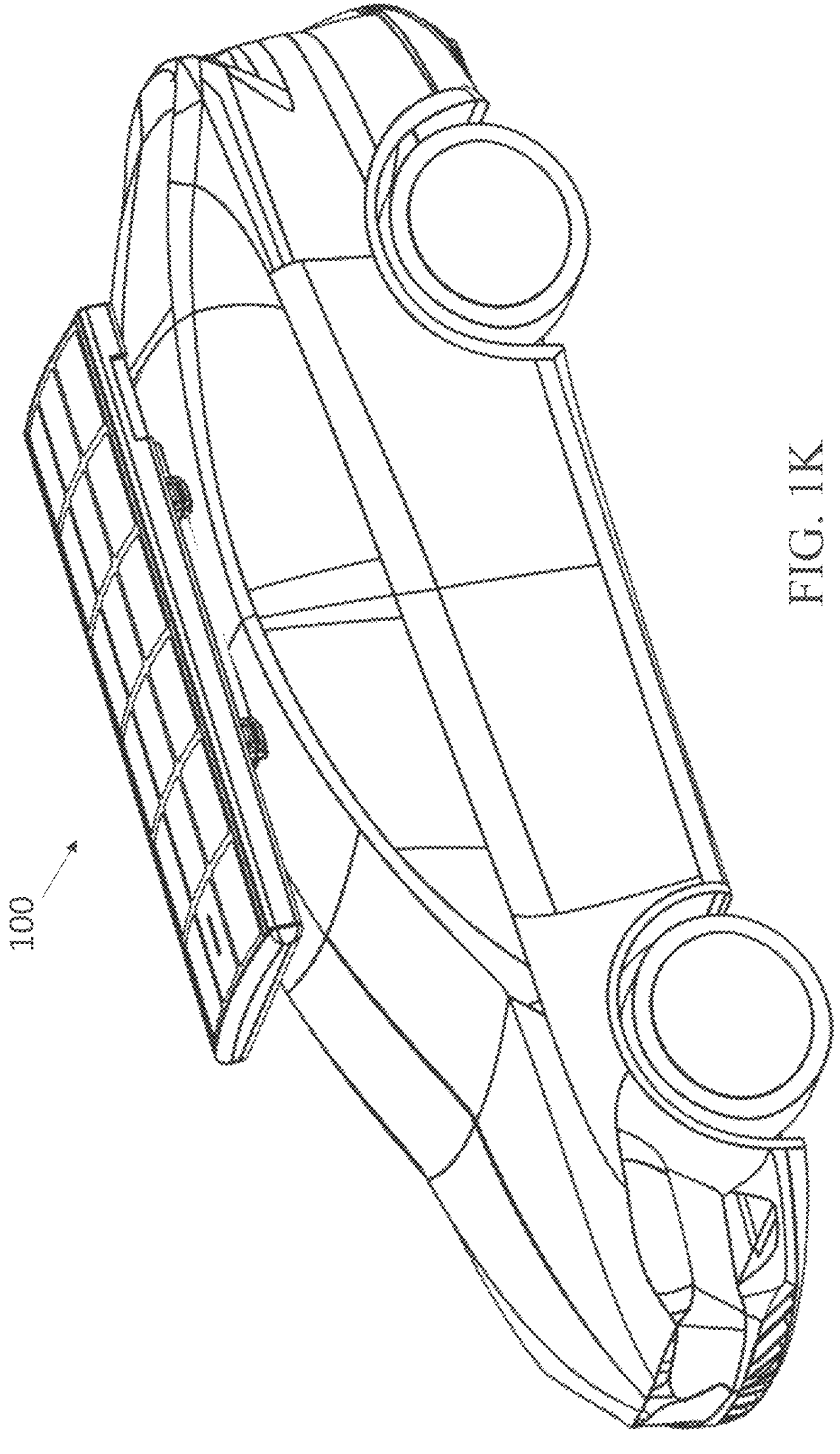
Figure 1L:
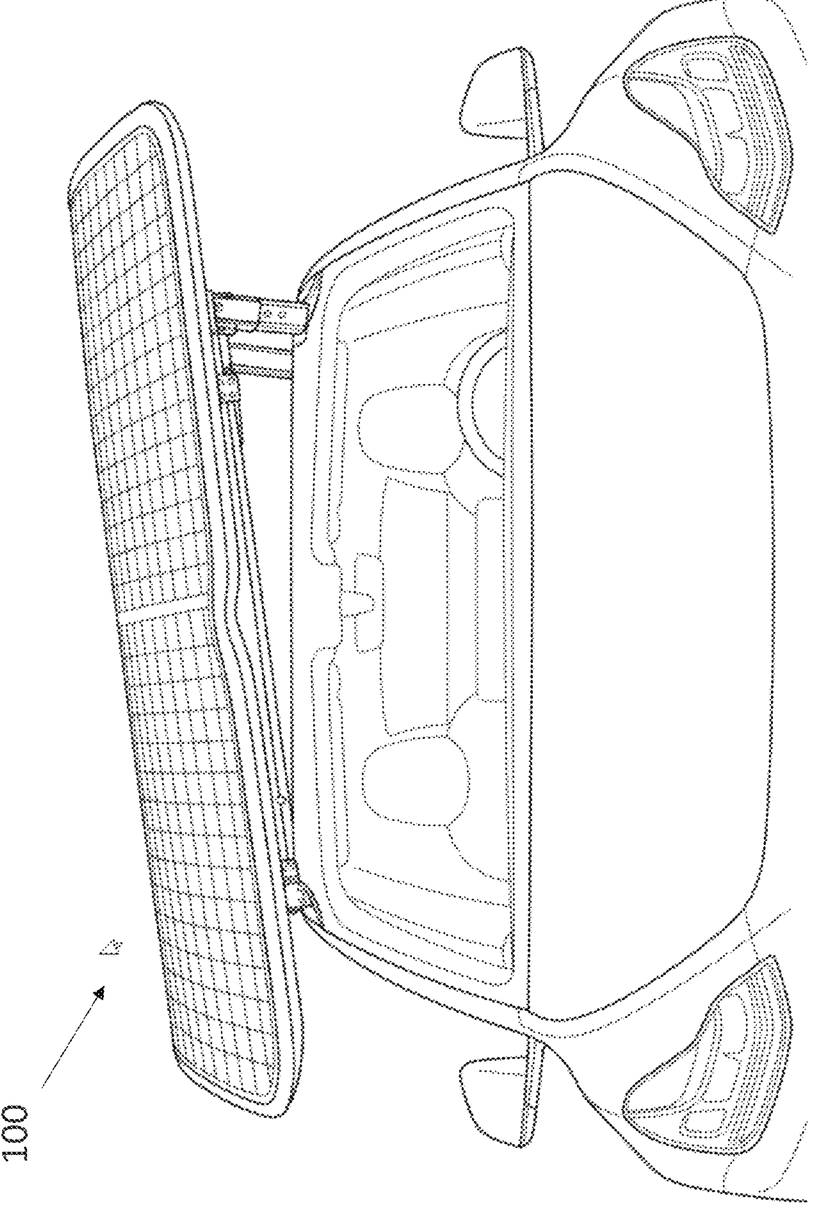
FIGS. 1L-1Q show images of an electric vehicle, such as a Tesla, equipped with the solar panel system in different positions, demonstrating the system's functionality during driving and while deployed and tilted for solar energy collection and vehicle charging, in accordance with embodiments of the invention.
Figure 1M:
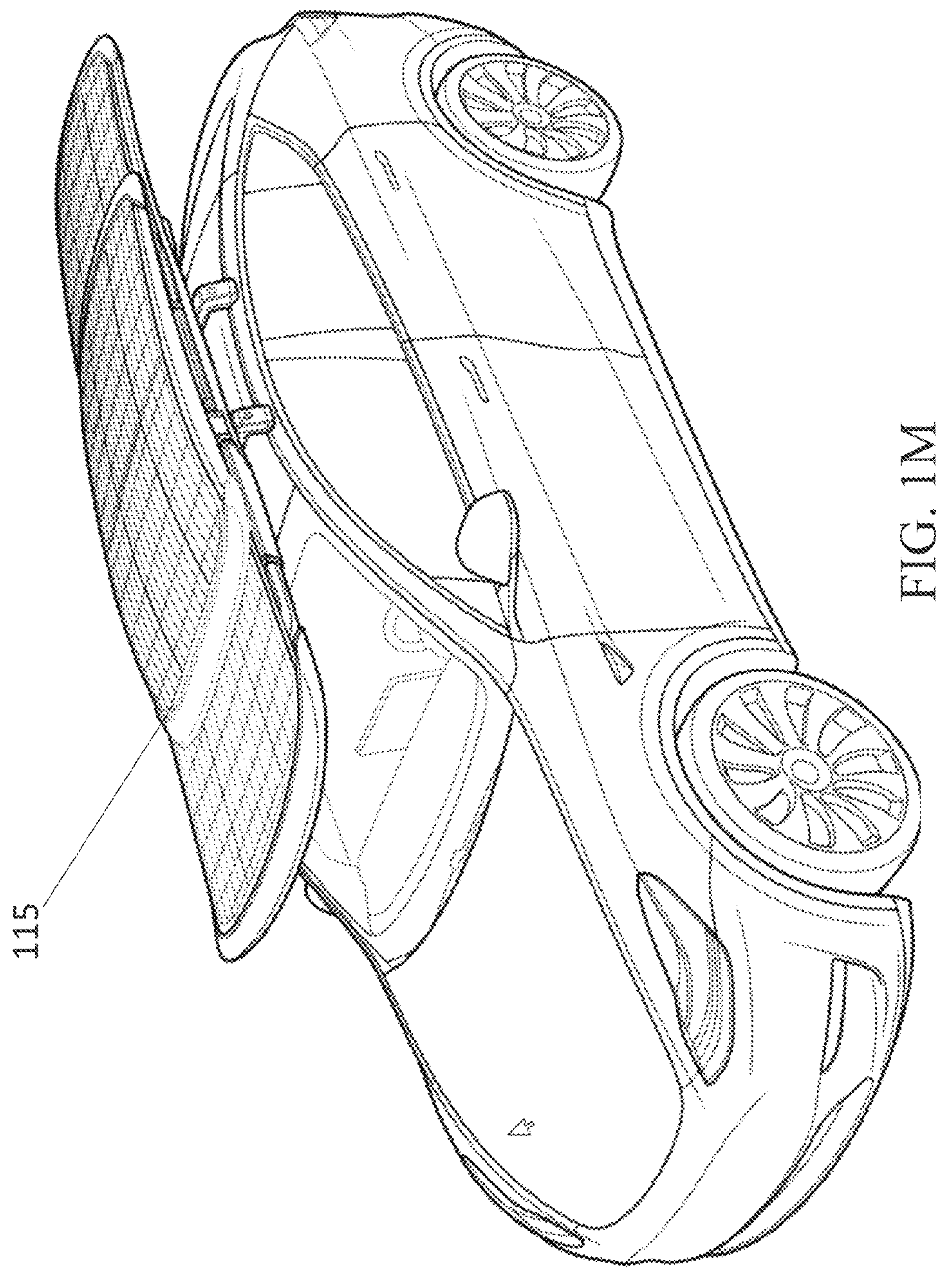
Figure 1N:
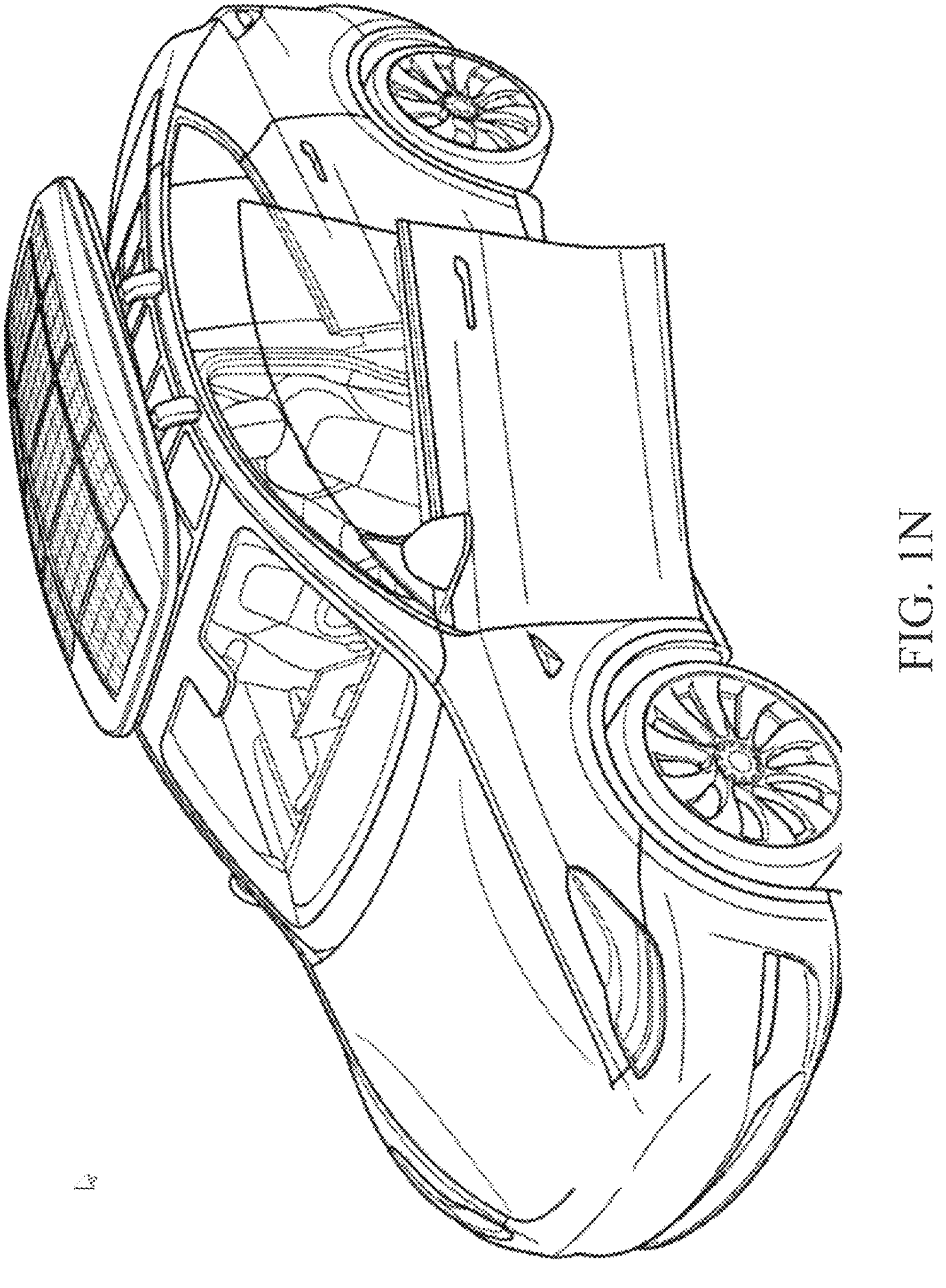
Figure 1O:
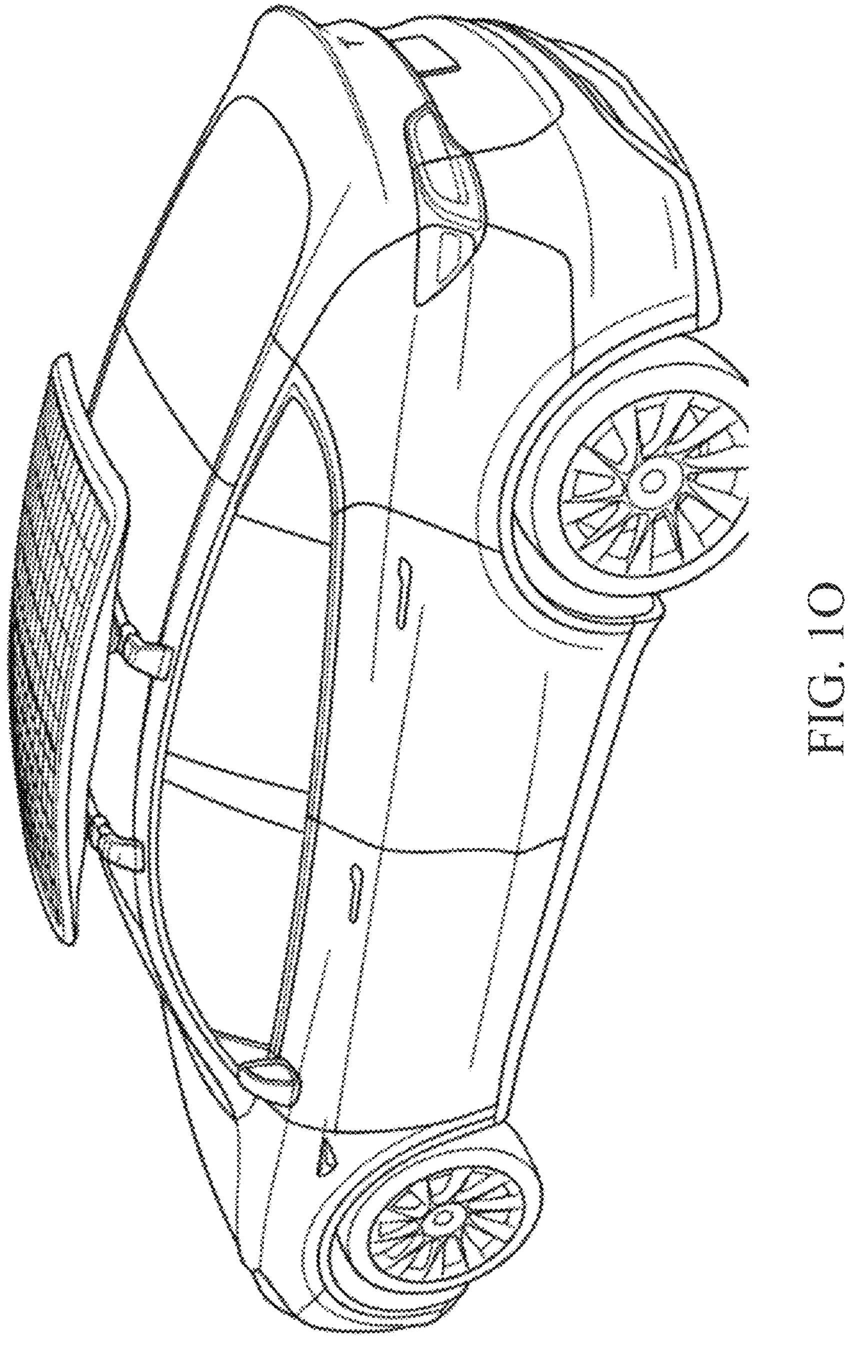
Figure 1P:
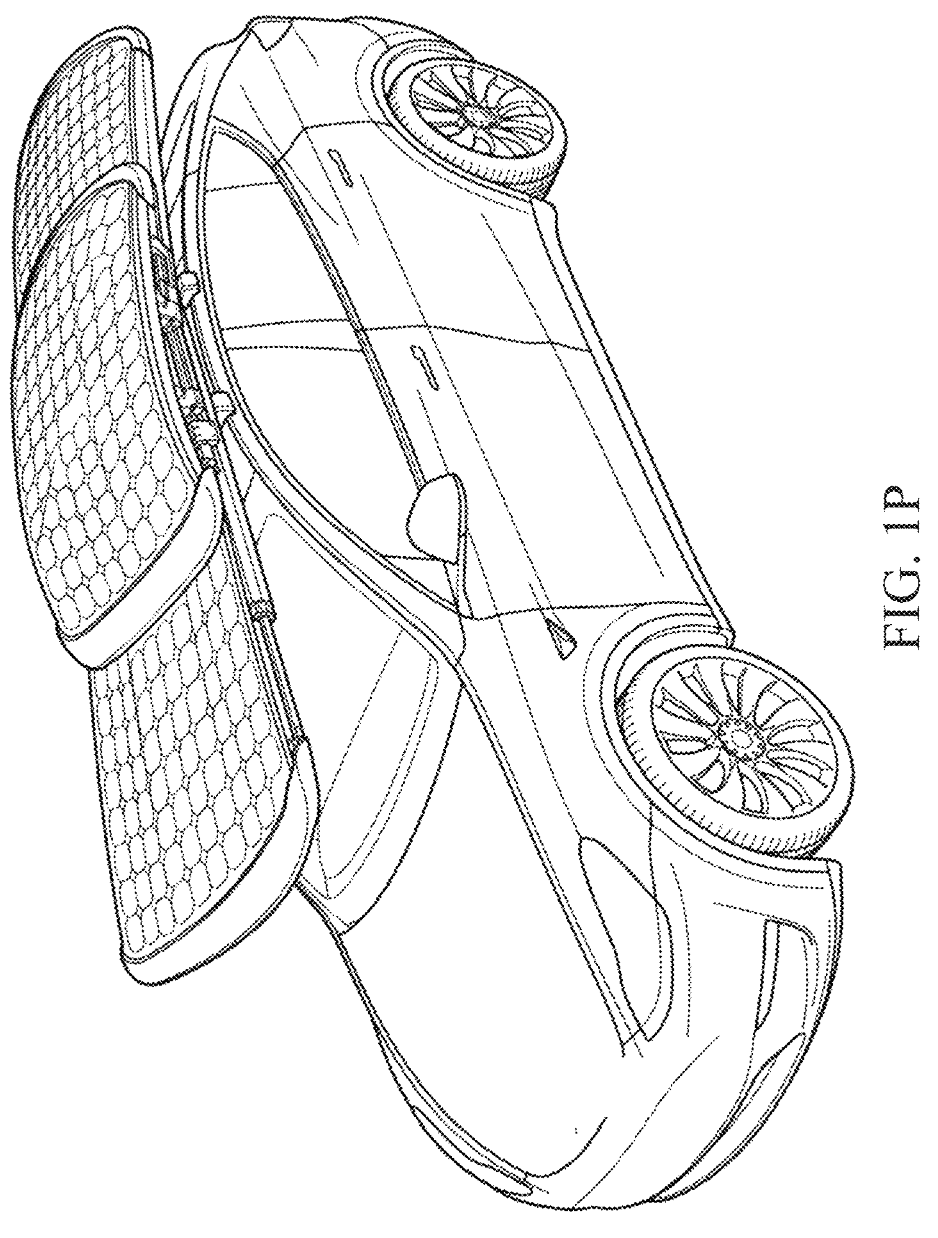
Figure 1Q:
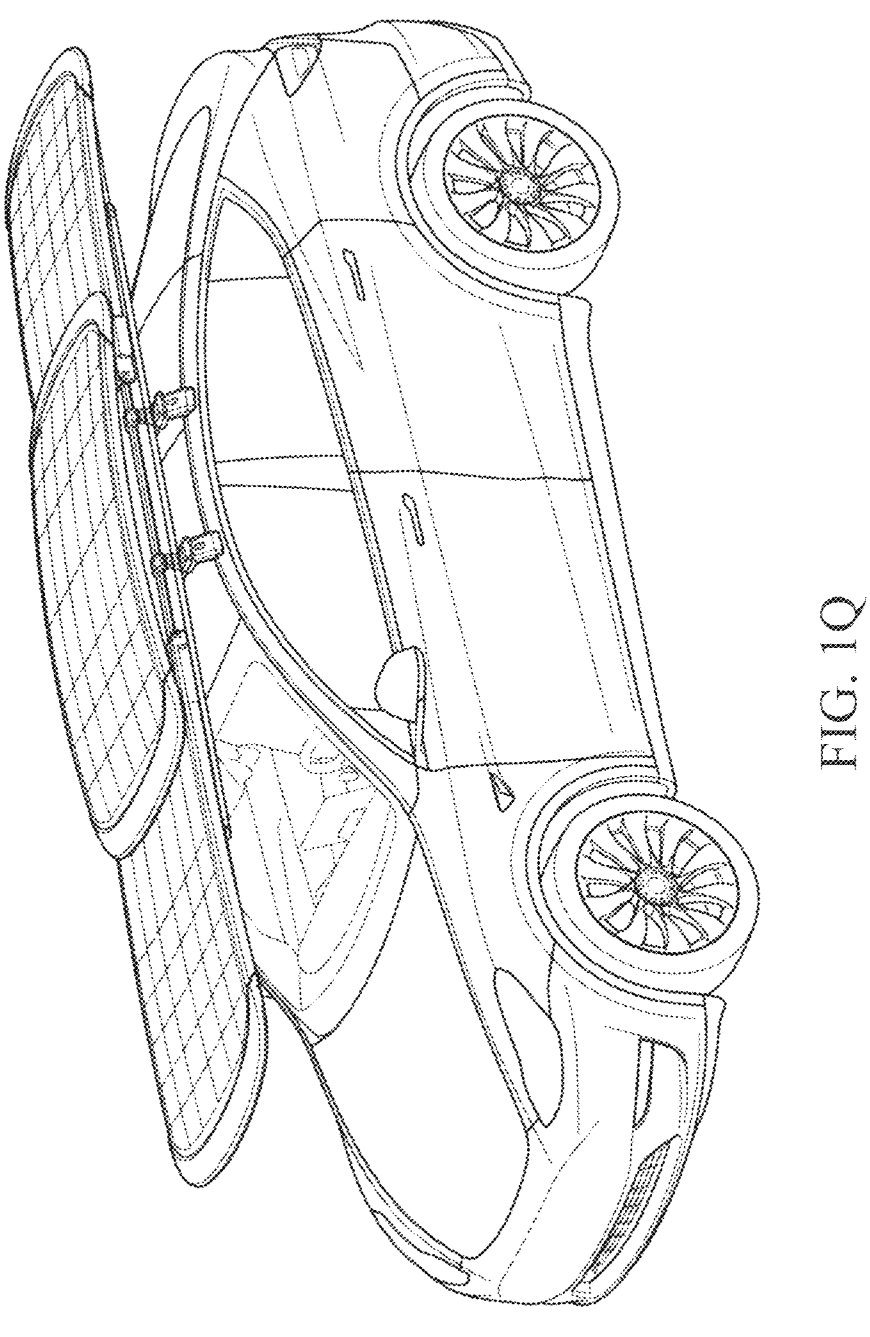

FIG. 1K shows the system 100 after the charging process is completed. The charging cable 106 and handle 105 may be disconnected and stored in the electrical compartment 131, and the panels 115 may be retracted and returned to their stowed position within the fixed cover section 119.

FIGS. 1L-1Q present images of an electric vehicle 120, such as a Tesla, equipped with the solar panel system 100 in various positions. These figures illustrate the system 100 while the vehicle 120 is driving, as well as when the system 100 is tilted and deployed for solar energy collection and vehicle charging. The images demonstrate the versatility and adaptability of the system 100, including the panels 115, charging cable 106, charging handle 105, and fixed cover section 119, in real-world scenarios, both in motion and during stationary charging operations.

Figure 1R:
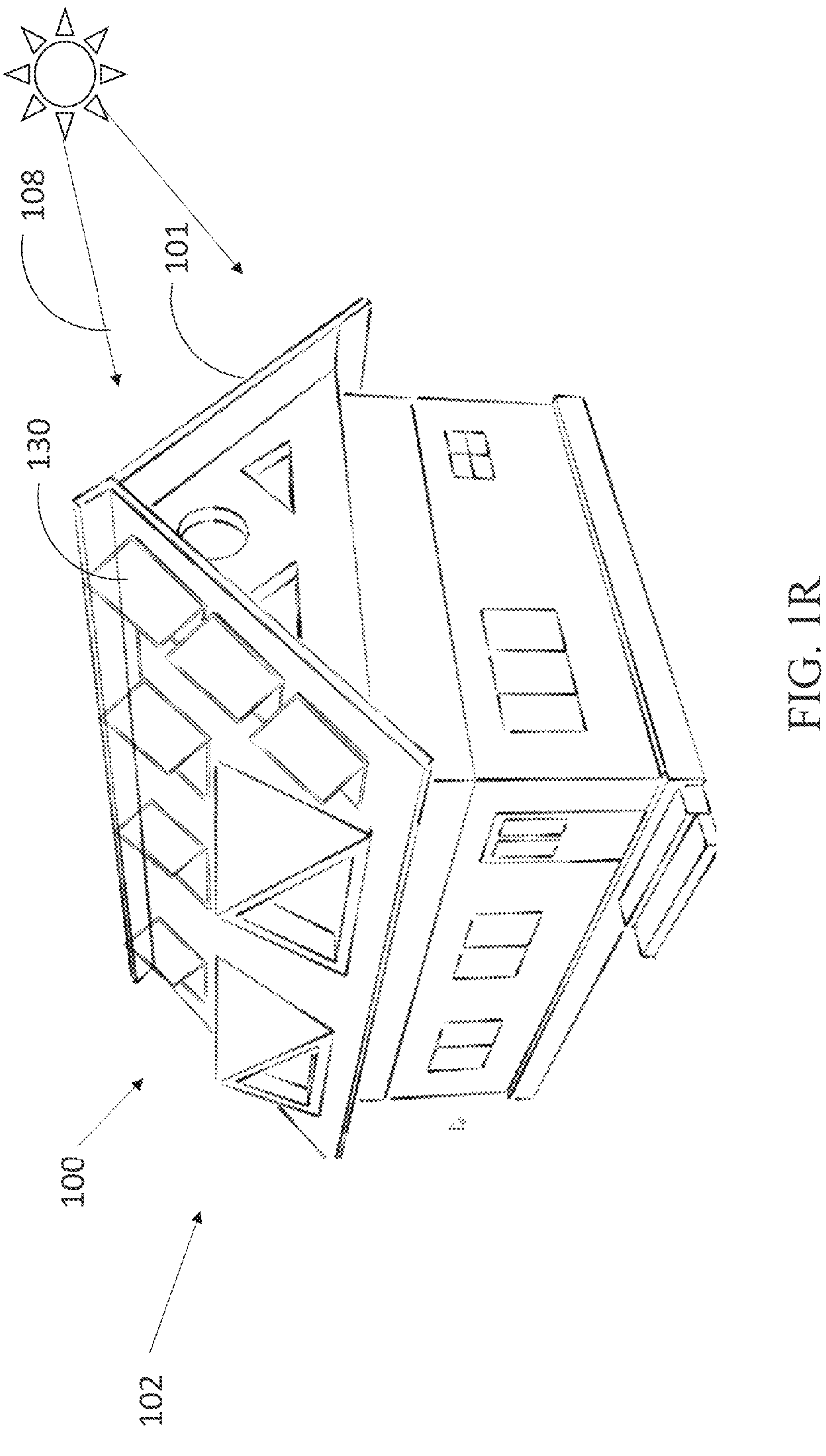
FIG. 1R illustrates a view of a house equipped with a solar panel system for optimized sunlight capture, in accordance with embodiments of the invention.

FIG. 1R shows a view of roof 101 of a house 102 equipped with a panel system such as the solar panel system 100 for optimized sunlight capture. The solar panel system 100 includes a plurality of solar panel devices 130 mounted on the roof 101 of the house, where each solar panel device 130 can be extendable, tiltable, or a combination of both, to maximize exposure to sunlight 108. This configuration is designed to enhance energy collection efficiency by allowing the solar panel devices 130 to be dynamically adjusted and aligned with the sun's trajectory throughout the day.

The solar panel system 100 is strategically positioned on the roof to ensure the system receives an optimal amount of sunlight 108, thereby increasing the overall energy output. In accordance with embodiments, the solar panel system 100 includes a plurality of solar panel devices 130. The extendable and tilting features of the system allow each solar panel device 130 to adjust its position and angle—independently and autonomously, for example—relative to the roof. This configuration enables each device to optimize its orientation based on the sun's position, further enhancing the efficiency of solar energy collection.

These dynamic adjustments play an important role in maintaining efficiency in solar energy capture, particularly during different times of the day and varying seasons. In accordance with embodiments, the solar panel system 100 can be implemented in various configurations, including fixed, tilting, extendable, or a combination of these setups. The configuration illustrated in FIG. 1R enables the plurality of solar panel devices 130 to be angled and/or extended for optimal sunlight capture, which is particularly beneficial for residential applications where roof space and orientation may vary.

The system 100 is designed to be compatible with standard residential rooftops without requiring significant structural modifications. This adaptability makes the system suitable for a wide range of applications, including retrofitting existing homes with solar energy systems. The low-profile design of the solar panel system 100 minimizes visual impact and maintains the aesthetic appeal of the house while providing substantial energy benefits.

Figure 1T:
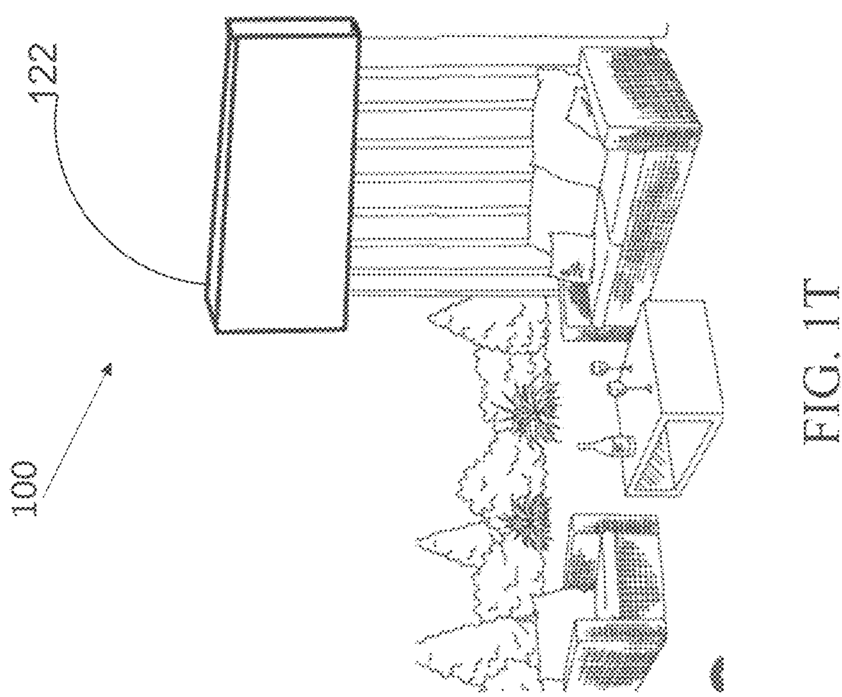
FIG. 1T illustrates a telescopic solar panel cover in a closed, downward-tilted position, in accordance with embodiments of the invention.
Figure 1S:
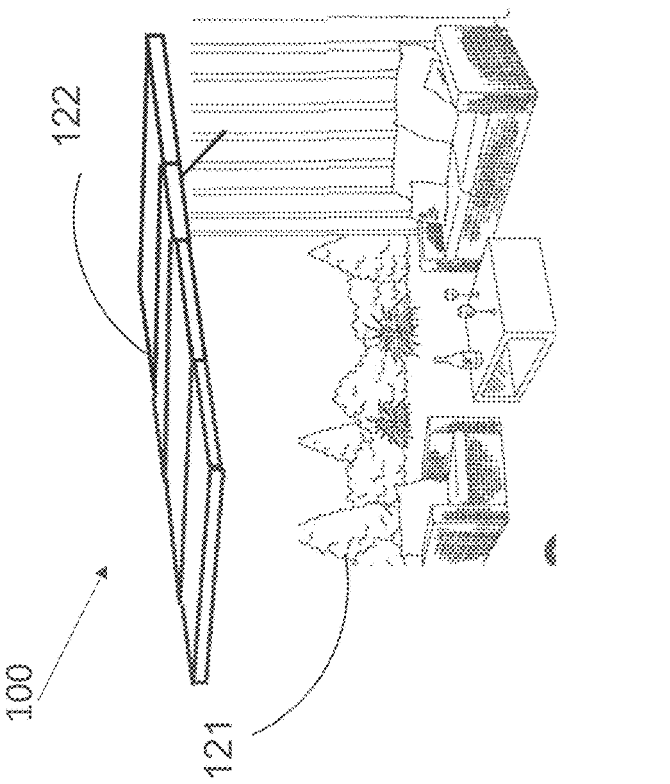
FIG. 1S illustrates a garden area with a telescopic solar panel cover in an open position providing shade, in accordance with embodiments of the invention.

FIGS. 1S and 1T illustrate an additional use for the solar panel system 100, which is capable of opening and closing, for example, in a telescopic manner. This configuration demonstrates the application of the telescopic system as a shade cover, utilizing solar energy for electricity generation.

FIG. 1S shows a garden area 121 with a telescopic cover 122 in an open position, providing shade over a seating area. The telescopic system 122 is coated with photovoltaic cells, as described above, which convert for example solar energy into electricity. This setup allows the system to serve both as a sunshade and as a renewable energy source.

In FIG. 1T, the telescopic system 122 is shown in a closed position, tilted downward. This configuration enables the cover to be retracted when shade is not needed or for protection during adverse weather conditions. In accordance with embodiments, alternative configurations may include different shapes, sizes, or mounting options for the telescopic cover, allowing it to be adapted for patios, balconies, or other outdoor spaces while still providing both shading and solar energy generation.

Figure 1V:
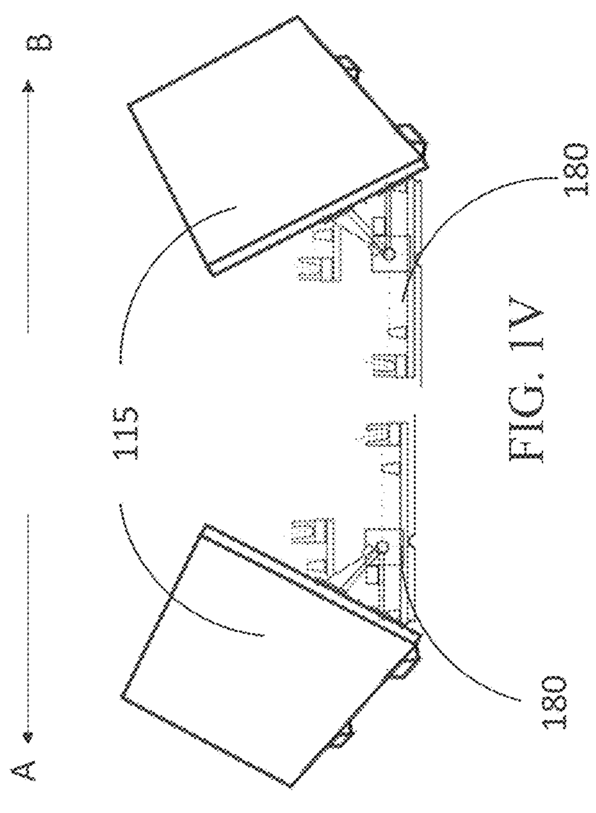
FIG. 1V illustrates a solar panel capable of dual-direction tilting for sun tracking, in accordance with embodiments of the invention.
Figure 1U:
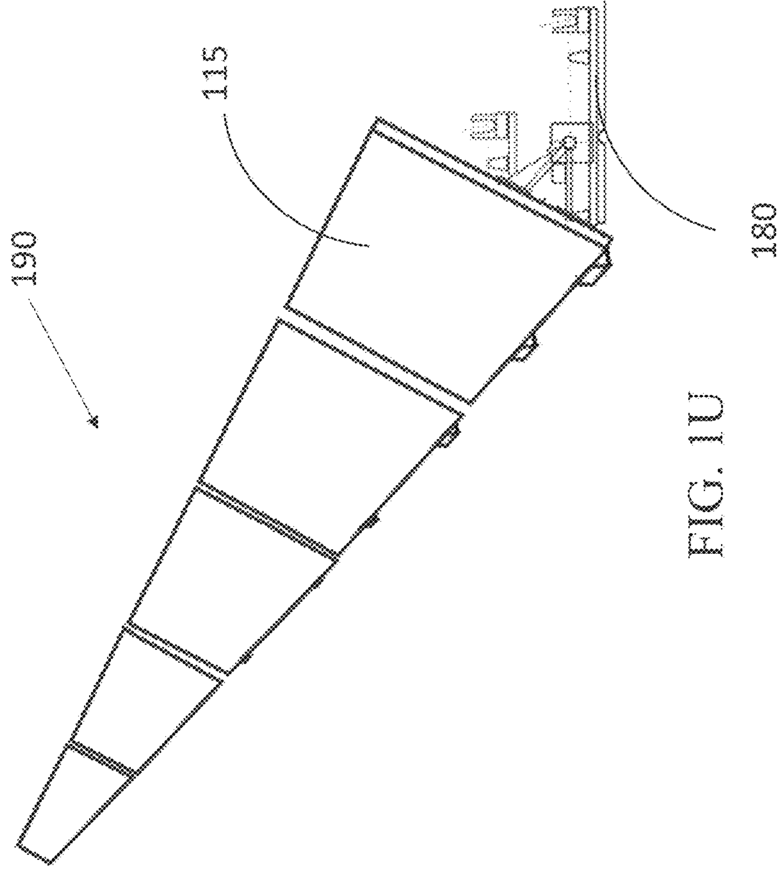
FIG. 1U illustrates a single row of a solar panel array in a solar field with panels connected to a tilting system, in accordance with embodiments of the invention.
Figure 2A:
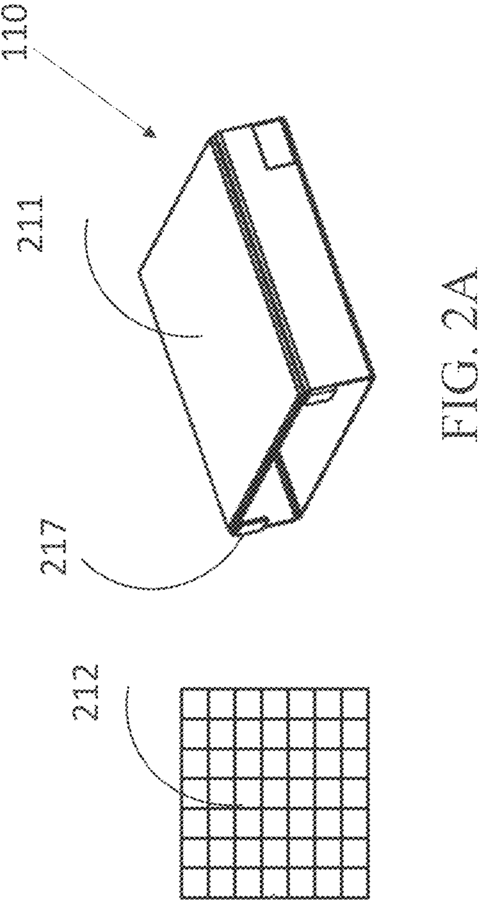
FIG. 2A illustrates a schematic view of the solar panel system's frame, a panel such as a solar panel, and telescopic rail, in accordance with embodiments of the invention.
Figure 2B:
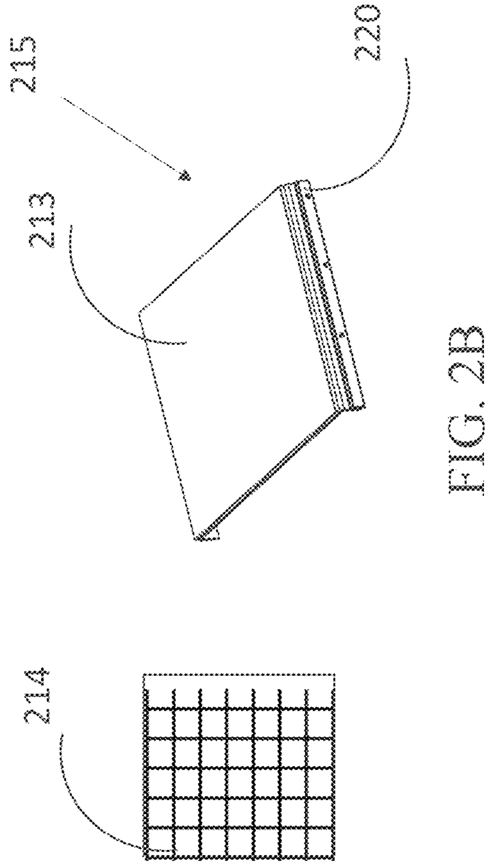
FIG. 2B illustrates a mechanical view of the moving part with solar panel and telescopic rail, in accordance with embodiments of the invention.
Figure 2C:
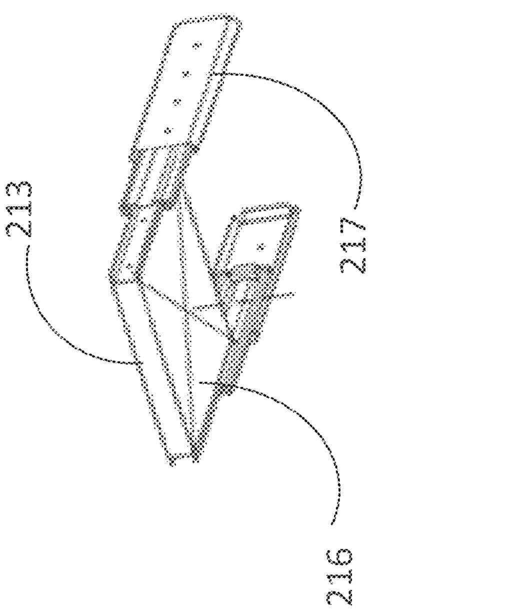
FIG. 2C illustrates a view of a telescopic solar panel system with drawer, fixed rail, and sliding frame, in accordance with embodiments of the invention.

FIG. 1U illustrates a single row of panel array such as a solar panel array 190 in a solar field. In accordance with embodiments, the panels such as solar panels 115 are shown mounted in a linear arrangement, with each panel connected to a tilting system such as tilting system 180. The tilting system 180 is configured to tilt the panels 115 toward the sun to maximize energy capture, adjusting their orientation as needed throughout the day. The array 190 is designed for installation in an open field or similar environment, where the panels 115 can be optimally oriented for sunlight exposure FIG. 1V shows a panel such as a solar panel 115 that can be tilted in two directions, either toward side A or side B, depending, for example, on the sun's angle and the time of day. The panel 115 is connected to a tilting system such as tilting system 180, which is configured to tilt the panel according to the required direction for optimal sunlight capture. This dual-direction tilting capability allows the solar panel 115 to track the sun's movement, for example from east to west, further increasing the efficiency of solar energy collection. In accordance with embodiments, FIGS. 2A-2C illustrate the structure and components of the telescopic solar panel system 110, in accordance with embodiments. Specifically, FIGS. 2A-2C demonstrate how the telescopic solar panel system is constructed from a combination of fixed and moving elements, each configured to provide reliable support, efficient energy capture, and flexible deployment.

FIG. 2A shows frame 211 of the telescopic solar panel system 110 which may be constructed for example from a metal frame or another suitable material. This frame 211 serves as the main support structure for the system. On the upper portion of the frame 211, a panel 212, such as solar panel matrix is mounted. The solar panel matrix consists of an array of photovoltaic cells arranged in for example a grid pattern, designed to capture solar energy efficiently. According to one embodiment, inside the frame 211, part of a telescopic rail system 217 is installed, for example two telescopic rail systems 217 on the sides. The telescopic rail 217 is configured to enable the extension and retraction of the panels 212 such as the solar panels, and/or panels 115 (shown for example in FIGS. 1B-IC), allowing the system to expand for increased surface area during operation and retract for compact storage.

It should be understood that the panel 683 may be any type of panel, such as a mirror panel, shading panel, display panel, or other functional or structural panel, and the solar panel is provided here as just one example.

In accordance with embodiments, the frame 211, the panel 212, and telescopic rails 217 may each have alternative shapes, sizes, or materials to suit different applications.

FIG. 2B depicts one of the panels 215 which comprises a moving part/telescopic drawer 213 of the telescopic system 110. In accordance with embodiment, there may be one, two or four or more moving parts, depending on the specific configuration. Each moving part/telescopic drawer 213 may be covered by a panel such as solar panel photovoltaic cells 214, which may also be constructed as a grid of photovoltaic cells. On the sides of the moving part 213 configured as a telescopic drawer, the moving section of the telescopic rail 220 is attached. The telescopic rail moving part 220 is configured to slide within the fixed rail 217, enabling the panel 115/215 to extend outward from the central frame 211. In accordance with embodiments, the panel 115, solar panel photovoltaic cells 214, and telescopic rail moving part 220 may be adapted in shape, size, or material for various installation requirements.

FIG. 2C shows a perspective upper side view of the assembly of the moving part 213 with the fixed rail 217 and the moving frame 216. The moving part/telescopic drawer 213 is configured to slide along the fixed rail 217, guided by a moving frame 216, which ensures smooth and stable movement during extension and retraction. This arrangement allows the panels such as the solar panels to be deployed outward for maximum sunlight exposure and retracted for protection or transport. In accordance with embodiments, the telescopic drawer 213, fixed rail 217, and moving frame 216 may be implemented in different forms or with additional features to enhance performance and adaptability.

Figure 2D:
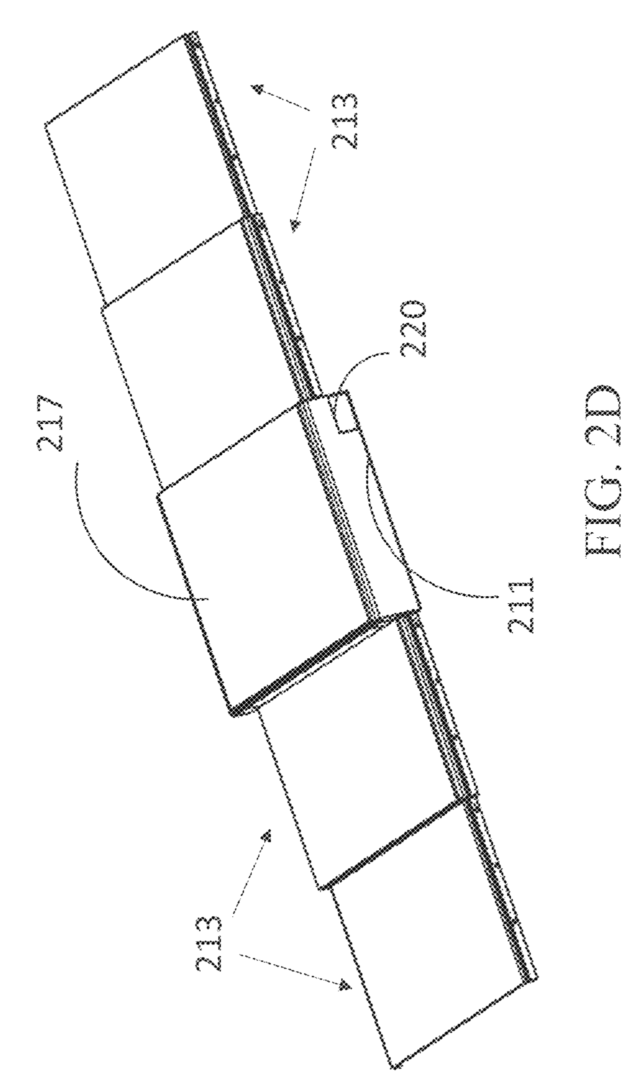
FIG. 2D illustrates a side view of a telescopic solar panel system with fixed base and extendable panels, in accordance with embodiments of the invention.

FIG. 2D illustrates the assembled telescopic solar panel system 110, in accordance with embodiments. The central frame 211 is fixed part which may include a static panel 217 such as a solar panel on top of it, and from the central frame 211, moving part(s)/telescopic drawer(s) 213 extend outward. In FIG. 2D there are two telescopic parts 213 extending in one direction and two telescopic parts 213 extending in the opposite direction. This configuration allows the solar panel system to expand from the central frame 211, increasing the total surface area available for solar energy capture. In accordance with embodiments, the number, size, and direction of the telescopic parts 213 may be adapted to suit different installation requirements and applications.

Figures 3A, 3B:
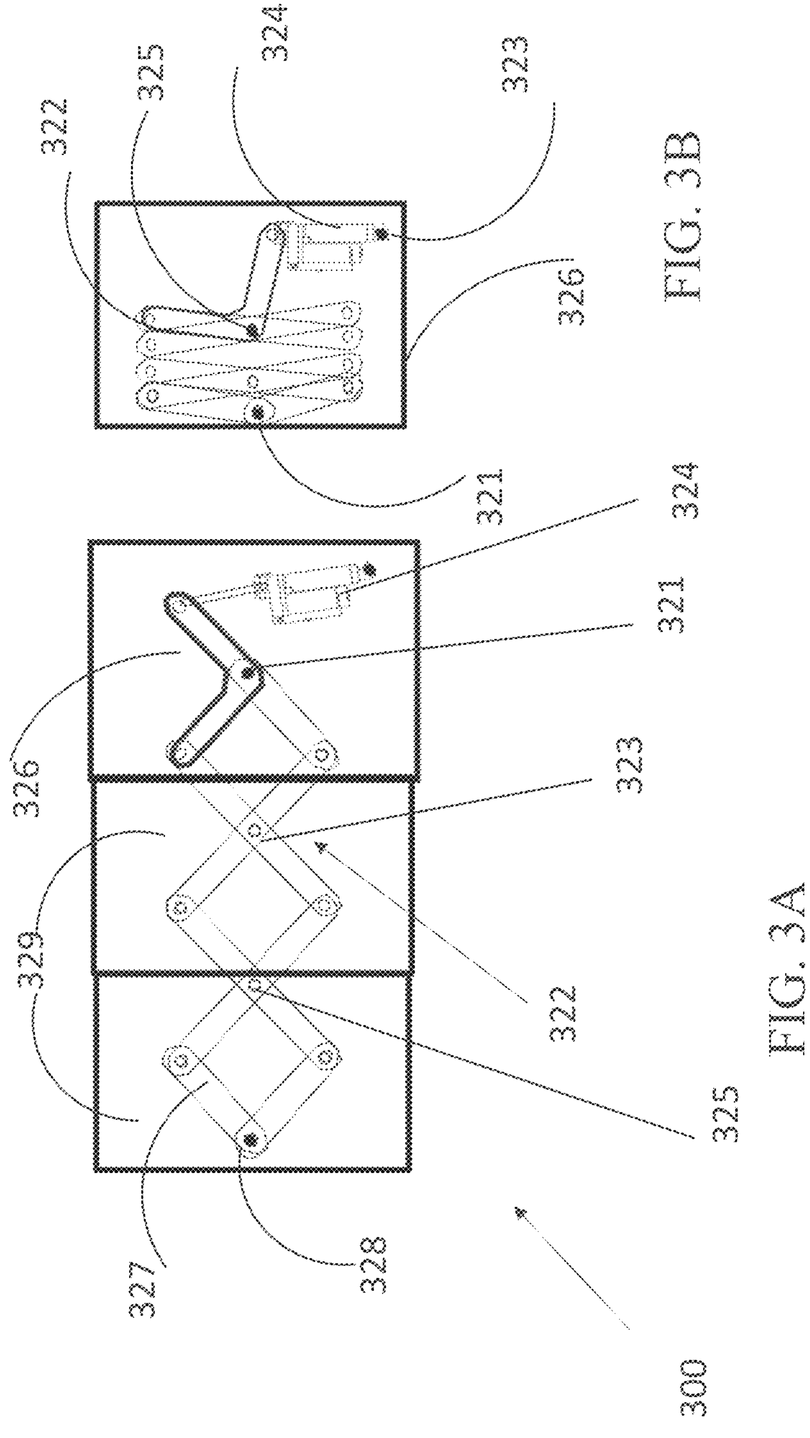
FIG. 3A illustrates a mechanical upper view of a scissor mechanism for solar panel assemblies in an open position, in accordance with embodiments of the invention.
FIG. 3B illustrates a mechanical upper view of the scissor mechanism in a close position, in accordance with embodiments of the invention.

FIG. 3A shows a telescopic panel deployment mechanism such as a telescopic solar panel deployment system 300, in accordance with embodiments, in an open position, where a scissor mechanism 322 is fully retracted, with the arms 327 extended to the left, illustrating the synchronized extension of the moving part 329 for solar panel deployment such as solar panel deployment. This configuration is particularly suited for applications where compact storage and efficient deployment are required, such as on vehicles or building rooftops as shown in FIGS. 1B-1C.

In accordance with embodiments, the scissor mechanism 322 is constructed from a series of interconnected arms arranged in a crisscross pattern. This arrangement allows the mechanism to expand and contract in a coordinated manner, providing smooth and controlled movement for panels such as the solar panels 115 attached to the system.

In accordance with embodiments, the scissor mechanism 322 comprises a series of interconnected arms 327 arranged in a crisscross pattern, joined at pivot points 325, 323, 321, and 328, and actuated by an actuator such as an electric actuator 324, enabling synchronized extension and retraction of a moving part 329 relative to a fixed body 326 for controlled deployment of panels such as solar panels.

In accordance with embodiments, the fixed body 326 serves as the stationary base of the mechanism 300. In accordance with embodiments, the fixed body 326 is securely mounted to a supporting structure, such as a vehicle roof or a building surface, providing the necessary stability and anchoring for the deployment system.

In accordance with embodiments, the Pivot points 325, 323, 321, and 328 are strategically positioned joints that connect the arms of the scissor mechanism 322 to each other and to the fixed body 326. In accordance with embodiments, these pivot points enable the arms to rotate relative to one another, facilitating the characteristic scissor action that drives the extension and retraction of the mechanism.

The electric actuator 324 is an electrically powered device, such as a linear actuator or electric piston, coupled to the scissor mechanism 322, for example at pivot point 323. In accordance with embodiments, the actuator 324 initiates and controls the movement of the scissor mechanism 322 by applying force to the arms, causing the mechanism to either expand or contract.

One or more moving parts, such as moving part 329 is attached to the outer end of the scissor mechanism 322. In accordance with embodiments, as the scissor mechanism 322 extends, the moving part 329 is displaced outward from the fixed body 326. This moving part 329 typically supports one or more panels such as solar panels, enabling them to be deployed for optimal sunlight exposure or retracted for compact storage.

The arms 327 are the individual structural members that make up the scissor mechanism 322. In accordance with embodiments, each arm 327 is connected to adjacent arms at the pivot points, forming the extendable lattice structure that enables the synchronized movement of the mechanism.

In operation, in accordance with embodiments, the deployment process begins when the electric actuator 324 is energized, either manually or via an automated control system or a combination thereof. The actuator 324 extends, applying force to the scissor mechanism 322 at pivot point 323. This action causes the arms 327 to rotate about the pivot points 325, 323, 321, and 328, resulting in the synchronized expansion of the scissor mechanism 322. As the mechanism expands, the moving parts 329 are pushed outward from the fixed body 326, carrying the attached panels, such as solar panels into their deployed position for maximum sunlight capture. When retraction is desired, the actuator 324 reverses direction, drawing the arms 327 back together and returning the moving parts 329 to its stowed position within the compact footprint of the fixed body 326. This coordinated movement ensures reliable, efficient, and space-saving deployment and retraction of the solar panels, in accordance with embodiments.

Figure 3D:
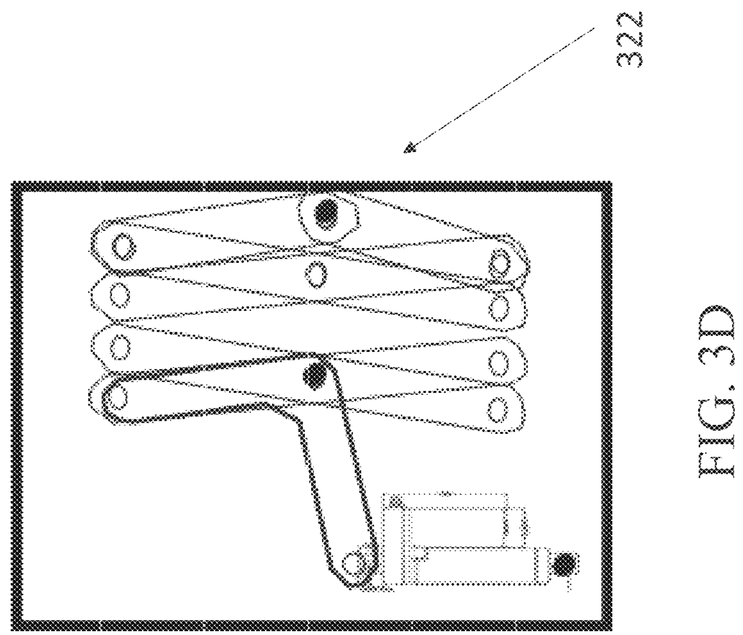
FIG. 3D illustrates an upper view of the scissor mechanism in a closed position, in accordance with embodiments of the invention.
Figure 3C:
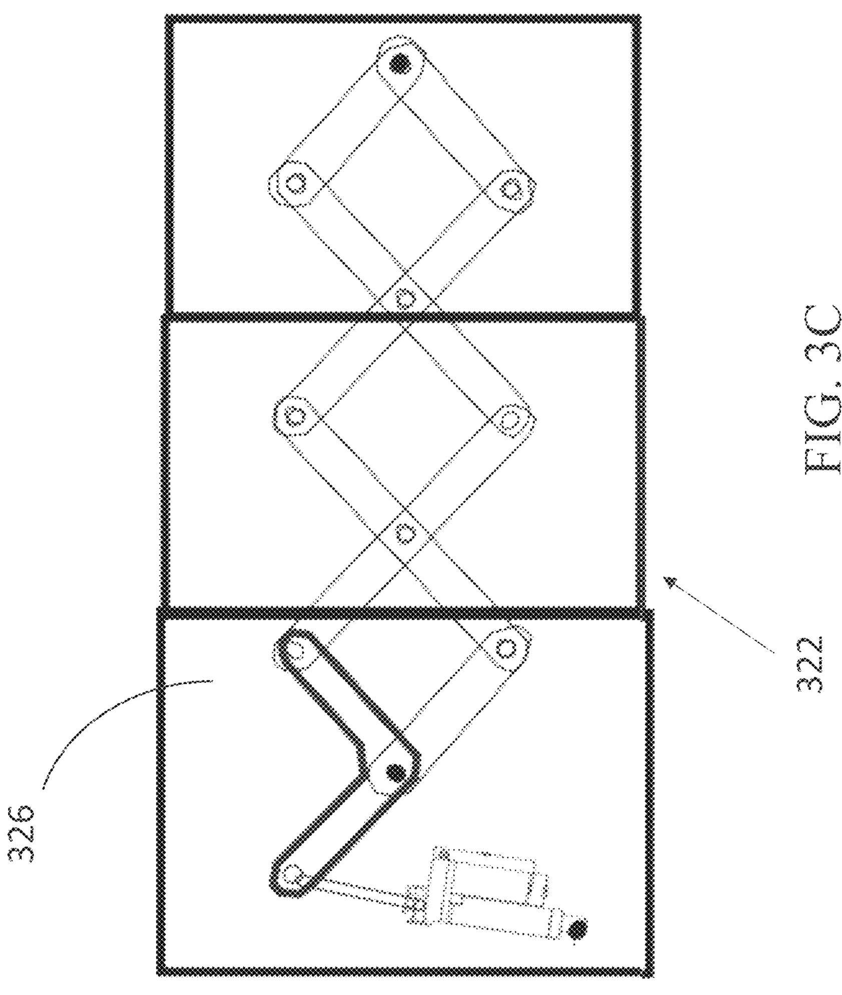
FIG. 3C illustrates an upper view of the internal layout of the telescopic system in an open position, in accordance with embodiments of the invention.

FIG. 3C shows the scissor mechanism 322 in an open configuration, opened to the right direction, with the fixed body 326 positioned on the left and the moving parts extended to the right. FIG. 3D shows the mechanism in a closed position. This represents a mirror image of the mechanism described in the previous FIG. 3A and FIG. 3B.

Figure 3E:
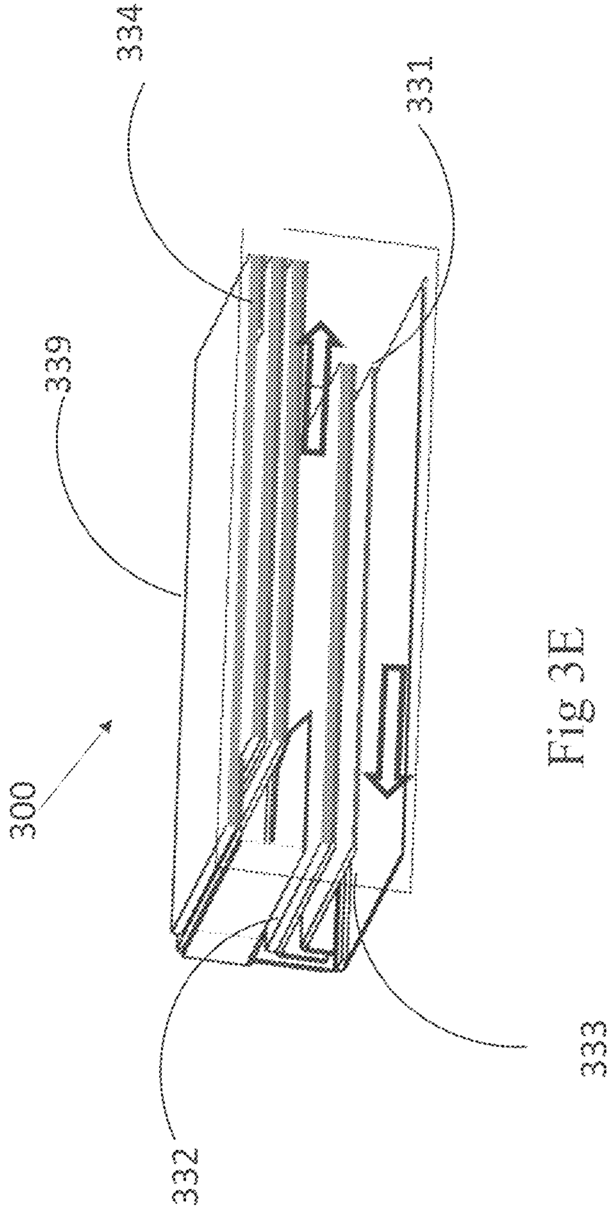
FIG. 3E illustrates the telescopic solar panel deployment mechanism within a housing, in accordance with embodiments of the invention.
Figure 5B:
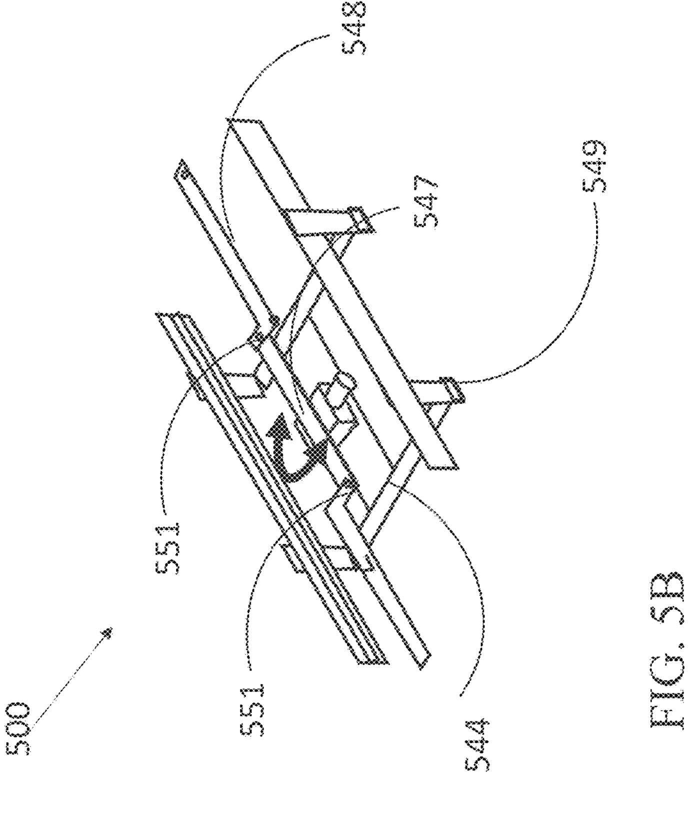
FIG. 5B illustrates a mechanical upper view of the solar panel frame in an open position, in accordance with embodiments of the invention.
Figure 5A:
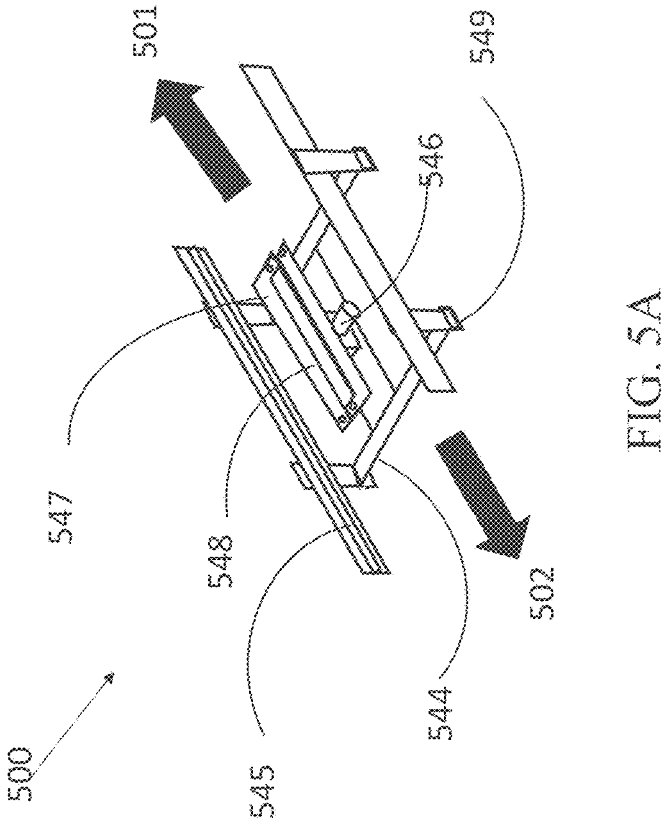
FIG. 5A illustrates a mechanical upper view of a low-profile aerodynamic solar panel frame with telescopic rails, in accordance with embodiments of the invention.
Figures 5C, 5D:
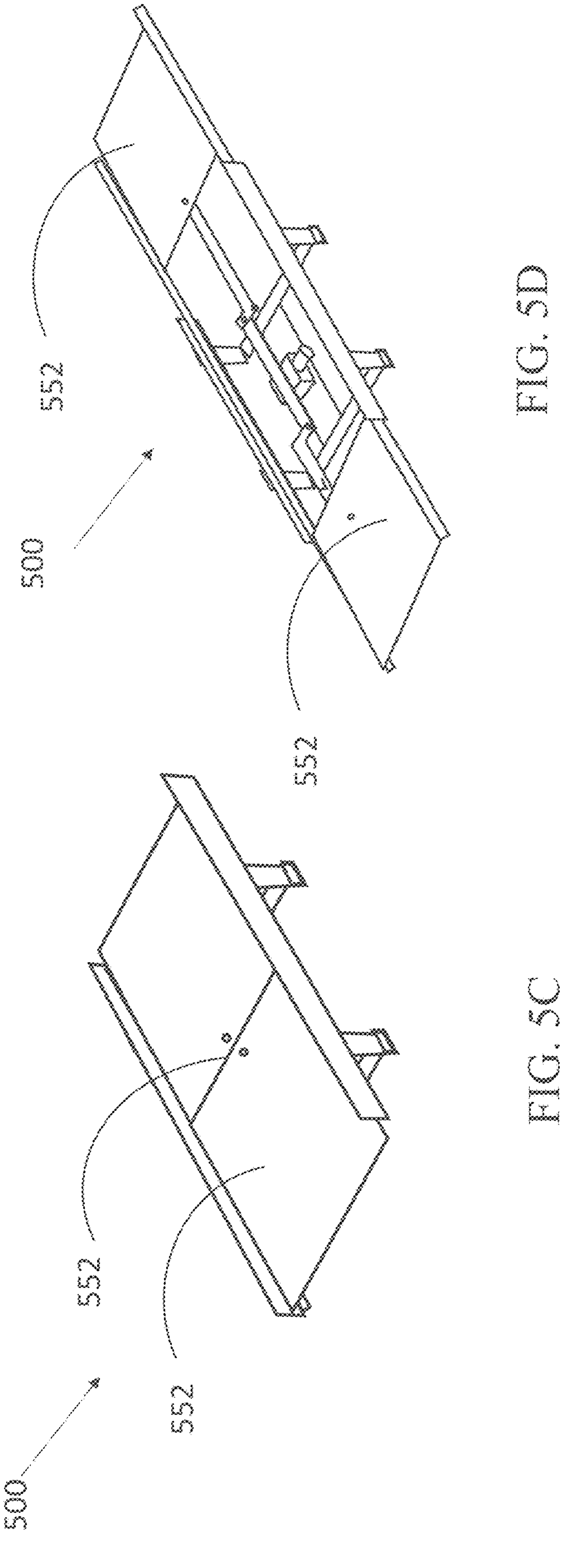
FIG. 5C illustrates a mechanical upper view of the solar panel system in a closed configuration, in accordance with embodiments of the invention.
FIG. 5D illustrates a mechanical upper view of the solar panel in an open state, in accordance with embodiments of the invention.

FIG. 3E illustrates a telescopic panel deployment system 300 such as a telescopic solar panel deployment system within a housing 339, which may be, for example, the cover or box 553 shown in FIG. 5D, and may have any suitable shape and is configured to completely house the telescopic panel deployment system 300. In accordance with embodiments, the figure shows a designated space 333, for example at the bottom of housing 339 or box 553, used for a left-side telescope, and a designated space 334, for example at the upper section of the housing, for the right-side telescope, allowing for the compact storage of the telescopic assemblies when retracted. Additionally, space 331 is allocated for storing the charging cable, and space 332 is provided for housing, for example, the system electronics. This arrangement ensures efficient use of the available volume within the mechanism, supporting both the mechanical deployment and the integration of electrical components in a streamlined, organized manner. In accordance with embodiments, other arrangements and internal layouts are also possible, depending on specific design requirements.

Figures 4A, 4B, 4C:
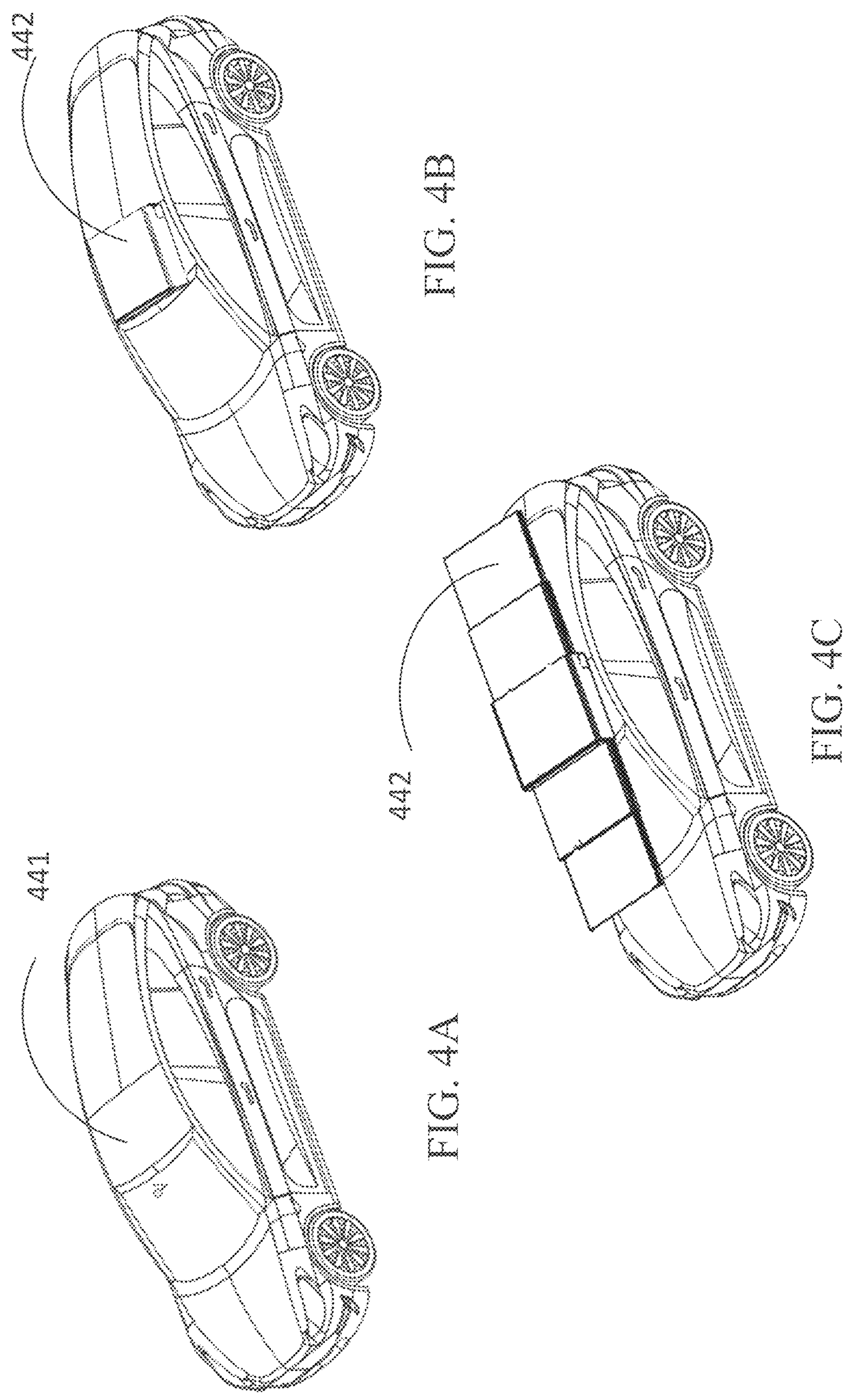
FIG. 4A illustrates a projection side view of a car without a solar panel system, in accordance with embodiments of the invention.
FIG. 4B illustrates a projection side view of a car with a closed telescopic solar panel system, in accordance with embodiments of the invention.
FIG. 4C illustrates a projection side view of a car with an open, deployed telescopic solar panel system, in accordance with embodiments of the invention.

FIGS. 4A-4C illustrate the use of a panel system such as a solar panel system, for example panel system 100 shown in FIG. 1B, on an electric vehicle.

FIG. 4A shows an electric vehicle 441, for example a Tesla Model Y, without any solar panel system installed, providing a reference for the standard vehicle configuration.

FIG. 4B depicts the same electric vehicle with a panel system, such as a telescopic solar panel system 442, mounted on the roof in a closed position. In accordance with embodiments, the system is compactly stowed, maintaining the vehicle's aerodynamic profile and allowing for normal driving conditions without significant impact on appearance or performance.

FIG. 4C shows the panel system, such as the telescopic solar panel system 442, in an open, deployed position on the roof of the electric vehicle. In accordance with embodiments, the panels such as the solar panels are extended outward, significantly increasing the surface area available for solar energy capture. This deployed configuration enables efficient charging of the vehicle's battery using solar energy, while the telescopic design allows the system to be retracted when not in use, preserving the vehicle's original form factor.

FIGS. 5A and 5B show an alternative mechanism configured to expand and close panels such as the solar panels. While the previous figures illustrated a scissor mechanism for synchronized extension and retraction, this embodiment features a tilting mechanism. In accordance with embodiments, the tilting system utilizes a main arm, secondary arms, and a transmission unit such as a worm gear transmission to control the deployment and positioning of the panels (e.g. solar panels). This approach may offer various advantages, such as improved structural stability, precise control, and a low-profile, aerodynamic design that is particularly well-suited for vehicle or rooftop applications.

FIG. 5A shows a mechanical deploying system 500 of a panel device such as the solar panel device 100 in a close position, in accordance with embodiment. The mechanical tilting device 500 comprises a frame 544 such as a low-profile aerodynamic frame, rails such as telescopic rails 545, and a transmission unit 546 such as worm gear transmission unit. According to one embodiment, the frame 544 is constructed from welded steel sheets, forming a cradle-like structure designed to support the device's 100 components while maintaining a compact and aerodynamic profile. The telescopic rails 545, mounted along the inner sides of the frame 544, are configured to enable the extension and retraction of solar panels to the sides of the device 100. In some embodiments, these rails may be similar to three-part drawer slides, allowing for full extension in two opposing directions 501 and 502 of the deploying system 500.

According to one embodiment, at the center of the frame 544, the mechanical deploying device 500 comprises a transmission device such as the worm gear transmission 546, which may be driven by a servo motor (not shown in this figure) and is responsible for actuating a main arm 547. The main arm 547 is connected to the output shaft of the worm gear transmission 546 and comprises pivot points 551 at its ends. These pivot points 551 facilitate the rotational movement of the main arm 548, enabling the main arm 547 to control the deployment and positioning of the solar panels.

The device further comprises secondary arms 548 attached to the pivot points 551 of the main arm 547. These secondary arms 548 are folded in their retracted state and are designed to extend outward when the main arm 547 rotates. This coordinated movement ensures the smooth deployment of the solar panels while maintaining structural stability.

The frame 544 is further reinforced with mounting rings 549 located for example at the four lower corners of the frame. These mounting rings 549 are fabricated from hardened steel, such as 4340 alloy steel, and are designed to securely attach the frame 544 to a supporting structure, such as a vehicle roof or a residential rooftop, and is used as a pivot for tilting, for example one or more panels such as part 683 in FIG. 6E. The robust construction of the mounting rings 549 ensures stability of the device during operation and under varying environmental conditions.

FIG. 5B shows the deploying system 500 in the frame 544 in an open position. In this configuration, the main arm 547 has rotated outward, actuated by the worm gear transmission 546, causing the secondary arms 548 to extend away from the frame 544. This open position clearly demonstrates how the secondary arms 548 unfold from their retracted state, providing support for the deployed panels (e.g. solar panels) and illustrating the coordinated movement that enables smooth and stable panel deployment. The mounting rings 549 remain fixed at the corners of the frame 544, ensuring the entire assembly is securely anchored during operation.

FIGS. 5C and 5D show the deploying system 500 with two panels 552 such as solar panels added. The panels 552 are mounted on the moving part of the telescopic rail 545 shown in FIG. 5A and may be connected to the secondary arms 548 via for example the pivot points 551.

In FIG. 5C the deploying system 500 is in close position. In FIG. 5D the main arm 547 is shown in the open position, and after a rotation of 180 degrees, the secondary arms 548 move outward, allowing the panels 552 to be positioned for optimal sunlight capture. This configuration demonstrates how the panels are supported and moved by the coordinated action of the main and secondary arms.

In operation, when the worm gear transmission 546 actuates the main arm 547, the secondary arms 548 unfold, and the solar panels 552 are extended away from the frame 544. This movement enables the panels to transition from a compact, stowed position to a fully deployed state, maximizing the exposed surface area for solar energy collection.

FIG. 5D illustrates the system in an open position, where the secondary arms 548 have moved outward as described in FIG. 5B, and the solar panels 552 are extended and slide out through the mechanism 553.

Figures 5E, 5F:
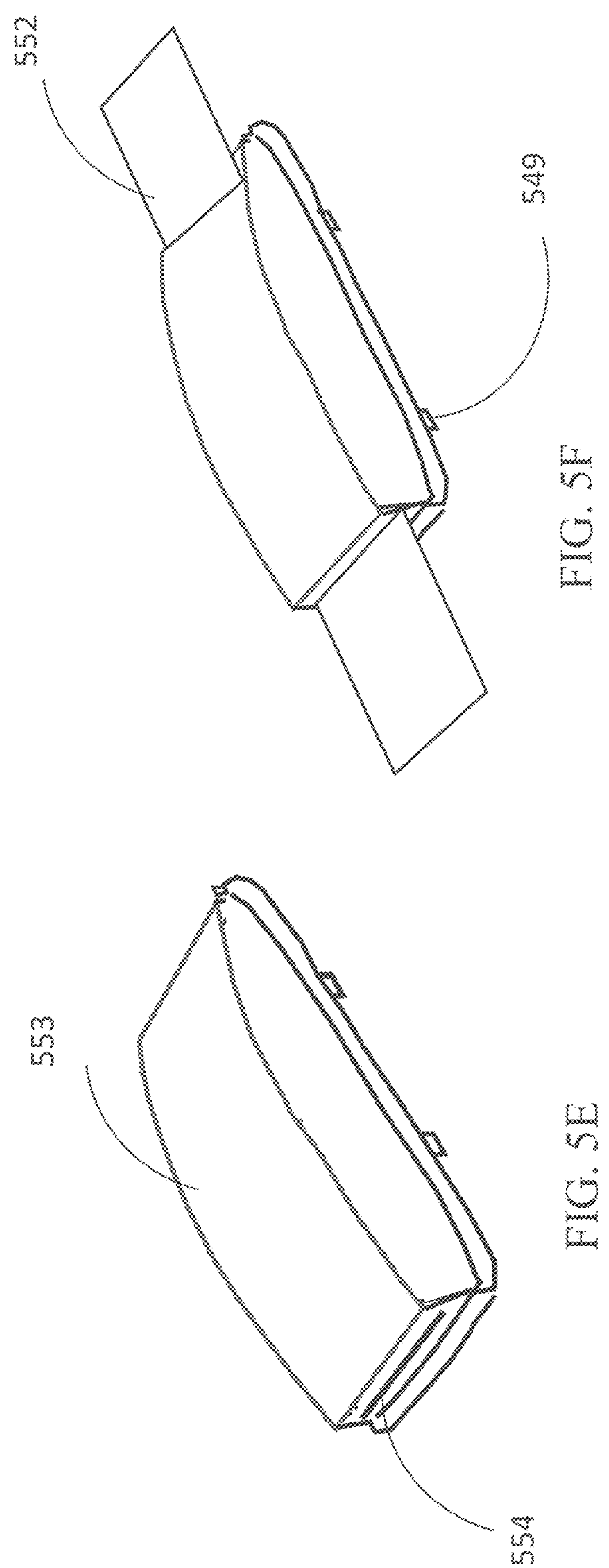
FIG. 5E the solar panel system with cover in a closed position, in accordance with embodiments of the invention.
FIG. 5F illustrates the solar panel system with cover in an open position, in accordance with embodiments of the invention.

FIG. 5E and FIG. 5D show a housing 553 of the panel system, which may be mounted on a vehicle as shown in FIG. 4C via frame 548 and 544 FIG. 5B. In accordance with embodiments, the housing 553 may have an aerodynamic shape and a size configured to house the entire panel system. The cover 553, is shown with the solar panels 552 deployed outside of it. This arrangement allows the panels to be efficiently stowed within the cover 553 when not in use and smoothly deployed for operation, ensuring both protection and optimal energy capture.

The cover 553 is made, for example, by vacuum forming from ABS or a similar material, and its shape resembles a low-profile aerodynamic roof box, similar to commercial cargo boxes designed for vehicle roofs.

In accordance with embodiment, the housing 553 includes two slots (openings 554) located at the front and rear sides. In FIG. 5E, the panels 552 are shown in a closed position, stowed inside the housing 553. The mounting rings 549 are visible at the lower corners, allowing secure attachment to the vehicle or another supporting structure and enable to tilt the structure (part 685 and 680 FIG. 6E In FIG. 5F, the panels 552 are shown deployed, extending outward through the slots 554 in the housing 553. This configuration allows the panels to be efficiently stowed within the aerodynamic cover when not in use and smoothly deployed for operation, ensuring both protection and optimal energy capture.

FIGS. 6A-6K show a tilting system 601, in accordance with other embodiments. The tilting system 601 is configured to adjust the angle of panels, such as the panels (e.g. solar panels) shown in FIG. 1A, for optimal sunlight capture. In accordance with embodiments, the tilting system 601 includes a tilting system 600 comprising components such as a transmission unit, for example a worm gear transmission 661, tilting arms 666, 667, pivot points 663, 668, locking mechanisms 674, and holding units 677. The tilting system 600 is configured to provide precise and stable adjustment of the panel system, and may be integrated with a control module and sensors as part of the overall tilting system 601.

In accordance with some embodiments, the tilting system 600 may integrate with the telescopic deployment mechanisms described in FIGS. 2A-2D and FIGS. 3A-3E, and the aerodynamic housing shown in FIGS. 5E and 5F, providing a comprehensive solution configured to enable dynamic panel positioning such as solar panel positioning and energy optimization. Alternative embodiments may incorporate different actuation methods, locking systems, or mounting arrangements to suit various installation requirements. According to some embodiments the tilting system 600 is not integrated with telescopic deployment mechanisms.

According to some embodiments, the one or more panels are configured to be deployed and tilted synchronously using the tilting system 600 and the deployment system 300 as explained herein above and below.

FIG. 6A shows the main components of the tilting system 600, in accordance with embodiments. The tilting system 600 comprises a transmission unit 661 such as a worm gear transmission, which may be driven by a controlled motor. A central pivot axis 664 of the gear transmission 661 extends outward from the housing. From the central pivot point 664, a stud 665 extends outward, and a stud-type track roller 662, which is generally cylindrical bearing, is mounted on the stud 665.

In accordance with embodiments, the transmission 661 is mounted, for example, to a support structure such as a car roof, providing stability for the entire assembly. The stud-type track roller bearing 662 is configured to facilitate smooth movement and reduce friction during the tilting operation. This arrangement allows lifting arms, such as arms 666 and 667 shown in FIG. 6B, to be actuated precisely and stably by the transmission 661, enabling controlled adjustment of the panel angle. In operation. The rollers 669 press the locker side as seen in FIG. 6E and releases the locker in the right side, end create the tilt of the panel.

Figure 6B:
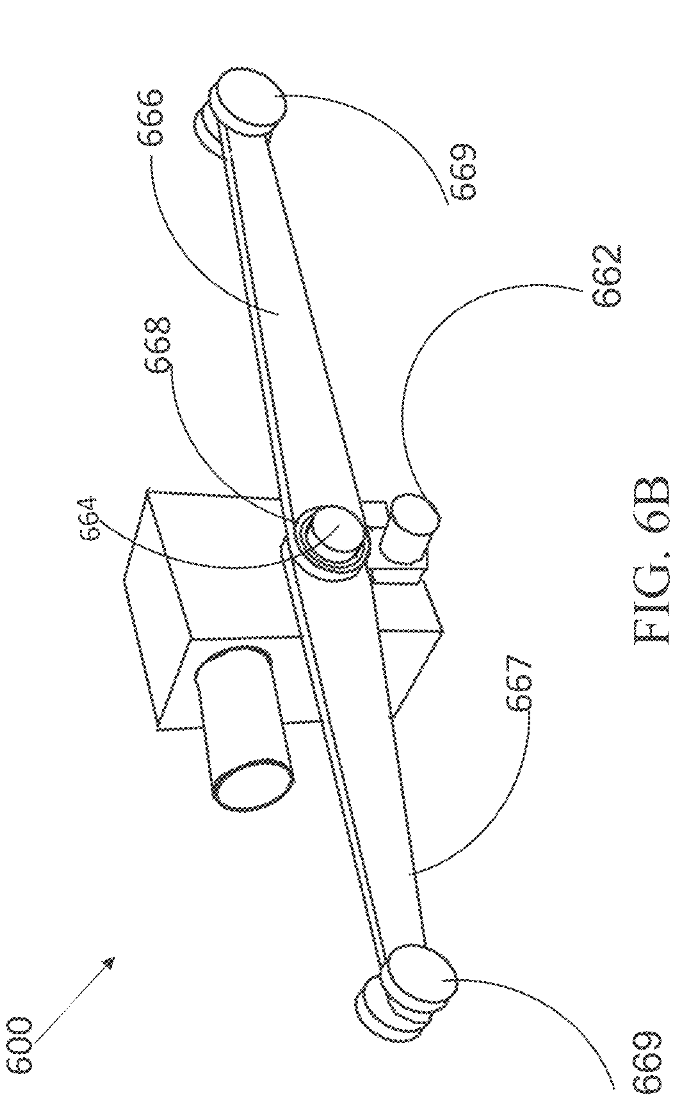
FIG. 6B illustrates a mechanical view of the tilting mechanism's lifting arms, in accordance with embodiments of the invention.

FIG. 6B illustrates the lifting arms 666 and 667 of the tilting system 600. The edge of arms 666 and 667 are equipped with a bearing 668 for smooth rotation and for connecting the arms to the central pivot point 664 the roller bearing shown in FIG. 6G part 669 on lifting arm 666). The bearing 668 has an inner diameter that fits the diameter of the central pivot point 664 allowed the lifting arms 666 and 667 turn freely around pivot point 664. The stud-type track rollers 669 are positioned at the ends of the arms 666 and 667 and are configured to guide the tilting motion along a defined path.

Figure 6C:
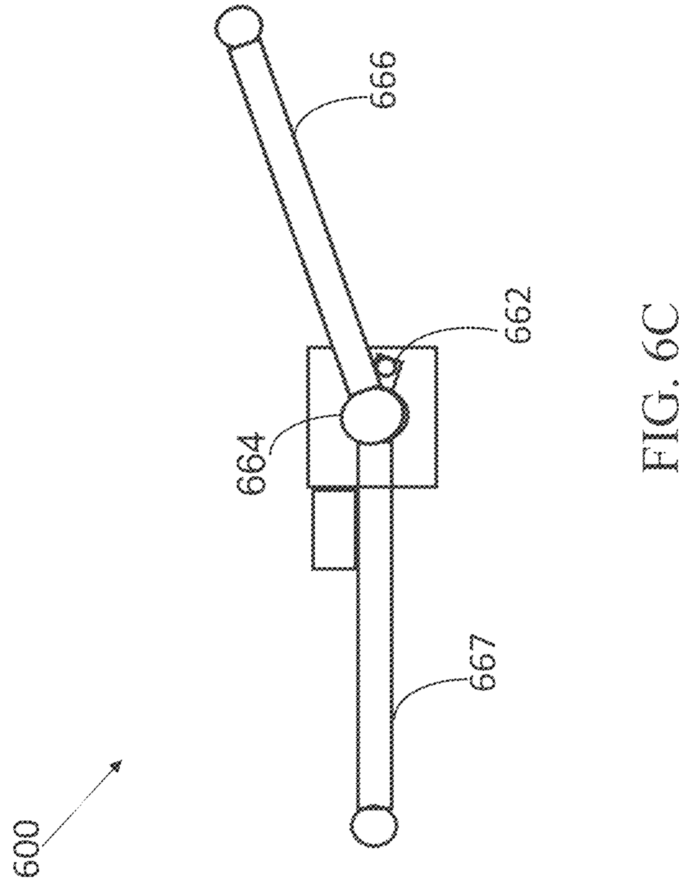
FIG. 6C illustrates a mechanical side view of the tilting mechanism's arm and rollers, in accordance with embodiments of the invention.

FIG. 6C provides a side view of the tilting system 600, focusing on the interaction between the central pivot point 664, the stud-type track roller 662, and the tilting arms 666 and 667. In accordance with embodiments, the figure shows how rotation of the central pivot point 664 causes the stud-type track roller 662 to rotate, which in turn causes the tilting arm 666 or 667 to pivot. This mechanism 600 enables the precise adjustment of the tilt angle of the panel system.

Figure 6D:
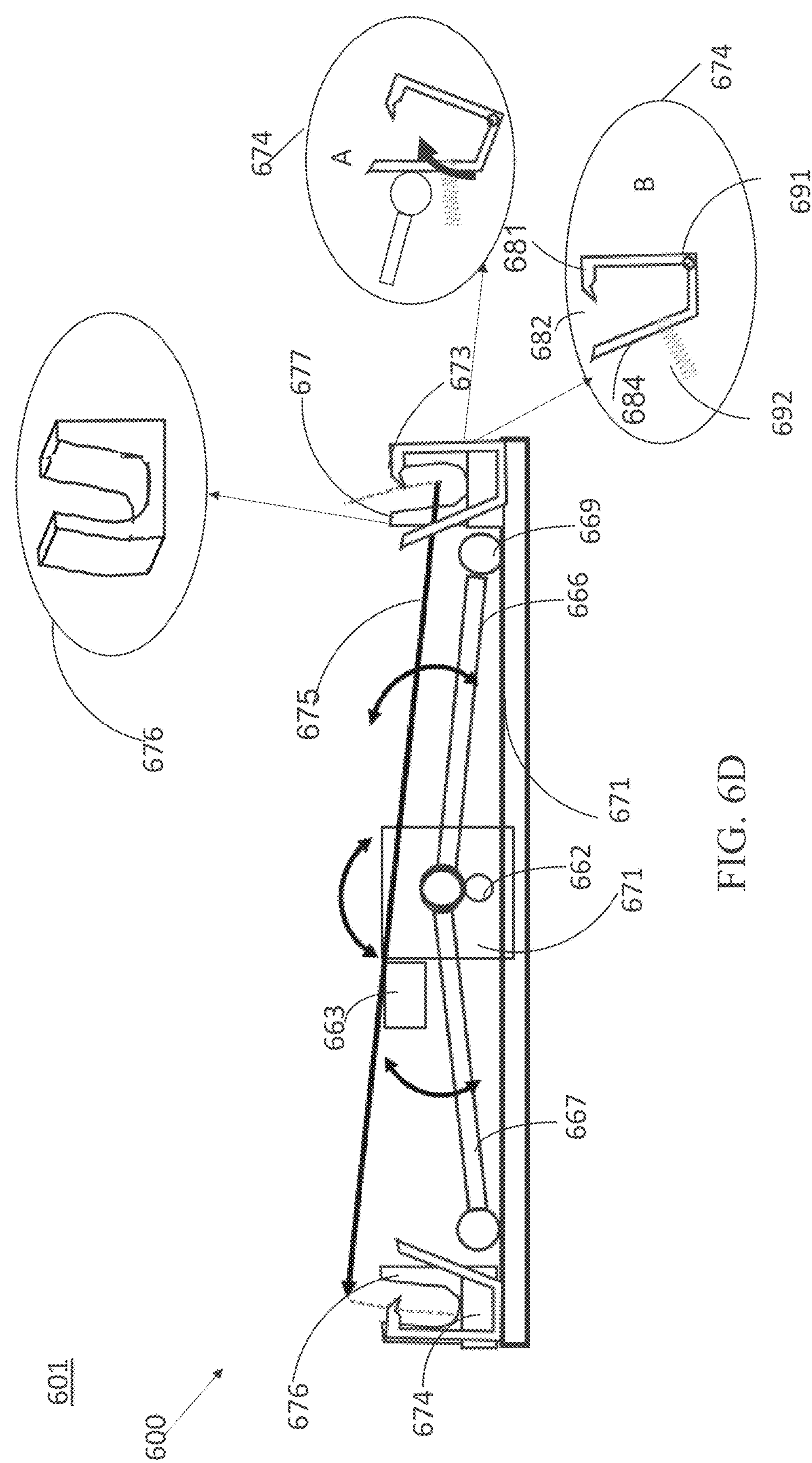
FIG. 6D illustrates a detailed mechanical side view of the tilting mechanism's, in accordance with embodiments of the invention.
Figure 6E:
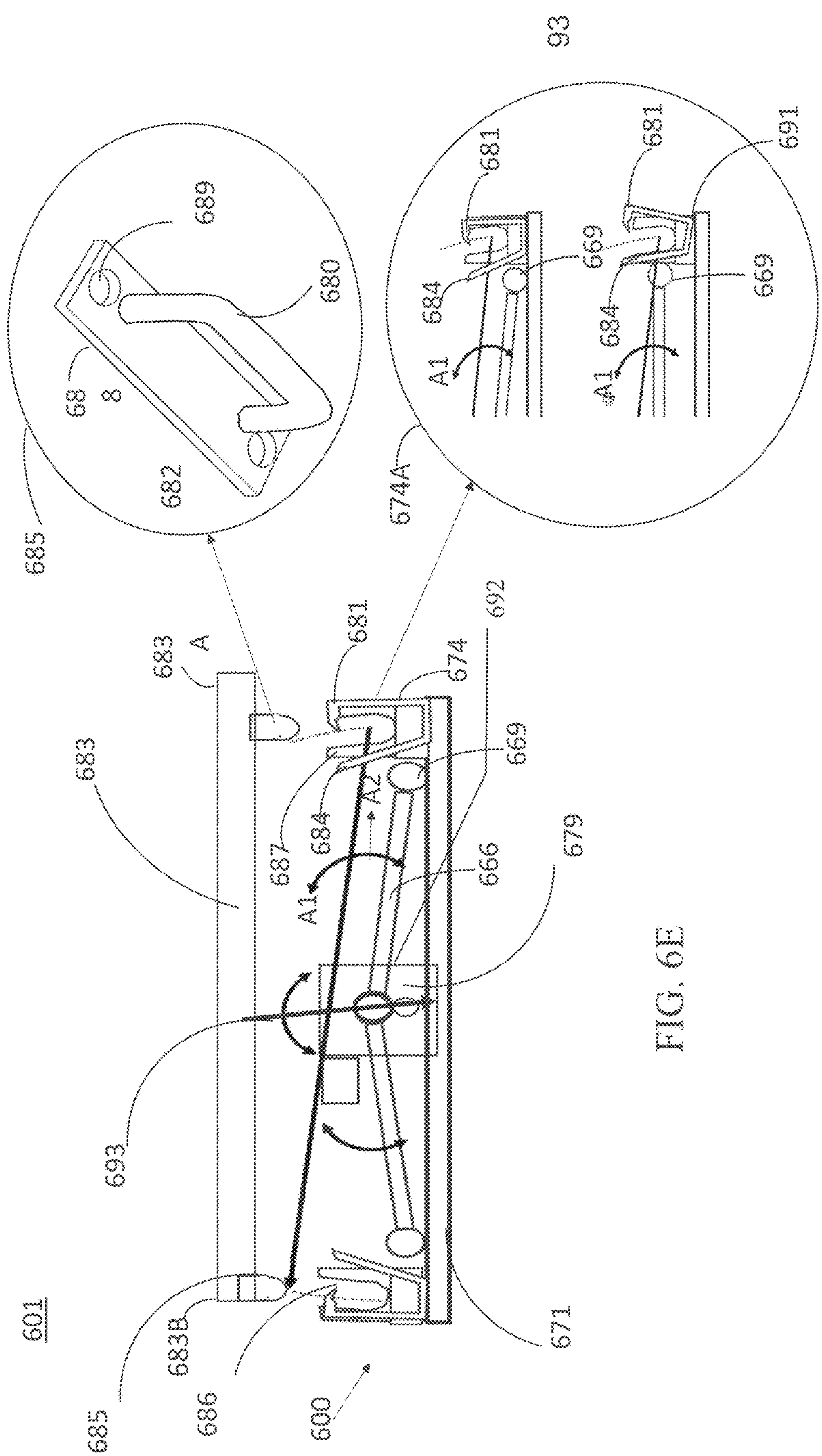
FIG. 6E illustrates a detailed view of tilting system components, in accordance with embodiments of the invention.

FIG. 6D shows a side view of the tilting system 600, in accordance with embodiments. The tilting system 600 includes a base 671, which serves as the main structural support for the assembly and is typically mounted to the underlying surface, such as a vehicle roof or rooftop installation.

Located on each of the distal ends of the base 671 are holding units 677 and 676, which are used to support, stabilize, and hold the tilting arms during operation. Respectively, at each distal end of the base are locking units 673 and 674, located, for example, at the sides of the holding units 677 and 676. The holding units 677 and 676 are configured to ensure controlled and precise movement of the tilting arms 666, 667, preventing misalignment and allowing for smooth adjustment of the tilt angle.

The locking units 673 and 674 are each configured to, respectively, secure the tilting arms 666 and 667 in place at the desired tilt angle, preventing unintended movement during operation or under external forces such as wind. The locking units may have a trapezoidal shape with an opening 682 and a grasping element 681, having, for example, an arched slot shape for locking a related solar panel.

The locking units 673 and 674 may further include at the bottom a pivot point 691 located for example along the base 671, which serves as the rotational axis for the tilting arms 667 and 666, enabling the arms to pivot as the tilting system is actuated. In accordance with embodiments, a spring may be included so that the locking units are flexible in movement, allowing the panels to be locked into the holding units 677 and 676 during rotation. By turning locker key 681 against spring 692.

An example of the locking unit is shown in a close position (A) and in a close position (B).

These elements are configured to work together to provide secure attachment, guided movement, and spring-loaded stability for the tilting system 600. In accordance with embodiments, different types of guides, holders, or springs may be used to achieve similar functionality.

FIG. 6E shows a plate such as a tilting plate 683 mounted above the tilting system 600, in accordance with embodiments. The tilting plate 683 may hold and/or may include, for example, one or more panels such as solar panels as shown in previous figures, mirror panel, or other functional or structural panel. In accordance with embodiment, at the distal ends of the plate 683 are two locking handles 685. The locking handles 685 include handles 680, which may be, for example, a square pad eye holder. In accordance with embodiments, the handles 680 are shaped with a radius suitable to fit and lock into the openings of the holding units 677 and 676.

The locking handles 685 further include a handle base 688, which may be connected, for example, to the bottom of plate 683, for example, via two openings 689 and screws (not shown).

A specific example, of the locking steps are illustrated in drawing 674A. In accordance with embodiments, when the tilting arm 666 is raised upward in direction A1 by the transmission motor 679, the roller 669 is configured to push and press against the wall 684 in direction A2. This action causes the locking unit 674 to rotate about the pivot point 691, and correspondingly, the grasping element 681 also rotates. As the locking handle 680 moves downward and is pressed into the locking unit 674, it is engaged and secured by the grasping element 681. This sequence enables the locking and securing of the handle 680 during the tilting process of the plate 683, thereby locking and stabilizing the entire panel system 601. In accordance with embodiments, this mechanism is configured to ensure that the tilting plate 683 and the panel system 601 remain securely fixed in the desired position throughout operation.

In this figure, the plates are shown separated for explanation purposes. This configuration demonstrates how the tilting plate 683 is configured to be held securely in place and can be released or locked as needed. A detailed explanation and illustration of the tilting and locking process is provided in FIGS. 7A-7H.

Figures 6F, 6G:
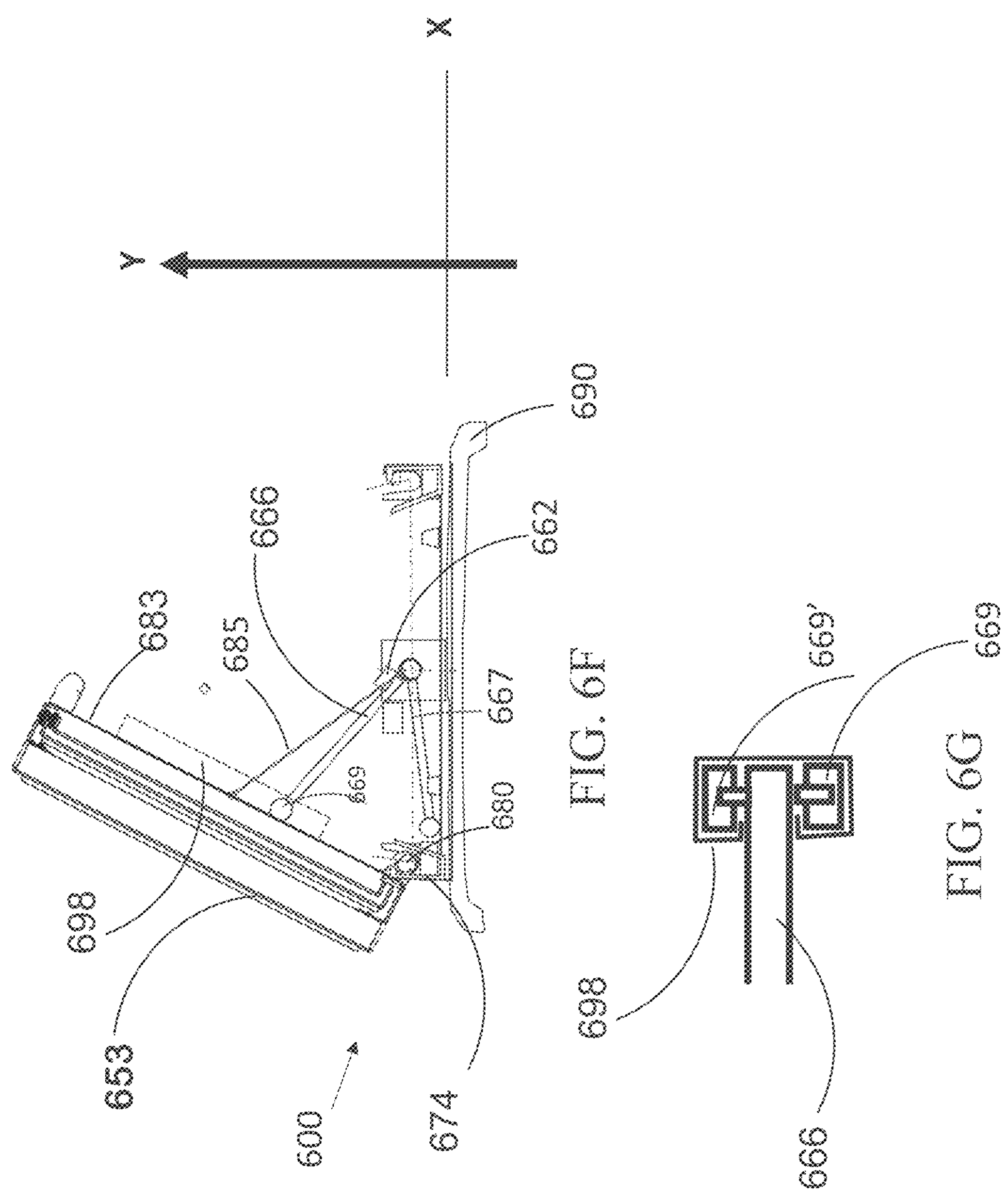
FIG. 6F illustrates a side view of the tilting system and plate in a tilted position, in accordance with embodiments of the invention.
FIG. 6G illustrates cross section of the end of the tilting arm with rollers entering a channel, in accordance with embodiments of the invention.

In accordance with embodiments and as illustrated in FIGS. 6E and 6F, the locking handles 680 are positioned at each of the edges 683A and 683B of the tilting plate, and are configured to engage with corresponding locking devices 674, respectively. When the tilting plate 683 is rotated about the first edge 683A, the locking device 674 is configured and enabled to lock the plate at that edge, securing the plate in the selected tilted position. Similarly, when the plate is rotated about the second edge 683B, the locking device 674 is configured and enabled to lock the plate at that edge. This arrangement allows the tilting plate 683 to be securely fixed at either edge, depending on the direction of tilt, thereby providing stable and precise positioning of the supported panel for optimal operation.

FIG. 6F shows a perspective side view of the tilting system 600, in accordance with embodiments. The tilting system 600 comprises the tilting plate 683, which serves as the base for one or more panels, for example for the telescopic solar panel system 300, as described in FIG. 3E, and is configured to tilt to the left or to the right at various angles, for example from 0 to 70 degrees, or any intermediate angle as required for optimal sunlight capture. The tilting may be performed automatically or by the user, allowing adjustment to a required angle based on the sun's location. The tilting plate 683 is positioned perpendicular to the solar panel system base 690 when fully tilted, while the base is secured to the locking unit 674. In FIG. 6F, the plate 683 is depicted in a tilted position, for example tilted to the left, and secured to the locking unit 674, in accordance with embodiments.

Specifically, the left end of tilting plate 683 is connected by the locking handle 680 to the holding unit 676 and is further secured using the locking unit 674, enabling the tilting plate 683 to rotate by the action of the tilting arm 666 according to user control and tilting selection. According to one embodiment, the locking unit 674 is connected through pin in pivot point 691 that allowed grasping element 681 to rotate, for example, to the bottom of the tilting plate 683, and the handle 680 locks into the opening of the locking unit 674, ensuring secure attachment of the plate 683 (e.g. and the solar panel system 300) to the holding unit 685.

In operation, the plate 683 is tilted by the tilting arm 666, maintaining contact and stability. Rotation of the transmission 662 causes the arm 667 to rotate, for example, by 120 degrees with respect to a Cartesian axis, thereby providing the tilt angle of the plate 683 of almost 90 degrees with respect to the base 671.

During this rotation, the rollers 669 located at the end of arm 666 enter a channel 698, which is located, for example, at or below the base plate 683 of the lower tilted part, as shown in FIG. 6G. The rollers 669 roll down the channel 698, pushing and tilting the tilting plate 683 upward, for example to the left. At the same time. This configuration allows for precise and stable adjustment of the tilt angle of the panel system 600 with for example a telescopic system such as the telescopic solar panel system 300.

In accordance with embodiments, the tilting system 600 comprises a base 669, a tilting plate 683 configured to support at least one panel, and a transmission unit 661 configured to rotate the tilting plate 683 relative to the base 669 from a position substantially parallel to the base to a position at an angle of up to about 90 degrees relative to the base. The tilting plate 683 is tiltable about a first edge 683A of the panel in one direction and about a second edge 683B of the panel in the opposite direction. At least two locking devices 674 and 676 are provided, each configured and enabled to lock the tilting plate 683 at the respective edge about which the plate is tilted. This arrangement allows the tilting plate 683 to be securely fixed in a selected position, enabling precise adjustment of the panel angle for optimal sunlight capture.

In FIG. 6G, a top view of the end of tilting arm 666 is shown, with, for example, two rollers 669 and 669', as described in FIG. 6F. The rollers 669 and 669' are configured to enter the channel 698, which is located at or below the base plate 683. This arrangement is designed to prevent tipping or misalignment of a panel system such as the telescopic solar panel system 300 during the tilting operation, ensuring stable and controlled movement of the solar panel system.

Figure 6H:
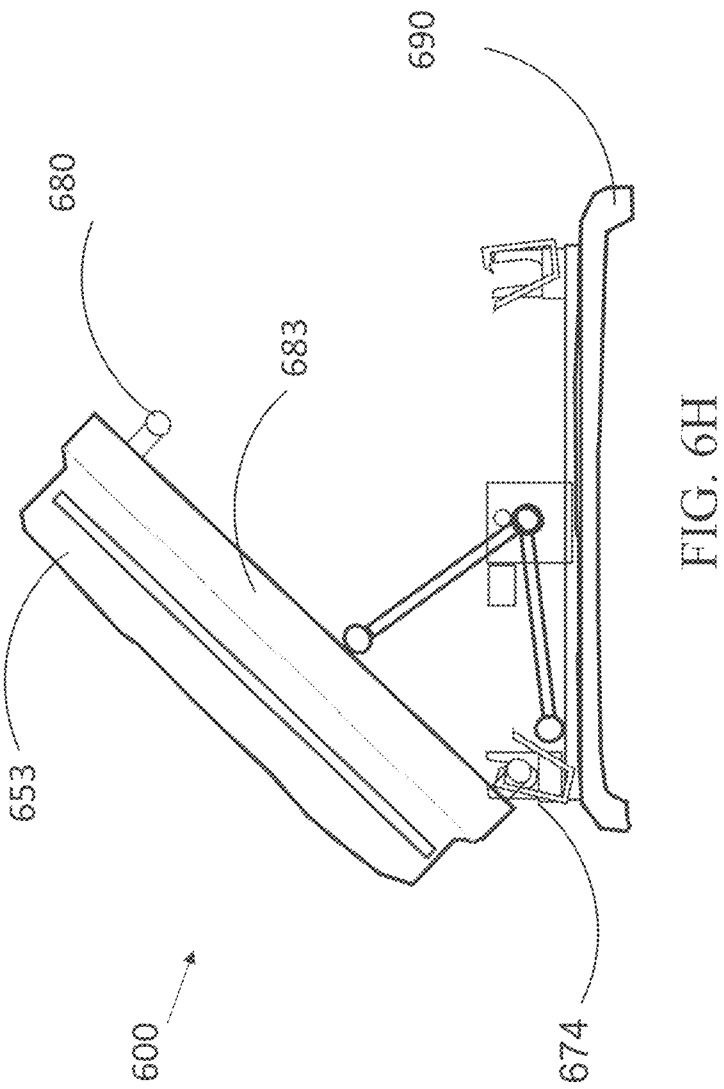
FIG. 6H illustrates the tilting system operating on a portion of the cover, in accordance with embodiments of the invention.

In FIG. 6H, the same tilting system 600 is shown operating on a portion of the cover 653, as described in FIGS. 5E and 5F. In accordance with embodiments, the locking unit 674 is rotated, and as a result, the grasping elements 681, which previously secured the tilting plate 683, may now release the locking handle 680. This configuration enables the controlled release of the tilting plate 683 from the holding position, allowing for adjustment or stowing of the solar panel system as needed.

FIGS. 7A-7H show, in accordance with embodiments, a step-by-step operation of the tilting process of a panel system such as, such as the solar panel system 100. The step-by-step includes detailing the sequential movement, locking, and adjustment actions performed by the tilting system 600 and its associated components.

Figure 7A:
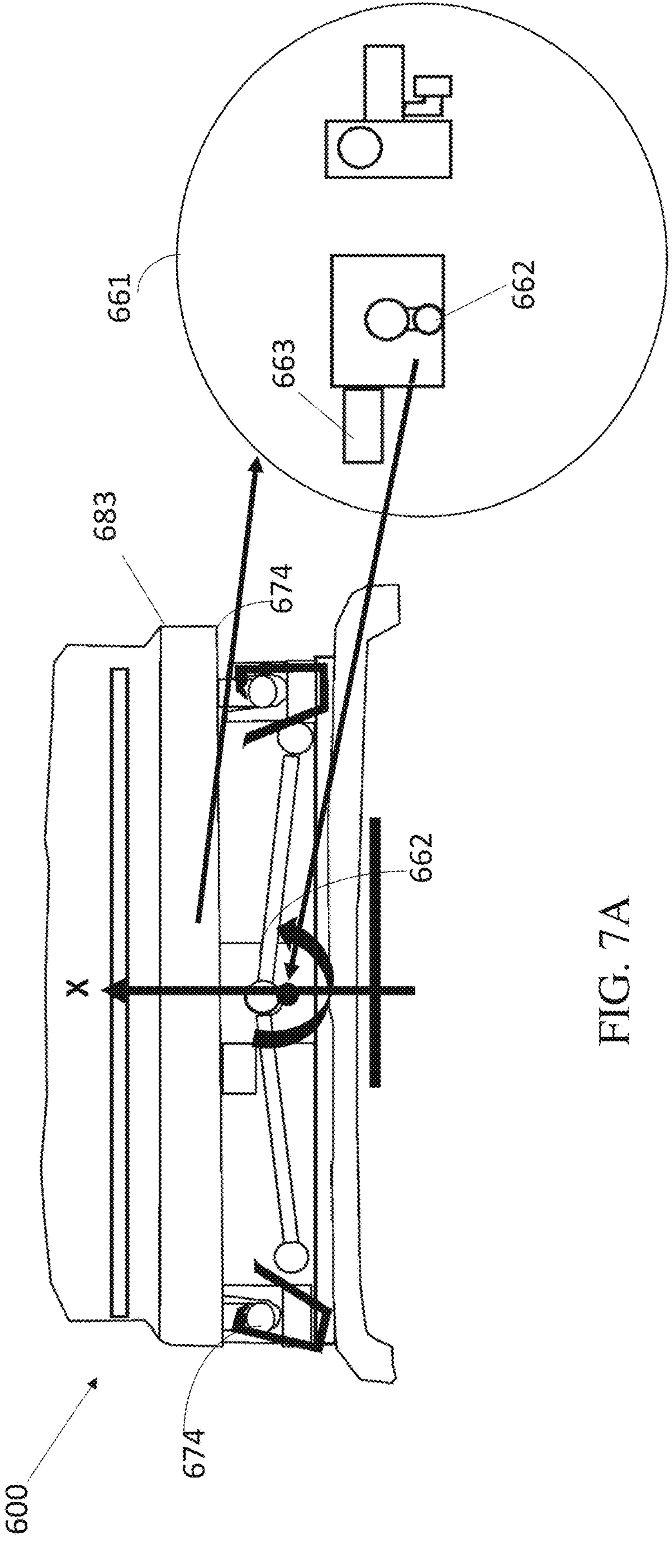
FIGS. 7A-7H illustrate step-by-step operation of the tilting process for the panel system, in accordance with embodiments of the invention.

FIG. 7A shows step 1 of the tilting process, in accordance with embodiments. In this initial closed position, the tilting system 600 is fully stowed, with the worm gear transmission 661 at a 0-degree angle relative to the X-axis. Both the right and left locking units 674 are engaged, securing the tilting plate 683 and for example, the panel system such as solar panel system 100 in place. The tilting system 600 and/or the solar panel system 100 is stable and locked, with no tilting motion initiated. The base system 663 fully secure and lock. This is the status during drive of the vehicle.

Figure 7B:
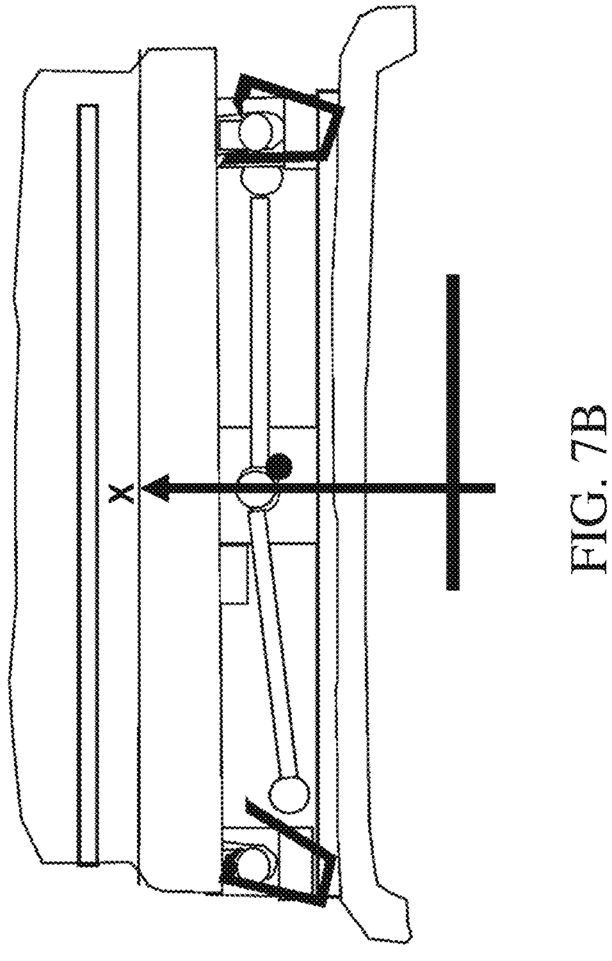

FIG. 7B illustrates step 2, where the tilting process begins. The worm gear transmission 661 is rotated by the motor 663 to about a 10-degree angle to the right relative to the X-axis. At this stage, the right locking unit 674 is released (unlocked), allowing the right side of the tilting plate 683 to begin moving upward, while the left locking unit 674 remains engaged and holds the left side in place.

Figures 7C, 7D:
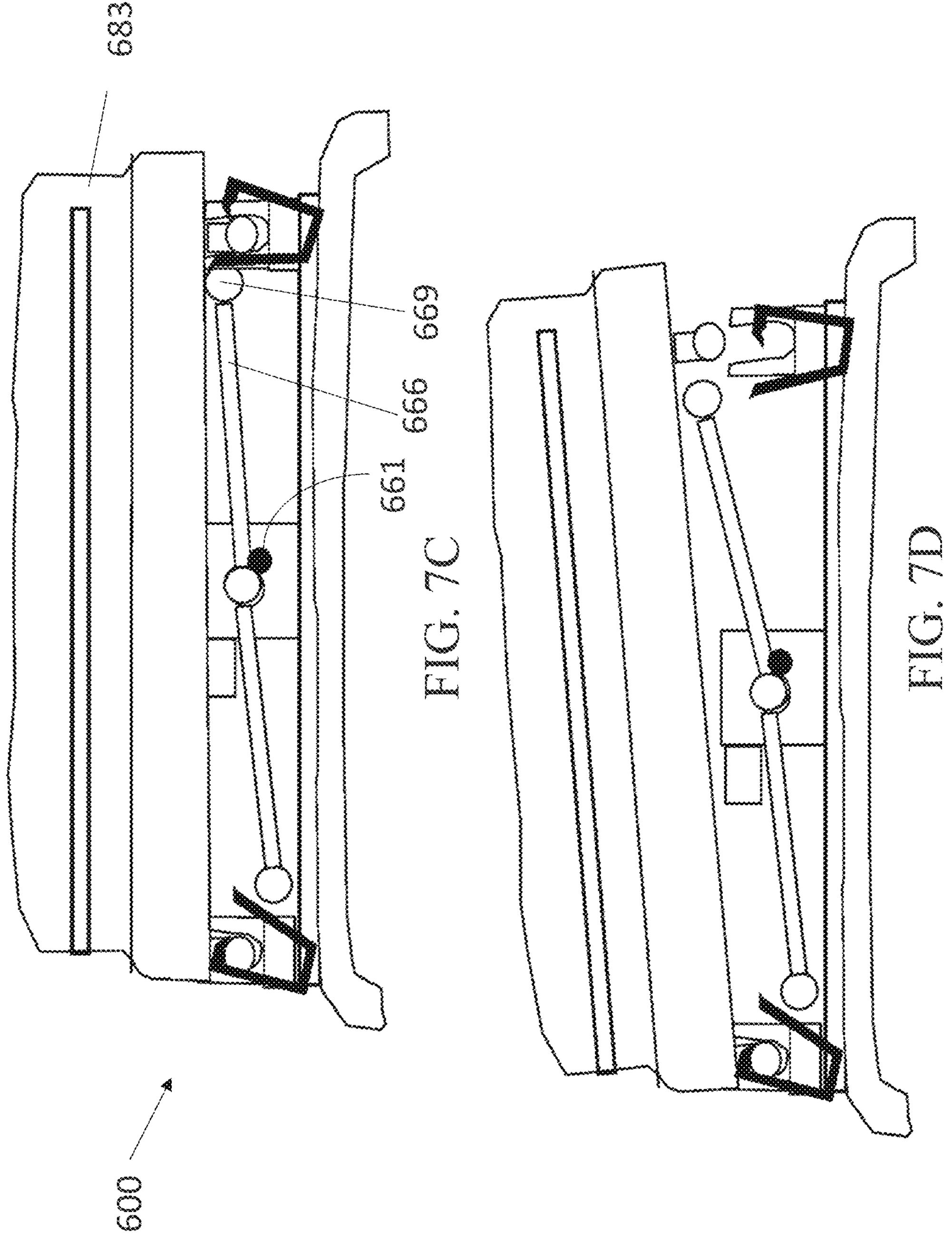

FIG. 7C depicts step 3, as the worm gear transmission 661 continues to rotate, reaching a 15-degree angle relative to the X-axis. The right locking unit 674 remains open, and the tilting plate 683 starts to move further upward on the right side. The tilting arm 666, actuated by the worm gear, pushes the plate 683, and the stud-type track rollers 669 at the end of the arm 666 begin to move along, for example, the channel 698, guiding the upward motion and preventing misalignment or tipping.

FIG. 7D shows step 4, where the worm gear transmission 661 rotates to a 30-degree angle relative to the X-axis. The left locking unit 674 is still closed, and the tilting plate 683 is now supported in a partially tilted position. The plate 683 is stabilized as the locking unit 674 re-engages, and the grasping element 681 secures the locking handle 680. The left side remains locked, and the plate 683 is now held at an intermediate tilt angle of about 10 degrees.

In accordance with embodiment, the Angle of the tilt is calculated as illustrated in FIG. 9 and is:

```
A1 = ASIN(R2/R1)
L1 = Squer(R3^2 + R3^2 + 2*COS(27-A1-A2)
A6 = Asin(R4/L1)
Tilt = A5 + A6
```

Figure 7E:
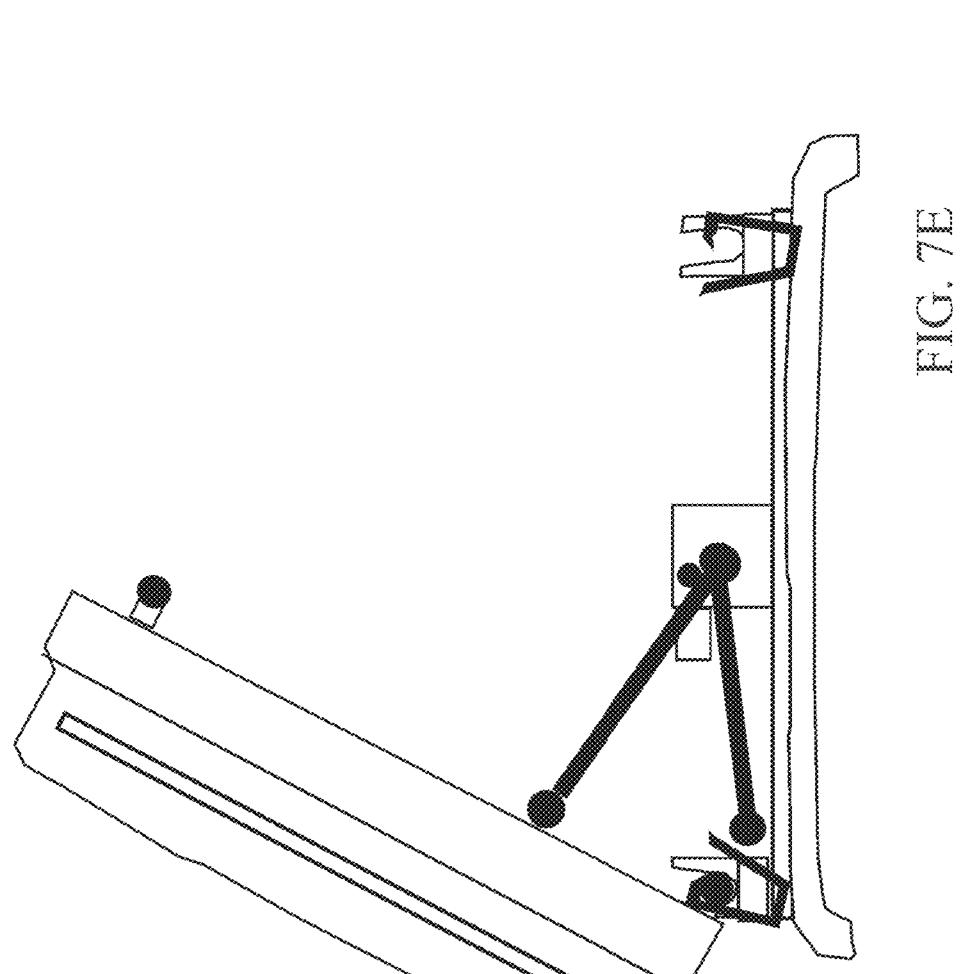

FIG. 7E presents step 5, where the worm gear transmission 661 continues to rotate, reaching a maximum tilt angle, for example, 120 degrees relative to the X-axis. The locking units 674 is engaged, and the tilting plate 683 is now fully tilted, providing the optimal angle for solar energy capture. In some cases, the constant force spring 685 maintains pressure, ensuring the plate 683 remains stable and securely locked in the tilted position.

Figures 7F, 7G:
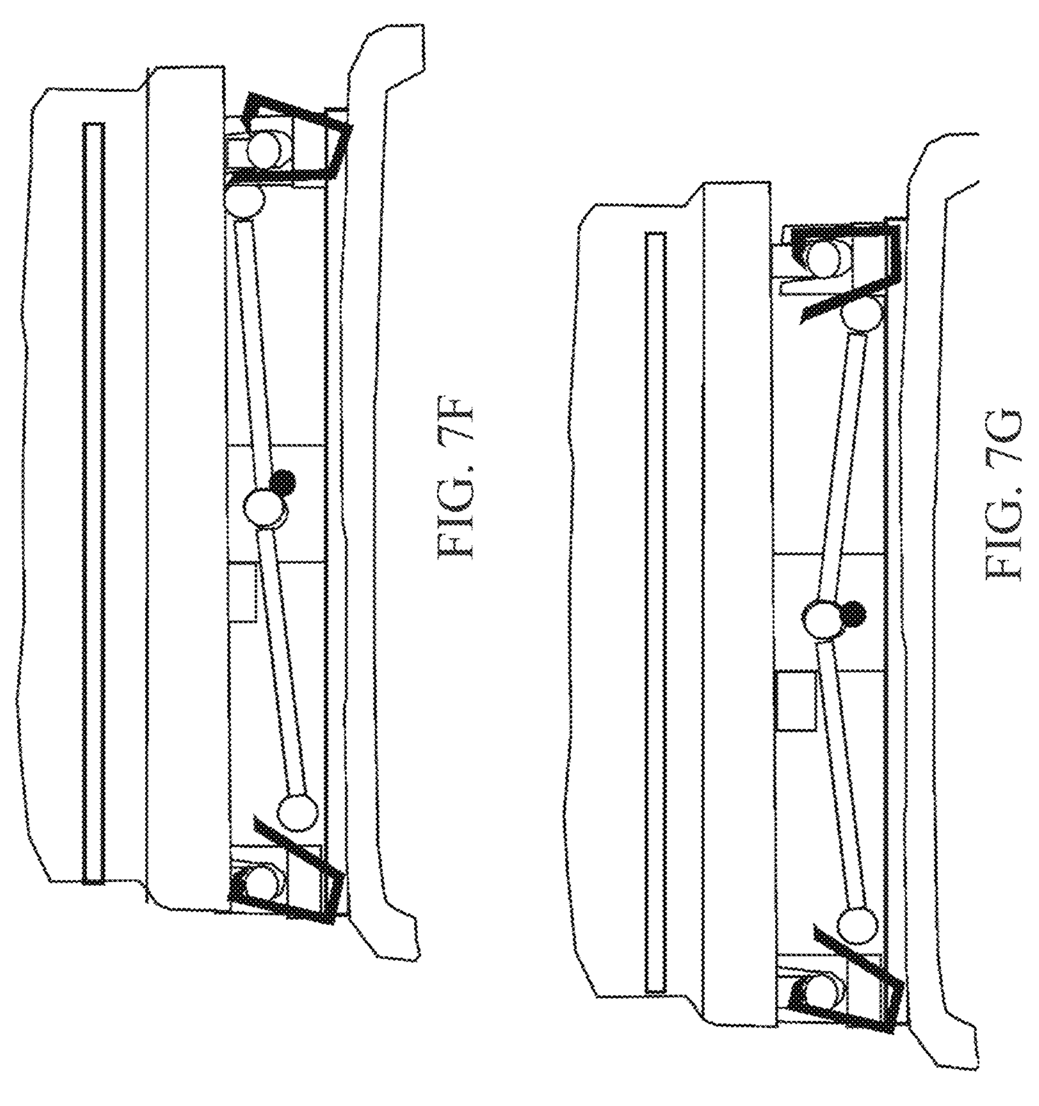

FIG. 7F demonstrates step 6, where the system begins to return to its original position. The worm gear transmission 661 is rotated in the opposite direction, the right locking unit 674 is released, and the tilting plate 683 begins to move downward, guided by the rollers 669 in the channel 698. The left locking unit 674 remains engaged, controlling the descent and preventing sudden movement.

FIG. 7G shows step 7, as the worm gear transmission 661 continues to rotate back to the 0-degree position. Both locking units 674 are engaged, and the tilting plate 683 is once again secured in the closed, horizontal position. The system is stable and ready for the next tilting operation.

Figure 7H:
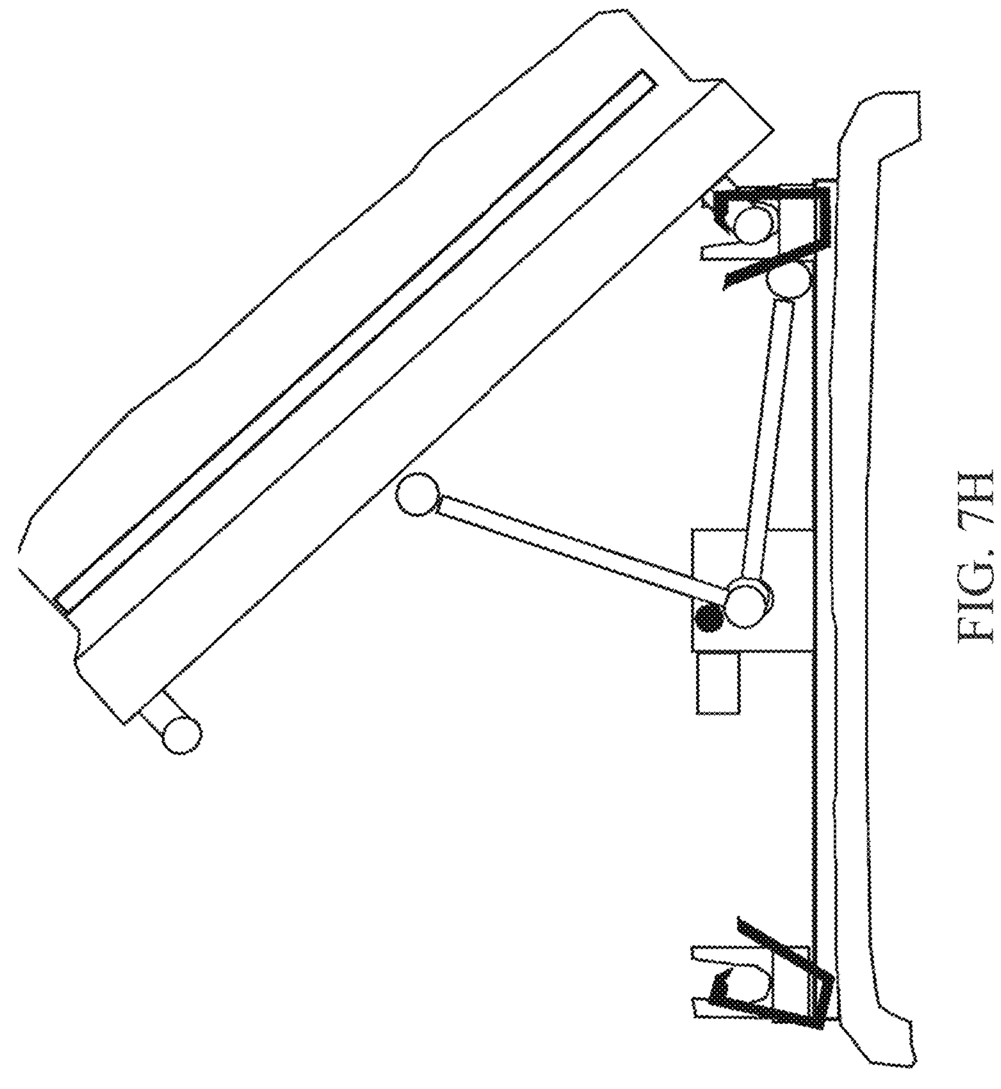

FIG. 7H illustrates step 8, where the tilting system 600 can also tilt the plate 683 to the opposite side by reversing the direction of the worm gear transmission 661. The left locking unit 674 is released, and the left side of the plate 683 is raised, while the right side remains locked. The process mirrors the steps described above, with the plate 683 being tilted and locked in the opposite direction for optimal sun tracking.

Throughout these steps, the coordinated action of the transmission unit such as the worm gear transmission 661, tilting arms 666 and 667, locking units 674, grasping elements 681, and rollers 669 ensures precise, stable, and controlled adjustment of the tilt angle. The locking units 674 and for example the constant force spring 685 provide secure locking and smooth movement, while the channel 698 guides the rollers 669 to prevent tipping or misalignment. The system can be operated automatically or manually, allowing for dynamic adjustment of the solar panel system based on sun position or user input, in accordance with embodiments.

Figure 8:
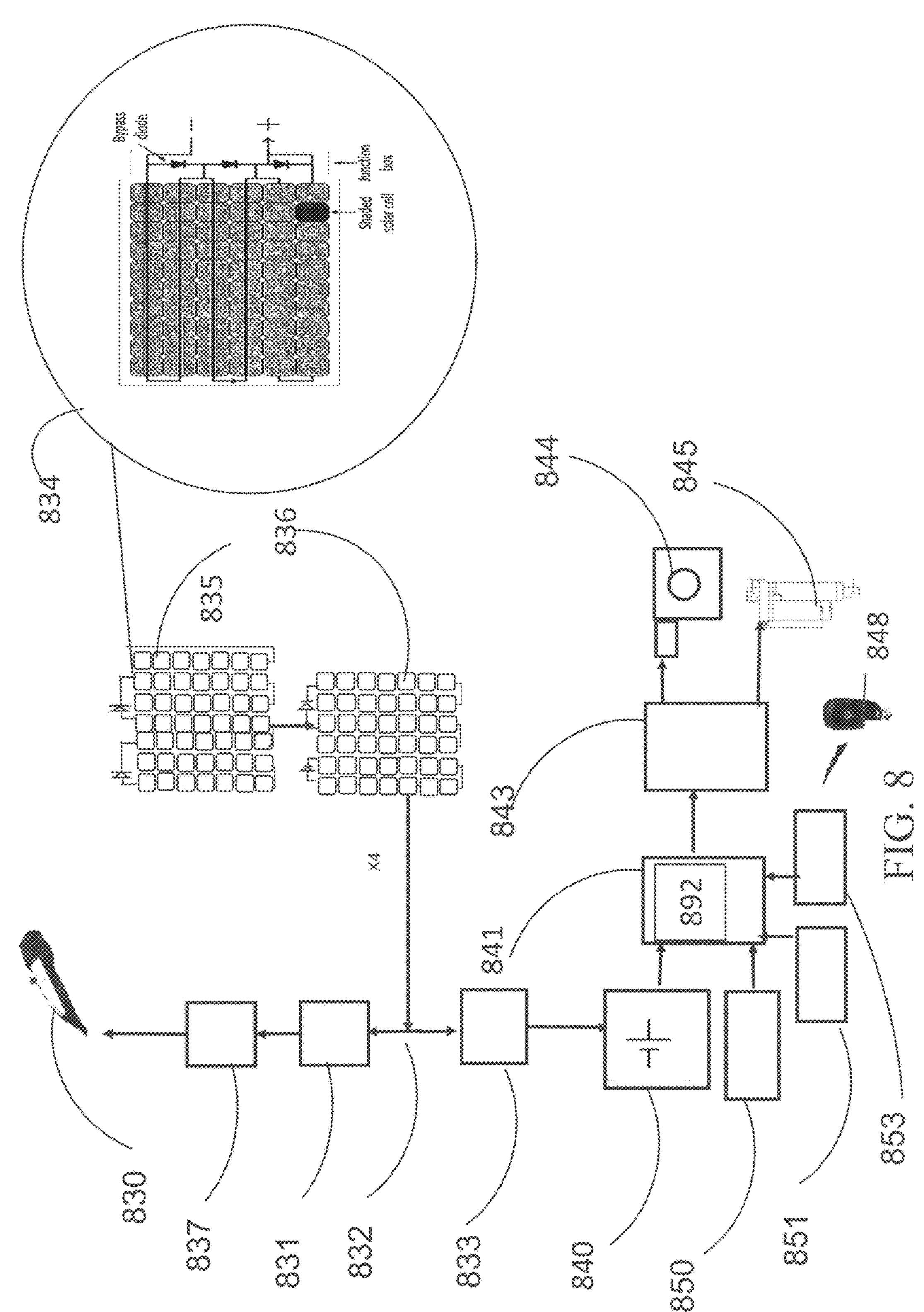
FIG. 8 illustrates the solar panel electrical system, in accordance with embodiments of the invention.

FIG. 8 illustrates the electrical system 800 for a panel system, such as the solar panel system 100, in accordance with embodiments. The system 800 is designed to manage the collection, conversion, storage, and delivery of solar energy for vehicle charging or other uses.

System 800 may include a main solar panel 835 and auxiliary solar panels 836, each equipped with diodes 834, to generate electrical energy. This energy is managed and distributed through a junction point 832. A portion of the current is routed to, for example a 5V converter 833 for charging the system battery 840, while for example the majority is sent to an AC inverter 831, which converts the DC output from the solar panels into AC power. The AC power is then delivered to a connector such as mobile connector 837, (e.g. a Tesla connector or any other electric vehicle manufacturer's mobile charger), and finally to the charging handle 830 for connection to the vehicle's charging port.

In accordance with embodiments, the system battery 840 powers the control and actuation components, including the motion controller 843, tilt axis motor 844, and expansion motors 845, all under the supervision of a central controller 841 that receives data from the compass unit 850, vibration sensor 851, and remote control sensor 853. This configuration enables efficient, safe, and user-friendly operation of the solar panel system for vehicle charging and other applications.

Specifically, in accordance with embodiment, the electrical system 800 includes or may be connected to a main solar panel 835. In one embodiment, the main solar panel 835 is composed of a matrix of photovoltaic cells and is responsible for capturing solar energy. In one embodiment the system 800 may include an auxiliary solar panels 836 which are additional panels connected for example in series with the main solar panel 835 to increase the total energy harvested. Both the main solar panel 835 and the auxiliary solar panels 836 are equipped with diodes 834, which are configured to prevent reverse current and protect the solar cells during partial shading or low-light conditions.

In accordance with embodiments, element 834 is a diode, which is typically included as a standard component with the solar panel. Its function is to bypass inactive or shaded areas of the panel, ensuring continued energy flow and protecting the panel from power loss in such conditions. Other alternatives or equivalent components may also be used to achieve similar functionality, depending on the specific design and application requirements.

In operation, the energy generated by the solar panels (835 and/or 836) is directed to a junction point 832, where the current is split. A portion of the current is routed to a for example 5V converter 833, which steps down the voltage to charge the system battery 840. In one embodiment, the majority of the current is sent to an AC inverter 831, which converts the DC output from the solar panels into AC power suitable for vehicle charging or other AC loads.

From the AC inverter 831, the energy flows to a connector such as a mobile Tesla or other car manufacture charger 837, which is configured to interface with the vehicle's charging system. A charging handle 830 is connected to a connector, such as the mobile connector 830 and is used to physically connect the system to the vehicle's charging port, enabling direct transfer of solar-generated electricity to the vehicle battery.

In accordance with embodiment, the electrical system comprises a battery 840 which is configured to store energy for use by the control and motion systems. Specifically, the battery 840 supplies power to a system controller 841, which manages the deployment and retraction of the solar panels, and to the tilt axis controller 844 which controls the tilt motor 845 responsible for adjusting the angle of the solar panels for optimal sunlight capture. It also controls the actuators 845 that operate the telescopic panels. The system controller 841 is configured and enabled to receive data from compass unit 850 to calculate, for example the sun angle according to the vehicle parking direction and tilt the solar panel system according to the compass data.

Specifically, in accordance with embodiments, the compass unit 850 is connected to or in communication with the system controller 841 and provides directional data to optimize panel orientation. In some cases, the controller 841.

In some cases, a vibration sensor 851 may also be connected to the controller, monitoring for excessive movement or wind, and can trigger automatic retraction or adjustment of the panels for safety. If vibration is too heigh, the solar panel is closed and tilt angle lock both sides.

In some cases, a remote-control sensor 853 is included, allowing the user to send open or close commands (e.g. to open or close the system) to the system remotely, for example via controller 841.

In accordance with embodiments, the system controller receives inputs from the compass unit 850, vibration sensor 851, and remote-control sensor 853, and coordinates the operation of the motion controller 843 and tilt axis controller 844 accordingly.

In accordance with embodiments, the controller includes one or more processors 892, which are configured to execute software for controlling the deployment of the system such as the solar panel system 800. This includes both opening and closing the telescopic system (e.g. system 100) and tilting the solar panel system (e.g. system 600). In accordance with embodiments, the software is configured to ensure that when the system is powered on, it initializes in a horizontal position with the telescopic panels folded inside the housing, as shown in FIG. 4B.

When a command is received, for example from the remote control sensor 853, the software sends instructions via the processor 892 to automatically open the telescopic panels, deploying them outside the housing as shown in FIGS. 4A-4C, using, for example, the tilt motor 845. After deployment, the system tilts the panel system using the tilting system controlled by motion controller at 843 that control motors of the tilt axis 844, and motors 845.

Based on the direction of the vehicle and the time of day, the controller calculates or measures the optimal tilt angle. For example, at predetermined intervals, such as every minute, the controller adjusts the tilt of the solar panel system to track the sun's position and maximize energy capture.

If a signal is received from the vibration sensor 851, indicating excessive vibration on the outermost panel, or if a close command is received from the remote control sensor 853, the controller resets the tilt to the initial position and retracts the telescopic panels for safety. During defined nighttime hours, the controller operates as if a close command has been received, ensuring the system is stowed.

In accordance with some embodiments, the controller operates autonomously, powered by the solar panel system, and receives commands for example from the remote control.

In cases where the controller is used for solar fields or residential rooftops as shown in FIG. 1G, certain components such as the compass unit 850, tilt axis controller 844, tilt motor 845, remote control sensor 853, and remote control 848 are not used.

In some cases, the controller 892 can have WIFI connection that enable to monitor and operate the system via smartphone application.

According to one embodiment, the tilt angle of the panels may be calculated by the controller 892 based on one or more of: time, angle of the vehicle, geographical location (e.g. relative to north) and date.

FIGS. 9A-9G illustrate the calculation of tilt angles for a system, such as system 100, using for example the tilting system 600 or other tilting system, in accordance with embodiments. One of the goals of the system, in accordance with embodiments, is to maximize energy capture from the sun by tilting the panel system toward the sun's position. The sun's angle is determined using for example astronomical tables, which provide the sun's position based on geographic location, date, and time. This angle can be calculated using a sun angle diagram or sun path diagram, such as those available on SunEarthTools.com.

Figure 9G:
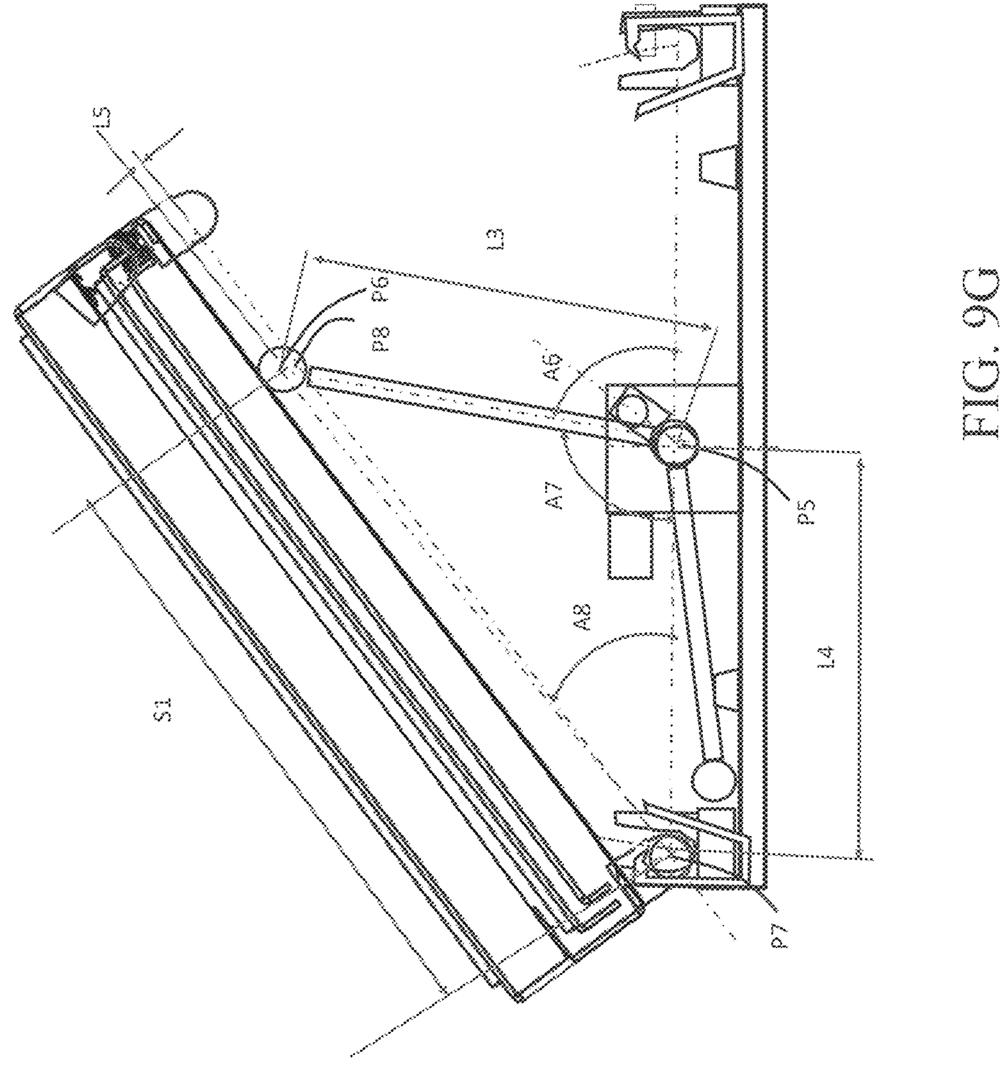

Once the sun angle is known, the system (e.g. the processor of the system 800, such as processor 892) calculates the required rotation angle of the motor to achieve the optimal tilt. The following describes the geometric relationships and calculations as illustrated in the figures:

FIG. 9G shows a side view of the tilting system, with the following reference points and distances:

- P5: Center of rotation of the transmission unit
- P7: Center of the tilt axis
- P6: Center of the arm wheel
- P8: Perpendicular to the reference point
- L4: Distance between P7 and P5
- L3: Distance between P5 and P6
- S1: Distance between P6 and P7 (variable during tilting)
- L5: Distance between P6 and P7, parallel to the tilted part (constant during tilting)
- A6: Arm tilt angle
- A7: Complementary angle
- A8: Tilt angle FIG. 9B shows:

- L1: Distance between P1 and P2 (see explanation in FIG. 9F)
- Arot: Rotation angle of the transmission, controlled by the controller FIG. 9D details:

- P1: Center of the transmission (identical to P5)
- P2: Center of the drive wheel on the transmission
- P4: Contact point of P2 on the arm
- L2: Arm thickness Calculations: For all 90 Angle Triangles:

- a: one leg
- b: other leg
- c: hypotenuse

As shown in FIG. 9D, a triangle is constructed from points P1, P2, and P3. Calculate angle A2:

$$\tan(A2)=b1/a1$$

$$A2=\arctan(b1/a1)$$

where b1=L, a1=D1/2

Triangle P1, P2, P3 (shared hypotenuse), calculating its length, and then calculating C1:

$$\sin(A2)=b1/c1 \text{ than:}$$

$$C1=b1/\sin(A2)$$

In triangle P1, P3, P4, calculating angle A3:

$$a2=c1$$

$$\tan(A3)=b2/a2 \text{ than:}$$

$$A3=\arctan(b2/a2)$$

As shown in FIG. 9G, constructing triangle P6, P5, P7. The complementary angle is A7:

$$A6=A\text{rot}+A2+A3$$

$$A7=180-A6$$

Calculate A8 using the law of cosines:

$$S1^2=L4^2+L3^2+2\cdot L4\cdot L3\cdot\cos(A7)$$

$$S1=\text{Sqrt}(L42+L3^2+2\cdot L4\cdot L3\cdot\cos(A7))$$

$$L3^2=L4^2+S1^2+2\cdot L4\cdot S1\cdot\cos(A8)$$

$$A8=Ar\ \cos(L3^2-L4^2-S1^2)/2\cdot L4\cdot S1))$$

As shown in FIG. 9B, constructing triangle P7, P8, P6. Calculating angle A5:

$$\sin(A5)=b4/c4$$

where b4=, c4=S1

$$A5=\text{arcsine}(b4/c4)$$

Thus, the tilt angle is:

$$A\text{tilt}=A5+A8 \text{ See FIG. 9}G$$

This allows calculation of AtiltAtilt from ArotArot. To determine the required rotation angle ArotArot for a desired tilt angle AtiltAtilt, the system uses for example an iterative calculation (convergence method) as shown in FIG. 9A.

This detailed geometric and trigonometric approach enables precise control of the panel tilt to maximize solar energy capture throughout the day, in accordance with embodiments.

This is provided as an example of one method for calculating the tilt angle and controlling the system. In accordance with embodiments, other calculation methods, geometric relationships, and system configurations may also be used to achieve optimal panel tilting and sun tracking, depending on the specific design and application requirements. The measurements and calculations may be performed by a local or external processor, such as the processor 892 shown in FIG. 8.

Aspects of the systems and methods provided herein, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) for providing, for example, questions and answers, analysis results, recommendations. Examples of UI include, without limitation, a graphical user interface (GUI) and web-based user interface.

Methods and systems of the invention can be implemented by way of one or more algorithms and with instructions provided with one or more processors as disclosed herein. An algorithm can be implemented by way of software upon execution by the central processing unit. The algorithm can be, for example, random forest, graphical models, support vector machine or other.

Although the above steps show a method of a system in accordance with an example, a person of ordinary skill in the art will recognize many variations based on the teaching described herein. The steps may be completed in a different order. Steps may be added or deleted. Some of the steps may comprise sub-steps. Many of the steps may be repeated as often as if beneficial to the platform.

Each of the examples as described herein can be combined with one or more other examples. Further, one or more components of one or more examples can be combined with other examples.

Although the detailed description contains many specifics, these should not be construed as limiting the scope of the disclosure but merely as illustrating different examples and aspects of the invention. It should be appreciated that the scope of the disclosure includes other embodiments not discussed in detail above. Various other modifications, changes and variations which will be apparent to those skilled in the art may be made in the arrangement, operation and details of the method and apparatus of the invention provided herein without departing from the spirit and scope of the invention as described herein.

While embodiments of the invention have been shown and described herein, it will be obvious to those skilled in the art that such embodiments are provided by way of example only. Numerous variations, changes, and substitutions will be apparent to those skilled in the art without departing from the scope of the invention. It should be understood that various alternatives to the embodiments of the invention described herein may be employed without departing from the scope of the invention.

While certain elements are depicted in one or more of the figures, it is understood that not every element may be included in each figure. The figures are intended to be illustrative and not limiting, and elements from one figure may or may not be present in other figures. However, it should be understood that the invention is not limited to the specific elements or configurations shown in the figures, and additional or alternative elements and configurations may be included within the scope of the invention.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the invention.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Unless specifically stated otherwise, as apparent from the following discussions, it is appreciated that throughout the specification discussions utilizing terms such as "processing", "computing", "comparing", "determining", "calculating", "receiving", "providing", "obtaining", "detecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities.

Although various features of the invention have been described with particular embodiments. It is considered within one of ordinary skill in the art to mix and match the features in other embodiments not depicted in the figures.

It is to be understood that the phraseology or terminology employed herein is for the purpose of description and not of limitation. The means, materials, and steps for carrying out various disclosed functions may take a variety of alternative forms without departing from the invention.

Those skilled in the art will readily appreciate that various modifications and changes can be applied to the embodiments of the invention as described herein without departing from its scope.

The terms "comprises", "comprising", "includes", "including", "having" and their conjugates mean "including but not limited to". This term encompasses the terms "consisting of" and "consisting essentially of". As used herein, the singular form "a", "an" and "the" include plural references unless the context clearly dictates otherwise.

It is to be understood that the reference numerals used in the drawings are for illustrative purposes only and do not limit the scope of the invention. Alternative numbering schemes may be employed without departing from the spirit and scope of the disclosed embodiments. The particular numbers assigned to elements in the drawings should not be construed as requiring a specific number of elements or a particular arrangement, unless explicitly stated otherwise in the description or claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the invention. To the extent that section headings are used, they should not be construed as necessarily limiting. Each of the examples as described herein can be combined with one or more other examples. Further, one or more components of one or more examples can be combined with other examples.

Although the detailed description contains many specifics, these should not be construed as limiting the scope of the disclosure but merely as illustrating different examples and aspects of the invention. It should be appreciated that the scope of the disclosure includes other embodiments not discussed in detail above. Various other modifications, changes and variations which will be apparent to those skilled in the art may be made in the arrangement, operation and details of the method and apparatus of the invention provided herein without departing from the spirit and scope of the invention as described herein.

While embodiments of the invention have been shown and described herein, it will be obvious to those skilled in the art that such embodiments are provided by way of example only. Numerous variations, changes, and substitutions will be apparent to those skilled in the art without departing from the scope of the invention. It should be understood that various alternatives to the embodiments of the invention described herein may be employed without departing from the scope of the invention.

What is claimed is:

1. A tilting system, comprising:

a base;

a tilting plate configured to support one or more solar panels;

at least two locking devices configured and enabled to lock the tilting plate at the respective edge about which the tilting plate is tilted; and a single transmission unit disposed below the tilting plate and located centrally on the base or in proximity to the center of the base, wherein the transmission unit comprises a central pivot, a stud extending from the central pivot, a stud-type track roller mounted on the stud, and a pair of tilting arms operatively connected at the central pivot, wherein operation of the transmission unit actuates the pair of tilting arms such that rotation of one arm of the pair of tilting arms lifts the tilting plate about a first selected edge of the one or more solar panels in one direction while the other tilting arm of the pair of tilting arms cooperates with one locking device of the locking devices to secure the tilting plate in a second edge of the one or more solar panels in the opposite direction.

2. The tilting system of claim 1, wherein each tilting arm has a roller mounted at a distal end and wherein the roller is configured to engage a guide channel formed in the base, said guide channel is configured and enabled to prevent the roller from being withdrawn from the channel during operation.

3. The tilting system of claim 1, wherein the at least two locking devices are each mounted at an end of the base and configured to engage a respective locking handle on the tilting plate.

4. The tilting system of claim 3, wherein each of the at least two locking devices comprises a grasping element and a spring mechanism, wherein the spring mechanism is configured and enabled to release the locking on the side of the tilting plate being raised by the respective tilting arm, and wherein each of the at least two locking devices is configured to lock and unlock automatically the tilting plate by the respective tilting arm.

5. The tilting system of claim 1, wherein the base is configured for mounting to a vehicle roof, a building rooftop, a garden structure, a balcony, a patio, or another outdoor structure.

6. The tilting system of claim 1, further comprising a telescopic panel system configured to extend and retract the one or more solar panels.

7. The tilting system of claim 6, wherein the telescopic panel system comprises a fixed frame, said fixed frame is configured to hold said one or more solar panels, and wherein said one or more solar panels comprise at least one moving panel mounted on telescopic rails, and wherein the telescopic panel system is configured to increase or decrease the surface area of the telescopic panel system.

8. The tilting system of claim 7, wherein the telescopic panel system comprises a plurality of moving panels, each configured to extend outward from the fixed frame in opposite directions.

9. The tilting system of claim 7, wherein the telescopic panel system includes a sliding drawer mechanism, and wherein the at least one moving panel being configured to slide along a fixed rail guided by a moving frame.

10. The tilting system of claim 7, wherein the telescopic panel system further comprises an actuator selected from the group consisting of an electric actuator, a linear actuator, a motorized actuator, or a drive chain actuator, said actuator is configured and enabled to automatically deploy and retract the moving panel.

11. The tilting system of claim 6, wherein the telescopic panel system is configured to be mounted on a vehicle roof, a building rooftop, a garden structure, a balcony, a patio, or another outdoor structure.

12. The tilting system of claim 6, wherein the telescopic panel system is further configured to operate in conjunction with the tilting system to enable both extension, retraction and tilting of the one or more solar panels.

13. The tilting system of claim 1, wherein the at least one panel is selected from the group consisting of a solar panel, a mirror panel, a shading panel, a display panel, or another functional or structural panel configured to be tilted.

14. The tilting system of claim 1, wherein the tilting system is installed on a vehicle and wherein the tilting system includes a computerized control unit configured to operate the tilting system according to an optimal tilt angle at any given time, based on the vehicle parking angle, date, time, and geographical location.

15. The tilting system of claim 14, wherein electricity generated by the one or more solar panels is used to charge the vehicle via a mobile charger.

16. A panel system comprising:

one or more solar panels configured to be deployed and tilted synchronously using a tilting system and a deployment system, wherein the tilting system comprises a tilting plate and a locking mechanism configured to securely fix the panel in a selected tilted position, wherein the tilting system comprises one or more transmission units disposed respectively below the one or more solar panels, and wherein each of the one or more transmission units comprise a central pivot, a stud extending from the central pivot, a stud-type track roller, mounted on the stud, and a pair of tilting arms operatively connected at the central pivot; and wherein operation of the transmission unit actuates the pair of tilting arms such that rotation of one arm of the pair of tilting arms lifts the tilting plate about a first selected edge of the one or more solar panels in one direction while the other tilting arm of the pair of tilting arms cooperates with the locking mechanism to secure the tilting plate in a second edge of the one or more solar panels in the opposite direction.

17. The tilting system of claim 1, wherein rotation of the central pivot causes the stud-type track roller to rotate, which in turn causes the pair of tilting arms to pivot.

18. The tilting system of claim 1, wherein the pair of tilting arms and the at least two locking devices are located below the tilting plate.

* * * * *